(12) United States Patent
Pallerla et al.

(10) Patent No.: US 11,580,770 B1
(45) Date of Patent: Feb. 14, 2023

(54) ULTRASONIC FINGERPRINT SENSOR TECHNOLOGIES AND METHODS FOR BI-DIRECTIONAL FINGERPRINT SENSING

(71) Applicant: QUALCOMM Incorporated, San Diego, CA (US)

(72) Inventors: Rakesh Pallerla, Hyderabad (IN); Hrishikesh Vijaykumar Panchawagh, Cupertino, CA (US); Prakash Tiwari, Hyderabad (IN); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/443,936

(22) Filed: Jul. 28, 2021

(51) Int. Cl.
  *G06V 40/13* (2022.01)
  *G06K 9/00* (2022.01)
  *B06B 1/06* (2006.01)
  *H04M 1/02* (2006.01)

(52) U.S. Cl.
  CPC ........ *G06V 40/1306* (2022.01); *H04M 1/026* (2013.01); *H04M 2250/22* (2013.01)

(58) Field of Classification Search
  CPC .............. G06V 40/1306; H04M 1/026; H04M 2250/22
  See application file for complete search history.

(56) References Cited

U.S. PATENT DOCUMENTS

| | | | |
|---|---|---|---|
| 10,497,748 B2 | 12/2019 | Panchawagh et al. | |
| 2014/0354596 A1 | 12/2014 | Djrodjev et al. | |
| 2019/0087622 A1* | 3/2019 | Benkley, III | G06V 40/1329 |
| 2021/0200366 A1* | 7/2021 | Bok | H01L 27/3234 |
| 2021/0223882 A1* | 7/2021 | Ding | G06F 3/0436 |

OTHER PUBLICATIONS

International Search Report and Written Opinion—PCT/US2022/072661—ISA/EPO—dated Sep. 9, 2022.
Joe F., "ZTE Nubia X with Dual Screens & Dual Fingerprint Scanners", Oct. 31, 2018 (Oct. 31, 2018), pp. 1-6, XP055954732, p. 1, paragraph 2 p. 3, paragraph 1.

* cited by examiner

*Primary Examiner* — Lixi C Simpson
(74) *Attorney, Agent, or Firm* — Qualcomm Incorporated

(57) ABSTRACT

Apparatuses, systems, and methods are provided for ultrasonic fingerprint sensors that are able to be used to detect fingerprints from opposing sides of an apparatus, e.g., a smartphone with screens on both sides of the housing. Some implementations of such sensors may include, for example, two piezoelectric and sensor pixel layer assemblies coupled to a common controller. Other implementations of such sensors may include, for example, a single piezoelectric and sensor pixel assembly coupled with a controller configured to apply a range-gate delay to obtain fingerprint scans from either opposing side of an apparatus. Yet further implementations of such sensors may include acoustic masking layers to spatially filter ultrasonic waves propagating to either side of an apparatus.

22 Claims, 16 Drawing Sheets

ULTRASONIC FINGERPRINT SENSOR TECHNOLOGIES AND METHODS FOR BI-DIRECTIONAL FINGERPRINT SENSING

TECHNICAL FIELD

This disclosure relates generally to fingerprint sensor devices and related methods, including but not limited to ultrasonic fingerprint sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance under some conditions, improved methods and devices would be desirable.

SUMMARY

The systems, methods and devices of the disclosure each have several innovative aspects, no single one of which is solely responsible for the desirable attributes disclosed herein.

Various innovative aspects of the subject matter may be implemented in a variety of ways, including as apparatuses or systems, methods, or as non-transitory computer-readable media storing computer-executable instructions. Various example implementations are listed below, although it will be apparent from the disclosure that other implementations in addition to those listed below are within the scope of this disclosure.

In some implementations, an apparatus may be provided that includes a first sensor pixel layer including a plurality of first sensor pixels, a first acoustic masking layer, a first piezoelectric layer, a second acoustic masking layer, and a second sensor pixel layer including a plurality of second sensor pixels. In such an apparatus, the first sensor pixel layer, the first acoustic masking layer, the first piezoelectric layer, the second acoustic masking layer, and the second sensor pixel layer may be arranged in a stacked configuration along a first axis, the first acoustic masking layer may include a repeating first pattern of first high-acoustic-impedance (HAI) regions and first low-acoustic-impedance (LAI) regions, the second acoustic masking layer may include a repeating second pattern of second HAI regions and second LAI regions, the first HAI regions may have a higher acoustic impedance than the first LAI regions, the second HAI regions may have a higher acoustic impedance than the second LAI regions, and, when viewed along the first axis, the first HAI regions may overlap the second LAI regions, the second HAI regions may overlap the first LAI regions, the first LAI regions may overlap the second HAI regions, and the second LAI regions may overlap the first HAI regions.

In some implementations of the apparatus, the first LAI regions may be entirely overlapped by the second HAI regions when viewed along the first axis, and the second LAI regions may be entirely overlapped by the first HAI regions when viewed along the first axis.

In some implementations of the apparatus, each first LAI region may be smaller in footprint when viewed along the first axis than the second HAI region that entirely overlaps it, and each second LAI region may be smaller in footprint when viewed along the first axis than the first HAI region that entirely overlaps it.

In some implementations of the apparatus, two first reference planes that are perpendicular to, and spaced apart by a first distance along, the first axis may be defined by opposing surfaces of the first LAI regions, the first HAI regions may be provided by first gaps located between the first reference planes, and the first gaps may not have any solid or liquid material in them.

In some implementations of the apparatus, the first LAI regions may not have the first gaps.

In some implementations of the apparatus, two second reference planes that are perpendicular to, and spaced apart by a second distance along, the first axis may be defined by opposing surfaces of the second LAI regions, and the second HAI regions may be provided by second gaps located between the second reference planes.

In some implementations of the apparatus, the second LAI regions may not have the second gaps.

In some implementations of the apparatus, two second reference planes that are perpendicular to, and spaced apart by a second distance along, the first axis may be defined by opposing surfaces of the second LAI regions, the second HAI regions may be provided by second gaps located between the second reference planes, and the second LAI regions may not have the second gaps.

In some implementations of the apparatus, the first pattern and the second pattern may both be checkerboard patterns.

In some implementations of the apparatus, each first LAI region may include a contiguous material in between the first reference planes. In some implementations of the apparatus, the contiguous material may include copper or aluminum.

In some implementations of the apparatus, each first LAI region may include a contiguous material in between the first reference planes, and each second LAI region may include a contiguous material in between the second reference planes. In some implementations of the apparatus, the contiguous material may include copper or aluminum.

In some implementations of the apparatus, the first LAI regions of the first acoustic masking layer may provide first electrically conductive paths between the first sensor pixel layer and the first piezoelectric layer, the second LAI regions of the second acoustic masking layer may provide second electrically conductive paths between the second sensor pixel layer and the first piezoelectric layer, the first sensor pixels may each include a circuit that is configured to electrically switch the first electrically conductive path associated therewith between serving as a sensor pixel electrode and serving as a first ultrasonic generator electrode, and the second sensor pixels may each include a circuit that is configured to electrically switch the second electrically conductive path associated therewith between serving as a sensor pixel electrode and serving as a second ultrasonic generator electrode.

In some implementations of the apparatus, each of the first LAI regions and the second LAI regions may be electrically coupled with an electrode extension region that extends into an adjoining one of the first HAI regions and the second HAI regions, respectively, and each of the electrode extension regions may provide an electrically conductive path between the first piezoelectric layer and the first or second LAI region electrically coupled thereto.

In some implementations of the apparatus, the apparatus may further include a second piezoelectric layer, a third piezoelectric layer, a first sensor electrode layer, and a second sensor electrode layer. In such implementations, the first piezoelectric layer may be interposed between the first sensor electrode layer and the second sensor electrode layer, the second piezoelectric layer may be interposed between the first sensor pixel layer and the first sensor electrode layer, the third piezoelectric layer may be interposed between the second sensor pixel layer and the second sensor electrode layer, the first sensor pixel layer and the first sensor electrode layer may be configured such that the first sensor pixels measure electrical charges that are generated within the second piezoelectric layer responsive to passage of an ultrasonic wave through the second piezoelectric layer, and the second sensor pixel layer and the second sensor electrode layer may be configured such that the second sensor pixels measure electrical charges that are generated within the third piezoelectric layer responsive to passage of an ultrasonic wave through the third piezoelectric layer.

In some implementations of the apparatus, the apparatus may further include a first ultrasonic generator electrode and a second ultrasonic generator electrode. In such implementations, the first piezoelectric layer may be interposed between the first ultrasonic generator electrode and the second ultrasonic generator electrode and the first ultrasonic generator electrode, the second ultrasonic generator electrode, and the first piezoelectric layer may be configured to cause an ultrasonic wave to be generated by the first piezoelectric layer responsive to application of an electrical potential across the first ultrasonic generator electrode and the second ultrasonic generator electrode.

In some implementations of the apparatus, the first acoustic masking layer may be interposed between the first sensor electrode layer and the first piezoelectric layer, the second acoustic masking layer may be interposed between the second sensor electrode layer and the first piezoelectric layer, the first acoustic masking layer may form an electrically conductive path between the first sensor electrode layer and the first piezoelectric layer, and the second acoustic masking layer may form an electrically conductive path between the second sensor electrode layer and the first piezoelectric layer.

In some implementations of the apparatus, the first acoustic masking layer may be interposed between the first sensor electrode layer and the second piezoelectric layer, the second acoustic masking layer may be interposed between the second sensor electrode layer and the third piezoelectric layer, the first acoustic masking layer may form an electrically conductive path between the first sensor electrode layer and the second piezoelectric layer, and the second acoustic masking layer may form an electrically conductive path between the second sensor electrode layer and the third piezoelectric layer.

In some implementations of the apparatus, the apparatus may further include a first display layer, a second display layer, a first cover glass, and a second cover glass. In such implementations, the first display layer may be interposed between the first cover glass and the first sensor pixel layer, the second display layer may be interposed between the second cover glass and the second sensor pixel layer, and the first display layer and the second display layer may both be interposed between the first cover glass and the second cover glass.

In some implementations of the apparatus, the apparatus may be a mobile communications device.

In some implementations, a method may be provided that includes causing ultrasonic waves to be generated by a first piezoelectric layer of an apparatus, causing a first ultrasonic wave of the ultrasonic waves to pass through a first acoustic masking layer of the apparatus and to propagate towards a first side of the apparatus, causing a second ultrasonic wave of the ultrasonic waves to pass through a second acoustic masking layer of the apparatus and to propagate towards a second side of the apparatus opposite the first side of the apparatus, causing first sensor pixels in a first sensor pixel layer of the apparatus to obtain first fingerprint scan data based on reflections of the first ultrasonic wave from the first side of the apparatus, and causing second sensor pixels in a second sensor pixel layer of the apparatus to obtain second fingerprint scan data based on reflections of the second ultrasonic wave from the second side of the apparatus. In such implementations, the first sensor pixel layer, the first acoustic masking layer, the first piezoelectric layer, the second acoustic masking layer, and the second sensor pixel layer may be arranged in a stacked configuration along a first axis, the first acoustic masking layer may include a repeating first pattern of first high-acoustic-impedance (HAI) regions and first low-acoustic-impedance (LAI) regions, the second acoustic masking layer may include a repeating second pattern of second HAI regions and second LAI regions, the first HAI regions may have a higher acoustic impedance than the first LAI regions, the second HAI regions may have a higher acoustic impedance than the second LAI regions, and, when viewed along the first axis, the first HAI regions may overlap the second LAI regions, the second HAI regions may overlap the first LAI regions, the first LAI regions may overlap the second HAI regions, and the second LAI regions may overlap the first HAI regions.

In some implementations of the method, the first LAI regions may be entirely overlapped by the second HAI regions when viewed along the first axis and the second LAI regions may be entirely overlapped by the first HAI regions when viewed along the first axis.

In some implementations of the method, each first LAI region may be smaller in footprint when viewed along the first axis than the second HAI region that entirely overlaps it, and each second LAI region may be smaller in footprint when viewed along the first axis than the first HAI region that entirely overlaps it.

In some implementations of the method, two first reference planes that are perpendicular to, and spaced apart by a first distance along, the first axis may be defined by opposing surfaces of the first LAI regions, the first HAI regions may be provided by first gaps located between the first reference planes, and the first gaps may not have any solid or liquid material in them.

In some implementations of the method, the first LAI regions may not have the first gaps.

In some implementations of the method, two second reference planes that are perpendicular to, and spaced apart by a second distance along, the first axis may be defined by opposing surfaces of the second LAI regions, and the second HAI regions may be provided by second gaps located between the second reference planes.

In some implementations of the method, the second LAI regions may not have the second gaps.

In some implementations of the method, two second reference planes that are perpendicular to, and spaced apart by a second distance along, the first axis may be defined by opposing surfaces of the second LAI regions, the second HAI regions may be provided by second gaps located between the second reference planes, and the second LAI regions may not have the second gaps.

In some implementations of the method, the first pattern and the second pattern may both be checkerboard patterns.

In some implementations of the method, each first LAI region may include a contiguous material in between the first reference planes. In some such implementations, the contiguous material may include copper or aluminum.

In some implementations of the method, each first LAI region may include a contiguous material in between the first reference planes, and each second LAI region may include a contiguous material in between the second reference planes. In some such implementations, the contiguous material may include copper or aluminum.

In some implementations of the method, the first LAI regions of the first acoustic masking layer may provide first electrically conductive paths between the first sensor pixel layer and the first piezoelectric layer, the second LAI regions of the second acoustic masking layer may provide second electrically conductive paths between the second sensor pixel layer and the first piezoelectric layer, the first sensor pixels may each include a circuit that is configured to electrically switch the first electrically conductive path associated therewith between serving as a sensor pixel electrode and serving as a first ultrasonic generator electrode, and the second sensor pixels may each include a circuit that is configured to electrically switch the second electrically conductive path associated therewith between serving as a sensor pixel electrode and serving as a second ultrasonic generator electrode.

In some implementations of the method, each of the first LAI regions and the second LAI regions may be electrically coupled with an electrode extension region that extends into an adjoining one of the first HAI regions and the second HAI regions, respectively, and each of the electrode extension regions may provide an electrically conductive path between the first piezoelectric layer and the first or second LAI region electrically coupled thereto.

In some implementations of the method, the method may further include receiving the reflections of the first ultrasonic wave in a second piezoelectric layer, receiving the reflections of the second ultrasonic wave in a third piezoelectric layer, causing the first sensor pixels in the first sensor pixel layer of the apparatus to obtain the first fingerprint scan data by measuring, using a first sensor electrode layer, charges generated within the second piezoelectric layer; and causing the second sensor pixels in the second sensor pixel layer of the apparatus to obtain the second fingerprint scan data by measuring, using a second sensor electrode layer, charges generated within the third piezoelectric layer. In such implementations, the first piezoelectric layer may be interposed between the first sensor electrode layer and the second sensor electrode layer, the second piezoelectric layer may be interposed between the first sensor pixel layer and the first sensor electrode layer, the third piezoelectric layer may be interposed between the second sensor pixel layer and the second sensor electrode layer, the first sensor pixel layer and the first sensor electrode layer may be configured such that the first sensor pixels measure electrical charges that are generated within the second piezoelectric layer responsive to passage of an ultrasonic wave through the second piezoelectric layer, and the second sensor pixel layer and the second sensor electrode layer may be configured such that the second sensor pixels measure electrical charges that are generated within the third piezoelectric layer responsive to passage of an ultrasonic wave through the third piezoelectric layer.

In some implementations of the method, the causing the ultrasonic waves to be generated by the first piezoelectric layer of the apparatus may include causing an electrical potential to be applied across the first piezoelectric layer by a first ultrasonic generator electrode and a second ultrasonic generator electrode. In such implementations, the first piezoelectric layer may be interposed between the first ultrasonic generator electrode and the second ultrasonic generator electrode.

In some implementations of the method, the first acoustic masking layer may be interposed between the first sensor electrode layer and the first piezoelectric layer, the second acoustic masking layer may be interposed between the second sensor electrode layer and the first piezoelectric layer, the first acoustic masking layer may form an electrically conductive path between the first sensor electrode layer and the first piezoelectric layer, and the second acoustic masking layer may form an electrically conductive path between the second sensor electrode layer and the first piezoelectric layer.

In some implementations of the method, the first acoustic masking layer may be interposed between the first sensor electrode layer and the second piezoelectric layer, the second acoustic masking layer may be interposed between the second sensor electrode layer and the third piezoelectric layer, the first acoustic masking layer may form an electrically conductive path between the first sensor electrode layer and the second piezoelectric layer, and the second acoustic masking layer may form an electrically conductive path between the second sensor electrode layer and the third piezoelectric layer.

In some implementations of the method, the method may further include causing first graphical content to be displayed on a first display layer and through a first cover glass and causing second graphical content to be displayed on a second display layer and through a second cover glass. In such implementations, the first display layer may be interposed between the first cover glass and the first sensor pixel layer, the second display layer may be interposed between the second cover glass and the second sensor pixel layer, and the first display layer and the second display layer may both be interposed between the first cover glass and the second cover glass.

In some implementations of the method, the apparatus may be a mobile communications device.

In some implementations, an apparatus may be provided that includes a means for generating one or more ultrasonic waves, a first means for detecting reflected ultrasonic waves, a first acoustic masking means, a second means for detecting reflected ultrasonic waves, and a second acoustic masking means. In such an apparatus, the means for generating one or more ultrasonic waves, the first means for detecting reflected ultrasonic waves, the second means for detecting reflected ultrasonic waves, first acoustic masking means, and the second acoustic masking means may be arranged in a stacked configuration along a first axis, the first acoustic masking means may include a repeating first pattern of first high-acoustic-impedance (HAI) regions and first low-acoustic-impedance (LAI) regions, the second acoustic masking means may include a repeating second pattern of second HAI regions and second LAI regions, the first HAI regions may have a higher acoustic impedance than the first LAI regions, the second HAI regions may have a higher acoustic impedance than the second LAI regions, and, when viewed along the first axis, the first HAI regions may overlap the second LAI regions, the second HAI regions may overlap the first LAI regions, the first LAI regions may overlap the second HAI regions, and the second LAI regions may overlap the first HAI regions.

In some implementations of the apparatus, the first LAI regions may be entirely overlapped by the second HAI regions when viewed along the first axis, and the second LAI regions may be entirely overlapped by the first HAI regions when viewed along the first axis.

In some implementations of the apparatus, each first LAI region may be smaller in footprint when viewed along the first axis than the second HAI region that entirely overlaps it, and each second LAI region may be smaller in footprint when viewed along the first axis than the first HAI region that entirely overlaps it.

In some implementations of the apparatus, two first reference planes that are perpendicular to, and spaced apart by a first distance along, the first axis may be defined by opposing surfaces of the first LAI regions, the first HAI regions may be provided by first gaps located between the first reference planes, and the first gaps may not have any solid or liquid material in them.

In some implementations of the apparatus, the first LAI regions may not have the first gaps.

In some implementations of the apparatus, two second reference planes that are perpendicular to, and spaced apart by a second distance along, the first axis may be defined by opposing surfaces of the second LAI regions, and the second HAI regions may be provided by second gaps located between the second reference planes.

In some implementations of the apparatus, the second LAI regions may not have the second gaps.

In some implementations of the apparatus, two second reference planes that are perpendicular to, and spaced apart by a second distance along, the first axis may be defined by opposing surfaces of the second LAI regions, the second HAI regions may be provided by second gaps located between the second reference planes, and the second LAI regions may not have the second gaps.

In some implementations of the apparatus, the first pattern and the second pattern may both be checkerboard patterns.

In some implementations of the apparatus, each first LAI region may include a contiguous material in between the first reference planes. In some such implementations of the apparatus, the contiguous material may include copper or aluminum.

In some implementations of the apparatus, each first LAI region may include a contiguous material in between the first reference planes, and each second LAI region may include a contiguous material in between the second reference planes. In some such implementations of the apparatus, the contiguous material may include copper or aluminum.

In some implementations of the apparatus, the first LAI regions of the first acoustic masking means may provide first electrically conductive paths between the means for generating one or more ultrasonic waves and the first means for detecting reflected ultrasonic waves, the second LAI regions of the second acoustic masking means may provide second electrically conductive paths between the means for generating one or more ultrasonic waves and the second means for detecting reflected ultrasonic waves, the first means for detecting reflected ultrasonic waves may include first sensor pixels that each include a circuit that is configured to electrically switch the first electrically conductive path associated therewith between serving as a sensor pixel electrode for the first means for detecting reflected ultrasonic waves and serving as a first ultrasonic generator electrode for the means for generating one or more ultrasonic waves, and the second means for detecting reflected ultrasonic waves may include second sensor pixels that each include a circuit that is configured to electrically switch the second electrically conductive path associated therewith between serving as a sensor pixel electrode for the second means for detecting reflected ultrasonic waves and serving as a second ultrasonic generator electrode for the means for generating one or more ultrasonic waves.

In some implementations of the apparatus, each of the first LAI regions and the second LAI regions may be electrically coupled with an electrode extension region that extends into an adjoining one of the first HAI regions and the second HAI regions, respectively, and each of the electrode extension regions may provide an electrically conductive path between the means for generating one or more ultrasonic waves and the first or second LAI region electrically coupled thereto.

In some implementations of the apparatus, the first means for detecting reflected ultrasonic waves may include a first piezoelectric layer, a first sensor electrode layer, and a first sensor pixel layer, and the second means for detecting reflected ultrasonic waves may include a second piezoelectric layer, a second sensor electrode layer, and a second sensor pixel layer. In such implementations, the means for generating one or more ultrasonic waves may include a third piezoelectric layer and may be interposed between the first sensor electrode layer and the second sensor electrode layer, the first piezoelectric layer may be interposed between the first sensor pixel layer and the first sensor electrode layer, the second piezoelectric layer may be interposed between the second sensor pixel layer and the second sensor electrode layer, the first sensor pixel layer and the first sensor electrode layer may be configured such that first sensor pixels in the first sensor pixel layer measure electrical charges that are generated within the first piezoelectric layer responsive to passage of an ultrasonic wave through the first piezoelectric layer, and the second sensor pixel layer and the second sensor electrode layer may be configured such that second sensor pixels in the second sensor pixel layer measure electrical charges that are generated within the second piezoelectric layer responsive to passage of an ultrasonic wave through the second piezoelectric layer.

In some implementations of the apparatus, the means for generating one or more ultrasonic waves may include a first ultrasonic generator electrode, a second ultrasonic generator electrode, and a third piezoelectric layer. In such implementations, the third piezoelectric layer may be interposed between the first ultrasonic generator electrode and the second ultrasonic generator electrode, and the first ultrasonic generator electrode, the second ultrasonic generator electrode, and the third piezoelectric layer may be configured to cause an ultrasonic wave to be generated by the first piezoelectric layer responsive to application of an electrical potential across the first ultrasonic generator electrode and the second ultrasonic generator electrode.

In some implementations of the apparatus, the means for generating one or more ultrasonic waves may include a third piezoelectric layer, the first acoustic masking means may be interposed between the first sensor electrode layer and the third piezoelectric layer, the second acoustic masking means may be interposed between the second sensor electrode layer and the third piezoelectric layer, the first acoustic masking means may form an electrically conductive path between the first sensor electrode layer and the third piezoelectric layer, and the second acoustic masking means may form an electrically conductive path between the second sensor electrode layer and the third piezoelectric layer.

In some implementations of the apparatus, the first acoustic masking means may be interposed between the first sensor electrode layer and the second piezoelectric layer, the second acoustic masking means may be interposed between the second sensor electrode layer and the third piezoelectric layer, the first acoustic masking means may form an electrically conductive path between the first sensor electrode layer and the first piezoelectric layer, and the second acoustic masking means may form an electrically conductive path between the second sensor electrode layer and the second piezoelectric layer.

In some implementations of the apparatus, the apparatus may further include a first display means, a second display means, a first cover means, and a second cover means. In such implementations, the first display means may be interposed between the first cover means and the first means for detecting reflected ultrasonic waves, the second display means may be interposed between the second cover means and the second means for detecting reflected ultrasonic waves, and the first display means and the second display means may both be interposed between the first cover means and the second cover means.

In some implementations of the apparatus, the apparatus may be a mobile communications device.

In some implementations, an apparatus may be provided that includes a portion of a first ultrasonic fingerprint sensing system including a first sensor pixel layer, a first piezoelectric layer, and a first electrode layer, a portion of a second ultrasonic fingerprint sensing system including a second sensor pixel layer, a second piezoelectric layer, and a second electrode layer, and a single common controller. In such implementations, the first sensor pixel layer may include a plurality of first sensor pixels, each first sensor pixel configured to, in conjunction with the first electrode layer, measure an amount of charge generated within the first piezoelectric layer responsive to transit of an ultrasonic wave therethrough, the second sensor pixel layer may include a plurality of second sensor pixels, each second sensor pixel configured to, in conjunction with the second electrode layer, measure an amount of charge generated within the second piezoelectric layer responsive to transit of an ultrasonic wave therethrough. Furthermore, at least the first sensor pixel layer and the second sensor pixel layer may both be operatively connected with the single common controller, the portion of the first fingerprint sensing system may be located proximate to a first side of the apparatus, the portion of the second fingerprint sensing system may be located proximate to a second side of the apparatus opposite the first side of the apparatus, and the single common controller may be configured to cause the first sensor pixel layer to obtain a fingerprint scan from the first side of the apparatus by scanning the first sensor pixels for measured charge amounts and cause the second sensor pixel layer to obtain a fingerprint scan from the second side of the apparatus by scanning the second sensor pixels for measured charge amounts.

In some implementations of the apparatus, the single common controller may include one or more processors and a switching element that is configured to be switchable between at least a first configuration and a second configuration. In such implementations, in the first configuration, one or more first electrically conductive paths from the first sensor pixel layer may be electrically connected with the one or more processors and one or more second electrically conductive paths from the second sensor pixel layer may not be electrically connected with the one or more processors, and, in the second configuration, the one or more second electrically conductive paths from the second sensor pixel layer may be electrically connected with the one or more processors and the one or more first electrically conductive paths from the first sensor pixel layer may not be electrically connected with the one or more processors. In such implementations, the switching element may be configured to transition between the first configuration and the second configuration responsive to receipt of one or more control signals.

In some implementations of the apparatus, the one or more processors may be a single processor.

In some implementations of the apparatus, the one or more processors may be provided on a single die.

In some implementations of the apparatus, the apparatus may further include a first display layer, a second display layer, a first cover glass, and a second cover glass. In such implementations, the first display layer may be interposed between the first cover glass and the first sensor pixel layer, the second display layer may be interposed between the second cover glass and the second sensor pixel layer, and the first display layer and the second display layer may both be interposed between the first cover glass and the second cover glass.

In some implementations of the apparatus, the apparatus may be a mobile communications device.

In some implementations, a method may be provided that includes causing a portion of a first ultrasonic fingerprint sensing system including a first sensor pixel layer, a first piezoelectric layer, and a first electrode layer to generate a first ultrasonic wave, in which the first ultrasonic fingerprint sensing system is part of an apparatus, causing a portion of a second ultrasonic fingerprint sensing system including a second sensor pixel layer, a second piezoelectric layer, and a second electrode layer to generate a second ultrasonic wave, in which the second ultrasonic fingerprint sensing system is also part of the apparatus, and causing a single common controller to cause first sensor pixels in the first sensor pixel layer to measure amounts of charge generated within the first piezoelectric layer responsive to transit of reflected portions of the first ultrasonic wave therethrough, cause second sensor pixels in the second sensor pixel layer to measure amounts of charge generated within the second piezoelectric layer responsive to transit of reflected portions of the second ultrasonic wave therethrough, obtain a fingerprint scan from a first side of the apparatus by scanning the first sensor pixels for measured charge amounts, and obtain a fingerprint scan from a second side of the apparatus opposite the first side of the apparatus by scanning the second sensor pixels for measured charge amounts. In such implementations, the first and second ultrasonic fingerprint sensing systems may be in an apparatus, at least the first sensor pixel layer and the second sensor pixel layer may both be operatively connected with the single common controller, the portion of the first fingerprint sensing system may be located proximate to the first side of the apparatus, and the portion of the second fingerprint sensing system may be located proximate to the second side of the apparatus opposite the first side of the apparatus.

In some implementations of the method, the single common controller may include one or more processors and a switching element that is configured to be switchable between at least a first configuration and a second configuration. In such implementations, in the first configuration, one or more first electrically conductive paths from the first sensor pixel layer may be electrically connected with the one or more processors and one or more second electrically conductive paths from the second sensor pixel layer may not be electrically connected with the one or more processors, in the second configuration, the one or more second electrically conductive paths from the second sensor pixel layer may be electrically connected with the one or more processors and the one or more first electrically conductive paths from the first sensor pixel layer may not be electrically connected with the one or more processors, and the switching element may be configured to transition between the first configuration and the second configuration responsive to receipt of one or more control signals.

In some implementations of the method, the one or more processors may be a single processor.

In some implementations of the method, the one or more processors may be provided on a single die.

In some implementations of the method, the apparatus may be a mobile communications device.

In some implementations, an apparatus may be provided. The apparatus may include a means for generating one or more ultrasonic waves, a first means for detecting reflected ultrasonic waves, a second means for detecting reflected ultrasonic waves, and a single common controller. In such implementations, the first means for detecting reflected ultrasonic waves and second means for detecting reflected ultrasonic waves may both be operatively connected with the single common controller, the first means for detecting reflected ultrasonic waves may be located proximate to a first side of an apparatus, the second means for detecting reflected ultrasonic waves may be located proximate to a second side of the apparatus opposite the first side of the apparatus, and the single common controller may be configured to cause the first means for detecting reflected ultrasonic waves to obtain a fingerprint scan from the first side of the apparatus and cause the second means for detecting reflected ultrasonic waves to obtain a fingerprint scan from the second side of the apparatus.

In some implementations of the apparatus, the single common controller may include one or more processors and a switching element that is configured to be switchable between at least a first configuration and a second configuration. In such implementations, in the first configuration, one or more first electrically conductive paths from the first means for detecting reflected ultrasonic waves may be electrically connected with the one or more processors and one or more second electrically conductive paths from the second means for detecting reflected ultrasonic waves may not be electrically connected with the one or more processors, in the second configuration, one or more second electrically conductive paths from the second means for detecting reflected ultrasonic waves may be electrically connected with the one or more processors and the one or more first electrically conductive paths from the first means for detecting reflected ultrasonic waves may not be electrically connected with the one or more processors, and the switching element may be configured to transition between the first configuration and the second configuration responsive to receipt of one or more control signals.

In some implementations of the apparatus, the one or more processors may be a single processor.

In some implementations of the apparatus, the one or more processors may be provided on a single die.

In some implementations of the apparatus, the apparatus may further include a first display means, a second display means, a first cover means, and a second cover means. In such implementations, the first display means may be interposed between the first cover means and the first means for detecting reflected ultrasonic waves, the second display means may be interposed between the second cover means and the second means for detecting reflected ultrasonic waves, and the first display means and the second display means may both be interposed between the first cover means and the second cover means.

In some implementations of the apparatus, the apparatus may be a mobile communications device.

In some implementations, an apparatus may be provided that includes a controller and an ultrasonic fingerprint sensing system including a sensor pixel layer, a first piezoelectric layer, and an electrode layer. In such implementations, the sensor pixel layer may include a plurality of sensor pixels, each sensor pixel configured to, in conjunction with the electrode layer, measure an amount of charge generated within the first piezoelectric layer responsive to transit of an ultrasonic wave therethrough, the first piezoelectric layer may be positioned within the apparatus such that a first distance between the first piezoelectric layer and a first side of the apparatus is less than a second distance between the first piezoelectric layer and a second side of the apparatus that is opposite the first side of the apparatus, and the controller may be configured to obtain a fingerprint scan by causing the ultrasonic fingerprint sensing system to generate an ultrasonic wave during a first time period starting at a first time, selecting a selected delay period from a first delay period associated with the first side of the apparatus and a second delay period different from the first delay period and associated with the second side of the apparatus, causing the sensor pixels to measure amounts of charges generated within the first piezoelectric layer during a second time period starting at a second time that is selected at least based on the first time and the selected delay period, and generating the fingerprint scan based on the amounts of charge measured by the sensor pixels during the second time period.

In some implementations of the apparatus, the apparatus may further include an acoustically conductive spacer that is interposed between the first piezoelectric layer and the second side of the apparatus.

In some implementations of the apparatus, the apparatus may further include an acoustically conductive compliant layer that is also interposed between the first piezoelectric layer and the second side of the apparatus.

In some implementations of the apparatus, the first delay period may be less than the second delay period.

In some implementations of the apparatus, the apparatus may further include a first display layer, a second display layer, a first cover glass, and a second cover glass. In such implementations, the first display layer may be interposed between the first cover glass and the first sensor pixel layer, the second display layer may be interposed between the second cover glass and the first sensor pixel layer, the first display layer and the second display layer may both be interposed between the first cover glass and the second cover glass, the first cover glass may be part of the first side of the apparatus, and the second cover glass may be part of the second side of the apparatus.

In some implementations of the apparatus, the apparatus may further include a first touch-sensing system configured to detect touch inputs to the first cover glass and a second touch-sensing system configured to detect touch inputs to the second cover glass. In such implementations, the controller may be further configured to obtain touch input information from the first touch-sensing system and the second touch-sensing system in conjunction with obtaining the fingerprint scan, and select the first delay period or the second delay period as the selected delay period based, at least in part, on the touch input information indicating a touch event on the first side of the apparatus or the second side of the apparatus, respectively.

In some implementations, a method may be provided that includes causing an ultrasonic fingerprint sensing system of an apparatus to generate an ultrasonic wave during a first time period starting at a first time, selecting a selected delay period from a first delay period associated with a first side of the apparatus and a second delay period different from the first delay period and associated with a second side of the apparatus opposite the first side of the apparatus, causing sensor pixels of the ultrasonic fingerprint sensing system to measure amounts of charge generated within a first piezoelectric layer during a second time period starting at a second time that is selected at least based on the first time and the selected delay period, and generating a fingerprint scan based on the amounts of charge measured by sensor pixels of the ultrasonic fingerprint sensing system during the second time period.

In some implementations of the method, the ultrasonic fingerprint sensing system may be separated from the second side of the apparatus by an acoustically conductive spacer that is interposed between the ultrasonic fingerprint sensing system and the second side of the apparatus.

In some implementations of the method, the apparatus may also include an acoustically conductive compliant layer that is also interposed between the ultrasonic fingerprint sensing system and the second side of the apparatus.

In some implementations of the method, the first delay period may be less than the second delay period.

In some implementations of the method, the apparatus further includes a first display layer, a second display layer, a first cover glass, and a second cover glass, and the first display layer may be interposed between the first cover glass and the first sensor pixel layer, the second display layer may be interposed between the second cover glass and the first sensor pixel layer, the first display layer and the second display layer may both be interposed between the first cover glass and the second cover glass, the first cover glass may be part of the first side of the apparatus, and the second cover glass may be part of the second side of the apparatus.

In some implementations of the method, the apparatus may further include a first touch-sensing system configured to detect touch inputs to the first cover glass and a second touch-sensing system configured to detect touch inputs to the second cover glass. In such implementations, the method may further include obtaining touch input information from a first touch-sensing system configured to detect touch inputs to the first cover glass and from a second touch-sensing system configured to detect touch inputs to the second cover glass in conjunction with obtaining the fingerprint scan and selecting the first delay period or the second delay period as the selected delay period based, at least in part, on the touch input information indicating a touch event on the first side of the apparatus or the second side of the apparatus, respectively.

In some implementations, an apparatus may be provided that includes an ultrasonic fingerprint sensing means and a controller. In such implementations, the ultrasonic fingerprint sensing means may be positioned within the apparatus such that a first distance between the ultrasonic fingerprint sensing means and a first side of the apparatus is less than a second distance between the ultrasonic fingerprint sensing means and a second side of the apparatus that is opposite the first side of the apparatus, and the controller may be configured to obtain a fingerprint scan by causing the ultrasonic fingerprint sensing means to generate an ultrasonic wave during a first time period starting at a first time, selecting a selected delay period from a first delay period associated with the first side of the apparatus and a second delay period different from the first delay period and associated with the second side of the apparatus, and causing the ultrasonic fingerprint sensing means to obtain a fingerprint scan during a second time period starting at a second time that is selected at least based on the first time and the selected delay period.

In some implementations of the apparatus, the apparatus may further include an acoustically conductive spacer that is interposed between the ultrasonic fingerprint sensing means and the second side of the apparatus.

In some implementations of the apparatus, the apparatus may further include an acoustically conductive compliant layer that is also interposed between the ultrasonic fingerprint sensing means and the second side of the apparatus.

In some implementations of the apparatus, the first delay period may be less than the second delay period.

In some implementations of the apparatus, the apparatus may further include a first display means, a second display means, a first cover means, and a second cover means. In such implementations, the first display means may be interposed between the first cover means and the ultrasonic fingerprint sensing means, the second display means may be interposed between the second cover means and the ultrasonic fingerprint sensing means, the first display means and the second display means may both be interposed between the first cover means and the second cover means, the first cover means may be part of the first side of the apparatus, and the second cover means may be part of the second side of the apparatus.

In some implementations of the apparatus, the apparatus may further include a first touch-sensing means configured to detect touch inputs to the first cover means and a second touch-sensing means configured to detect touch inputs to the second cover means. In such implementations, the controller may further be configured to obtain touch input information from the first touch-sensing means and the second touch-sensing means in conjunction with obtaining the fingerprint scan, and select the first delay period or the second delay period as the selected delay period based, at least in part, on the touch input information indicating a touch event on the first side of the apparatus or the second side of the apparatus, respectively.

In some implementations, a non-transitory, computer-readable medium may be provided that stores computer-executable instructions which, when executed by one or more processors, cause the one or more processors to: cause ultrasonic waves to be generated by a first piezoelectric layer of an apparatus; cause a first ultrasonic wave of the ultrasonic waves to pass through a first acoustic masking layer of the apparatus and to propagate towards a first side of the apparatus; cause a second ultrasonic wave of the ultrasonic waves to pass through a second acoustic masking layer of the apparatus and to propagate towards a second side of the apparatus opposite the first side of the apparatus; cause first sensor pixels in a first sensor pixel layer of the apparatus to obtain first fingerprint scan data based on reflections of the first ultrasonic wave from the first side of the apparatus; and cause second sensor pixels in a second sensor pixel layer of the apparatus to obtain second fingerprint scan data based on reflections of the second ultrasonic wave from the second side of the apparatus. In such an apparatus, for example, the first sensor pixel layer, the first acoustic masking layer, the first piezoelectric layer, the second acoustic masking layer, and the second sensor pixel layer may be arranged in a stacked configuration along a first axis, the first acoustic masking layer may include a repeating first pattern of first high-acoustic-impedance (HAI) regions and first low-acoustic-impedance (LAI) regions, the second acoustic masking layer may include a repeating second pattern of second HAI regions and second LAI regions, the first HAI regions may have a higher acoustic impedance than the first LAI regions, the second HAI regions may have a higher acoustic impedance than the second LAI regions, and, when viewed along the first axis, the first HAI regions may overlap the second LAI regions, the second HAI regions may overlap the first LAI regions, the first LAI regions may overlap the second HAI regions, and the second LAI regions may overlap the first HAI regions.

In some such implementations, the apparatus may be configured such that the first LAI regions are entirely overlapped by the second HAI regions when viewed along the first axis and the second LAI regions are entirely overlapped by the first HAI regions when viewed along the first axis.

In some implementations of the non-transitory, computer-readable medium, the apparatus may be configured such that each first LAI region is smaller in footprint when viewed along the first axis than the second HAI region that entirely overlaps it and each second LAI region is smaller in footprint when viewed along the first axis than the first HAI region that entirely overlaps it.

In some implementations of the non-transitory, computer-readable medium, the apparatus may be configured such that two first reference planes that are perpendicular to, and spaced apart by a first distance along, the first axis may be defined by opposing surfaces of the first LAI regions, the first HAI regions may be provided by first gaps located between the first reference planes, and the first gaps may not have any solid or liquid material in them.

In some implementations of the non-transitory, computer-readable medium, the apparatus may be configured such that the first LAI regions do not have the first gaps.

In some implementations of the non-transitory, computer-readable medium, the apparatus may be configured such that two second reference planes that are perpendicular to, and spaced apart by a second distance along, the first axis are defined by opposing surfaces of the second LAI regions, and the second HAI regions are provided by second gaps located between the second reference planes.

In some implementations of the non-transitory, computer-readable medium, the apparatus may be configured such that the second LAI regions do not have the second gaps.

In some implementations of the non-transitory, computer-readable medium, the apparatus may be configured such that two second reference planes that are perpendicular to, and spaced apart by a second distance along, the first axis are defined by opposing surfaces of the second LAI regions, the second HAI regions are provided by second gaps located between the second reference planes, and the second LAI regions do not have the second gaps.

In some implementations of the non-transitory, computer-readable medium, the apparatus may be configured such that the first pattern and the second pattern are both checkerboard patterns.

In some implementations of the non-transitory, computer-readable medium, the apparatus may be configured such that each first LAI region includes a contiguous material in between the first reference planes. In some such implementations of the non-transitory, computer-readable medium, the apparatus may be configured such that the contiguous material includes copper or aluminum.

In some implementations of the non-transitory, computer-readable medium, the apparatus may be configured such that each first LAI region includes a contiguous material in between the first reference planes and each second LAI region includes a contiguous material in between the second reference planes. In some such implementations of the non-transitory, computer-readable medium, the apparatus may be configured such that the contiguous material includes copper or aluminum.

In some implementations of the non-transitory, computer-readable medium, the apparatus may be configured such that the first LAI regions of the first acoustic masking layer provide first electrically conductive paths between the first sensor pixel layer and the first piezoelectric layer, the second LAI regions of the second acoustic masking layer provide second electrically conductive paths between the second sensor pixel layer and the first piezoelectric layer, the first sensor pixels each include a circuit that is configured to electrically switch the first electrically conductive path associated therewith between serving as a sensor pixel electrode and serving as a first ultrasonic generator electrode, and the second sensor pixels each include a circuit that is configured to electrically switch the second electrically conductive path associated therewith between serving as a sensor pixel electrode and serving as a second ultrasonic generator electrode.

In some implementations of the non-transitory, computer-readable medium, the apparatus may be configured such that each of the first LAI regions and the second LAI regions is electrically coupled with an electrode extension region that extends into an adjoining one of the first HAI regions and the second HAI regions, respectively, and each of the electrode extension regions provides an electrically conductive path between the first piezoelectric layer and the first or second LAI region electrically coupled thereto.

In some implementations of the non-transitory, computer-readable medium, the non-transitory, computer-readable medium may further store additional computer-executable instructions that, when executed by the one or more processors, cause the one or more processors to receive the reflections of the first ultrasonic wave in a second piezoelectric layer; receive the reflections of the second ultrasonic wave in a third piezoelectric layer; cause the first sensor pixels in the first sensor pixel layer of the apparatus to obtain the first fingerprint scan data by measuring, using a first sensor electrode layer, charges generated within the second piezoelectric layer; and cause the second sensor pixels in the second sensor pixel layer of the apparatus to obtain the second fingerprint scan data by measuring, using a second sensor electrode layer, charges generated within the third piezoelectric layer. In such implementations, the apparatus may be configured such that the first piezoelectric layer is interposed between the first sensor electrode layer and the second sensor electrode layer, the second piezoelectric layer is interposed between the first sensor pixel layer and the first sensor electrode layer, the third piezoelectric layer is interposed between the second sensor pixel layer and the second sensor electrode layer, the first sensor pixel layer and the first sensor electrode layer are configured such that the first sensor pixels measure electrical charges that are generated within the second piezoelectric layer responsive to passage of an ultrasonic wave through the second piezoelectric layer, and the second sensor pixel layer and the second sensor electrode layer are configured such that the second sensor pixels measure electrical charges that are generated within the third piezoelectric layer responsive to passage of an ultrasonic wave through the third piezoelectric layer.

In some implementations of the non-transitory, computer-readable medium, the apparatus may be configured such that In some implementations of the non-transitory, computer-readable medium, the computer-executable instructions to cause the ultrasonic waves to be generated by the first piezoelectric layer of the apparatus may include computer-executable instructions to cause the one or more processors to cause an electrical potential to be applied across the first piezoelectric layer by a first ultrasonic generator electrode and a second ultrasonic generator electrode, wherein, in the apparatus, the first piezoelectric layer is interposed between the first ultrasonic generator electrode and the second ultrasonic generator electrode.

In some implementations of the non-transitory, computer-readable medium, the apparatus may be configured such that the first acoustic masking layer is interposed between the first sensor electrode layer and the first piezoelectric layer, the second acoustic masking layer is interposed between the second sensor electrode layer and the first piezoelectric layer, the first acoustic masking layer forms an electrically conductive path between the first sensor electrode layer and the first piezoelectric layer, and the second acoustic masking layer forms an electrically conductive path between the second sensor electrode layer and the first piezoelectric layer.

In some implementations of the non-transitory, computer-readable medium, the apparatus may be configured such that the first acoustic masking layer is interposed between the first sensor electrode layer and the second piezoelectric layer, the second acoustic masking layer is interposed between the second sensor electrode layer and the third piezoelectric layer, the first acoustic masking layer forms an electrically conductive path between the first sensor electrode layer and the second piezoelectric layer, and the second acoustic masking layer forms an electrically conductive path between the second sensor electrode layer and the third piezoelectric layer.

In some implementations of the non-transitory, computer-readable medium, the non-transitory, computer-readable medium may further store additional computer-executable instructions that, when executed by the one or more processors, cause the one or more processors to cause first graphical content to be displayed on a first display layer and through a first cover glass and cause second graphical content to be displayed on a second display layer and through a second cover glass. In such implementations, the apparatus may be configured such that the first display layer is interposed between the first cover glass and the first sensor pixel layer, the second display layer is interposed between the second cover glass and the second sensor pixel layer, and the first display layer and the second display layer are both interposed between the first cover glass and the second cover glass.

In some implementations of the non-transitory, computer-readable medium, the apparatus may be a mobile communications device.

In some implementations, a non-transitory, computer-readable medium may be provided that stores computer-executable instructions which, when executed by one or more processors, cause the one or more processors to: cause a portion of a first ultrasonic fingerprint sensing system including a first sensor pixel layer, a first piezoelectric layer, and a first electrode layer to generate a first ultrasonic wave, wherein the first ultrasonic fingerprint sensing system is part of an apparatus; cause a portion of a second ultrasonic fingerprint sensing system including a second sensor pixel layer, a second piezoelectric layer, and a second electrode layer to generate a second ultrasonic wave, wherein the second ultrasonic fingerprint sensing system is also part of the apparatus; and cause a single common controller to cause first sensor pixels in the first sensor pixel layer to measure amounts of charge generated within the first piezoelectric layer responsive to transit of reflected portions of the first ultrasonic wave therethrough, cause second sensor pixels in the second sensor pixel layer to measure amounts of charge generated within the second piezoelectric layer responsive to transit of reflected portions of the second ultrasonic wave therethrough, obtain a fingerprint scan from a first side of the apparatus by scanning the first sensor pixels for measured charge amounts, and obtain a fingerprint scan from a second side of the apparatus opposite the first side of the apparatus by scanning the second sensor pixels for measured charge amounts. Such implementations may be provided for an apparatus that includes the first and second ultrasonic fingerprint sensing systems and such that at least the first sensor pixel layer and the second sensor pixel layer are both operatively connected with the single common controller, the portion of the first fingerprint sensing system is located proximate to the first side of the apparatus, and the portion of the second fingerprint sensing system is located proximate to the second side of the apparatus opposite the first side of the apparatus.

In some implementations of the non-transitory, computer-readable medium, the apparatus may be configured such that the single common controller includes one or more processors and a switching element that is configured to be switchable between at least a first configuration and a second configuration. In such implementations, in the first configuration, one or more first electrically conductive paths from the first sensor pixel layer may be electrically connected with the one or more processors and one or more second electrically conductive paths from the second sensor pixel layer may not be electrically connected with the one or more processors, in the second configuration, the one or more second electrically conductive paths from the second sensor pixel layer may be electrically connected with the one or more processors and the one or more first electrically conductive paths from the first sensor pixel layer may not be electrically connected with the one or more processors, the switching element may be configured to transition between the first configuration and the second configuration responsive to receipt of one or more control signals, and the non-transitory, computer-readable medium may further store additional computer-executable instructions which, when executed by the one or more processors, further cause the one or more processors to cause the one or more control signals to be sent to the switching element.

In some implementations of the non-transitory, computer-readable medium, the apparatus may be configured such that the one or more processors is a single processor.

In some implementations of the non-transitory, computer-readable medium, the apparatus may be configured such that the one or more processors are provided on a single die.

In some implementations of the non-transitory, computer-readable medium, the apparatus may be a mobile communications device.

In some implementations, a non-transitory, computer-readable medium may be provided that stores computer-executable instructions which, when executed by one or more processors, cause the one or more processors to: cause an ultrasonic fingerprint sensing system of an apparatus to generate an ultrasonic wave during a first time period starting at a first time; select a selected delay period from a first delay period associated with a first side of the apparatus and a second delay period different from the first delay period and associated with a second side of the apparatus opposite the first side of the apparatus; cause sensor pixels of the ultrasonic fingerprint sensing system to measure amounts of charge generated within a first piezoelectric layer during a second time period starting at a second time that is selected at least based on the first time and the selected delay period; and generate a fingerprint scan based on the amounts of charge measured by sensor pixels of the ultrasonic fingerprint sensing system during the second time period.

In some implementations of the non-transitory, computer-readable medium, the apparatus may be configured such that the ultrasonic fingerprint sensing system is separated from the second side of the apparatus by an acoustically conductive spacer that is interposed between the ultrasonic fingerprint sensing system and the second side of the apparatus.

In some implementations of the non-transitory, computer-readable medium, the apparatus may be configured such that the apparatus also includes an acoustically conductive compliant layer that is also interposed between the ultrasonic fingerprint sensing system and the second side of the apparatus.

In some implementations of the non-transitory, computer-readable medium, the first delay period may be less than the second delay period.

In some implementations of the non-transitory, computer-readable medium, the apparatus may be configured such that the apparatus further includes a first display layer; a second display layer; a first cover glass; and a second cover glass. In such an implementation, the first display layer may be interposed between the first cover glass and the sensor pixels, the second display layer may be interposed between the second cover glass and the sensor pixels, the first display layer and the second display layer may both be interposed between the first cover glass and the second cover glass, the first cover glass may be part of the first side of the apparatus, and the second cover glass may be part of the second side of the apparatus.

In some implementations of the non-transitory, computer-readable medium, the apparatus may be configured such that the apparatus further includes a first touch-sensing system configured to detect touch inputs to the first cover glass and a second touch-sensing system configured to detect touch inputs to the second cover glass. In such an implementation, the non-transitory, computer-readable medium may further store additional computer-executable instructions which, when executed by the one or more processors, further cause the one or more processors to: obtain touch input information from a first touch-sensing system configured to detect touch inputs to the first cover glass and from a second touch-sensing system configured to detect touch inputs to the second cover glass in conjunction with obtaining the fingerprint scan, and select the first delay period or the second delay period as the selected delay period based, at least in part, on the touch input information indicating a touch event on the first side of the apparatus or the second side of the apparatus, respectively.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
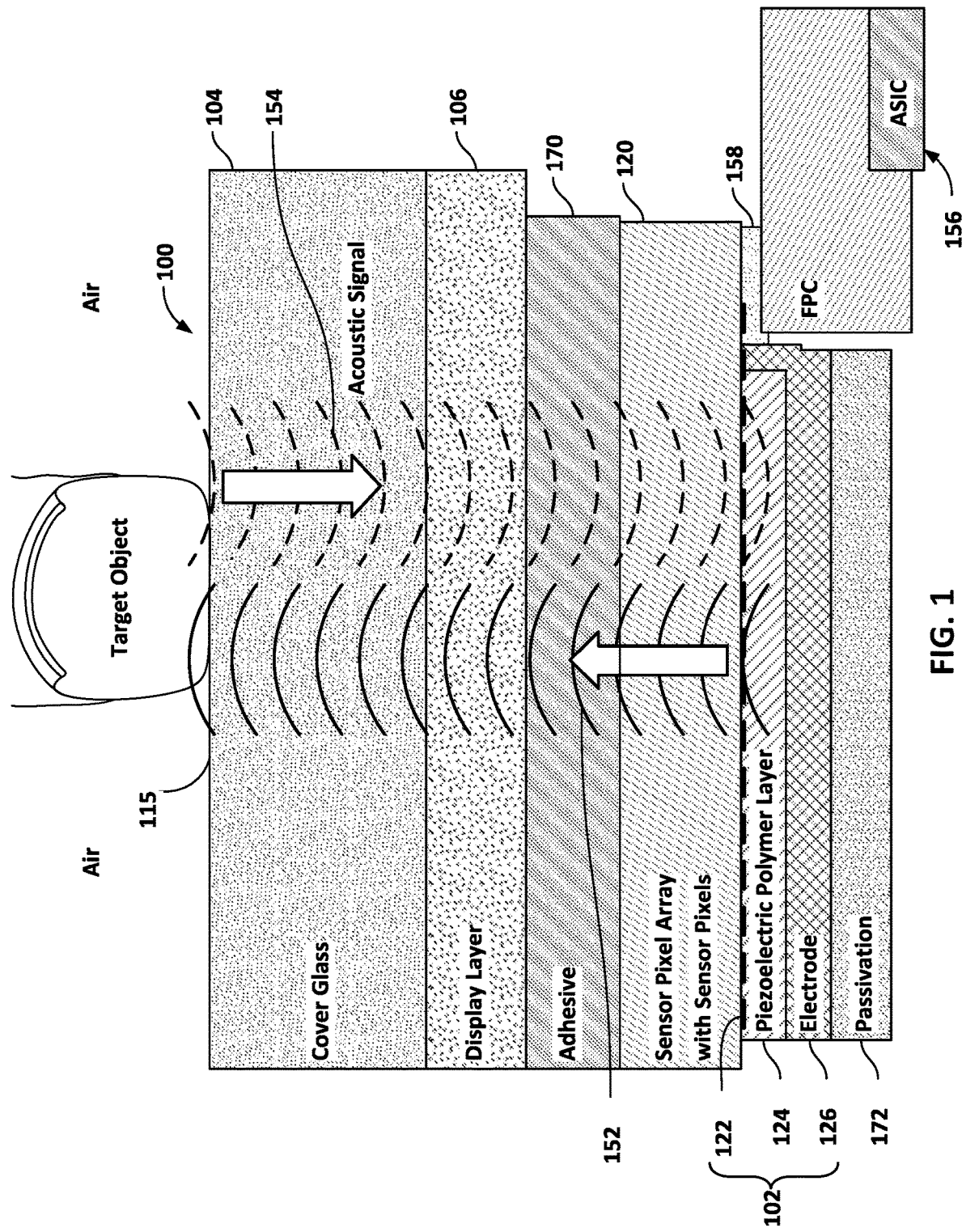
FIG. 1 shows example components of an example ultrasonic fingerprint sensing system according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, Bluetooth® devices, personal data assistants (PDAs), wireless electronic mail receivers, hand-held or portable computers, netbooks, notebooks, smartbooks, tablets, global positioning system (GPS) receivers/navigators, cameras, digital media players (such as MP3 players), camcorders, game consoles, clocks, calculators, television monitors, flat panel displays, electronic reading devices (e.g., e-readers), mobile health devices, computer monitors, electronic photographs, stereo systems, DVD players, CD players, VCRs, radios, portable memory chips, parking meters, aesthetic structures (such as display of images on a piece of jewelry or clothing) and a variety of EMS devices. The teachings herein also may be used in applications such as, but not limited to, parts of consumer electronics products, liquid crystal devices, and electrophoretic devices. Thus, the teachings are not intended to be limited to the implementations depicted solely in the Figures, but instead have wide applicability as will be readily apparent to one having ordinary skill in the art.

Using fingerprints for authentication, e.g., to allow a particular user access to a particular device or to authenticate a transaction performed with a device is now commonplace. As used herein, the term "finger" may refer to any digit of the hand, including a thumb. Accordingly, a thumbprint is to be understood to also constitute a "fingerprint" for the purposes of this disclosure. Similarly, reference to "fingers" is to be understood to be inclusive of "fingers and thumbs" for the purpose of this disclosure Thus, for example, reference to "all ten of a person's fingers" is to be understood to refer to all ten digits of both of the person's hands.

One particular type of fingerprint sensor that may be used for fingerprint authentication purposes is an ultrasonic fingerprint sensor. Existing ultrasonic fingerprint sensors include a stack of multiple layers that can be placed, for example, underneath a display of a device and used to read fingerprints through the display of the device. Such ultrasonic fingerprint sensors may include a piezoelectric transmitter layer, a piezoelectric sensor material layer, and a sensor pixel layer. In some such ultrasonic fingerprint sensors, the piezoelectric transmitter layer and the piezoelectric sensor material layer may be the same layer of piezoelectric material, e.g., the same piezoelectric material may be used to both generate ultrasonic waves responsive to application of an electrical potential across the material and to convert reflected ultrasonic waves received by the piezoelectric material into an electrical potential that can be measured by the sensor pixel layer. Ultrasonic fingerprint sensors are particularly well-suited for integration into mobile electronics since they are able to obtain fingerprint scans through a variety of different materials—including, for example, device housings and/or device display panels. In particular, ultrasonic fingerprint sensors may be located beneath the display of a mobile device, both hiding the ultrasonic fingerprint sensor from view and allowing the display to make use of the area in which the fingerprint sensor would be located if not placed beneath the display.

Existing ultrasonic fingerprint sensors, however, are designed to be unidirectional in nature, e.g., they only obtain fingerprints from a single surface of an apparatus. This is generally not problematic since portable devices that typically incorporate ultrasonic fingerprint sensors are generally intended to be actively interacted with by users in a limited set of orientations in which the display of the apparatus is facing towards the user. For example, such devices are typically interacted with by users in one of four different orientations: portrait, reverse portrait, landscape, and reverse landscape—in each such orientation, however, the display of the device is facing towards the user. In such devices, it is thus generally known (both by the controller of the device and by the user) from which surface of the device a fingerprint scan may be obtained. For example, if an ultrasonic fingerprint sensor is located beneath the display of an apparatus, then the controller of the device, for example, may instruct the user (via a graphical prompt) to place a fingertip on the display or in a particular location on the display in order to perform a fingerprint scan. Alternatively, if the device instead has an ultrasonic fingerprint sensor that is configured to obtain fingerprint scans through the device housing on the side of the device opposite the display, the controller of the device may then instruct the user to place a fingertip on the back side of the device in order to perform a fingerprint scan. Moreover, the users of such devices will learn which side of the device has the fingerprint scan functionality and will thus know on which surface of the device to place a finger to perform a fingerprint scan.

However, recent advances in consumer electronics have seen the introduction of mobile devices, e.g., smartphones, in which two opposing sides of such devices have displays. In some instances, such devices may even have wrap-around or partially wrapped-around displays such that three, four, or more sides of the device may have a capability to display graphics responsive to commands from a graphical processing unit. Such devices may offer users the opportunity to use the device in a larger variety of different orientations, e.g., portrait, reverse portrait landscape, and reverse landscape with a first side of the device having a display facing the user, as well as similar orientations with the device flipped over so that a second side of the device opposite the first side is facing the user. Because of this flexibility in potential device orientation, there may be uncertainty as to from which surface of the device a fingerprint scan is to be obtained, e.g., by the controller of the device and/or the user of the device.

Disclosed herein are various bi-directional ultrasonic fingerprint sensor systems that may be used to provide fingerprint scanning capability to surfaces on an apparatus lying on opposite sides of the fingerprint sensor systems. Such bi-directional ultrasonic fingerprint sensor systems may allow for fingerprint scans to be obtained from surfaces on either side of the ultrasonic fingerprint sensor. Such fingerprint scans may be obtained, in some implementations, simultaneously, although in other implementations, such fingerprint scans may be obtained near-simultaneously or on either of two opposite-facing surfaces of the device. Since such bi-directional ultrasonic fingerprint sensor systems are able to obtain fingerprint scans from either or both sides of a device, such devices may be configured to adapt to whatever orientation they are being used in by the user. For example, if the device is displaying a software application that requires fingerprint authentication to be provided to a particular region of the graphical user interface shown on the side of the device that is being actively used by the user, the device may cause a bi-directional ultrasonic fingerprint sensor in such a device to obtain a fingerprint scan from that region of the display that is being used to display that graphical user interface.

Several different implementations of bi-directional ultrasonic fingerprint sensors are discussed herein. In one such implementation, such a bi-directional ultrasonic fingerprint sensor system may include two sets of piezoelectric transmitter layers, piezoelectric sensor material layers, and sensor pixel layers, with each set of piezoelectric transmitter, piezoelectric sensor material, and sensor pixel layers being arranged so as to obtain fingerprint scan information from an opposing side of the device. In such implementations, the two sets of piezoelectric transmitter, piezoelectric sensor material, and sensor pixel layers may be connected with a common application-specific integrated circuit, processor, or other electronic components that is or are configured to control operation of the ultrasonic fingerprint sensors.

In another implementation discussed herein, a device may include an ultrasonic fingerprint sensor that has a piezoelectric transmitter, piezoelectric sensor material, and sensor pixel layers. Such layers may be placed adjacent to one side of the device, e.g., adjacent to a display layer of the device, but may also have a low-acoustic-impedance path extending between the piezoelectric transmitter, piezoelectric sensor material, and sensor pixel layers and the opposing side of the device. Fingerprint scans from either side of such a device may be obtained using range-gate techniques that may allow reflected ultrasonic waves from one side of the device or the other to be detected without including detecting reflected ultrasonic waves from the other side of the device.

In yet other implementations discussed herein, a device may have a layer of piezoelectric material used to generate an ultrasonic wave or pulse, as well as two sensor pixel arrays located such that the layer of piezoelectric material is interposed therebetween. Such devices may also include two acoustic masking layers, each acoustic masking layer interposed between the piezoelectric material and a different one of the sensor pixel arrays. Each acoustic masking layer may feature a pattern of high-acoustic-impedance (HAI) regions and low-acoustic-impedance (LAI) regions that are arranged such that the HAI regions in each acoustic masking layer generally align with the LAI regions in the other acoustic masking layer.

Figure 2:
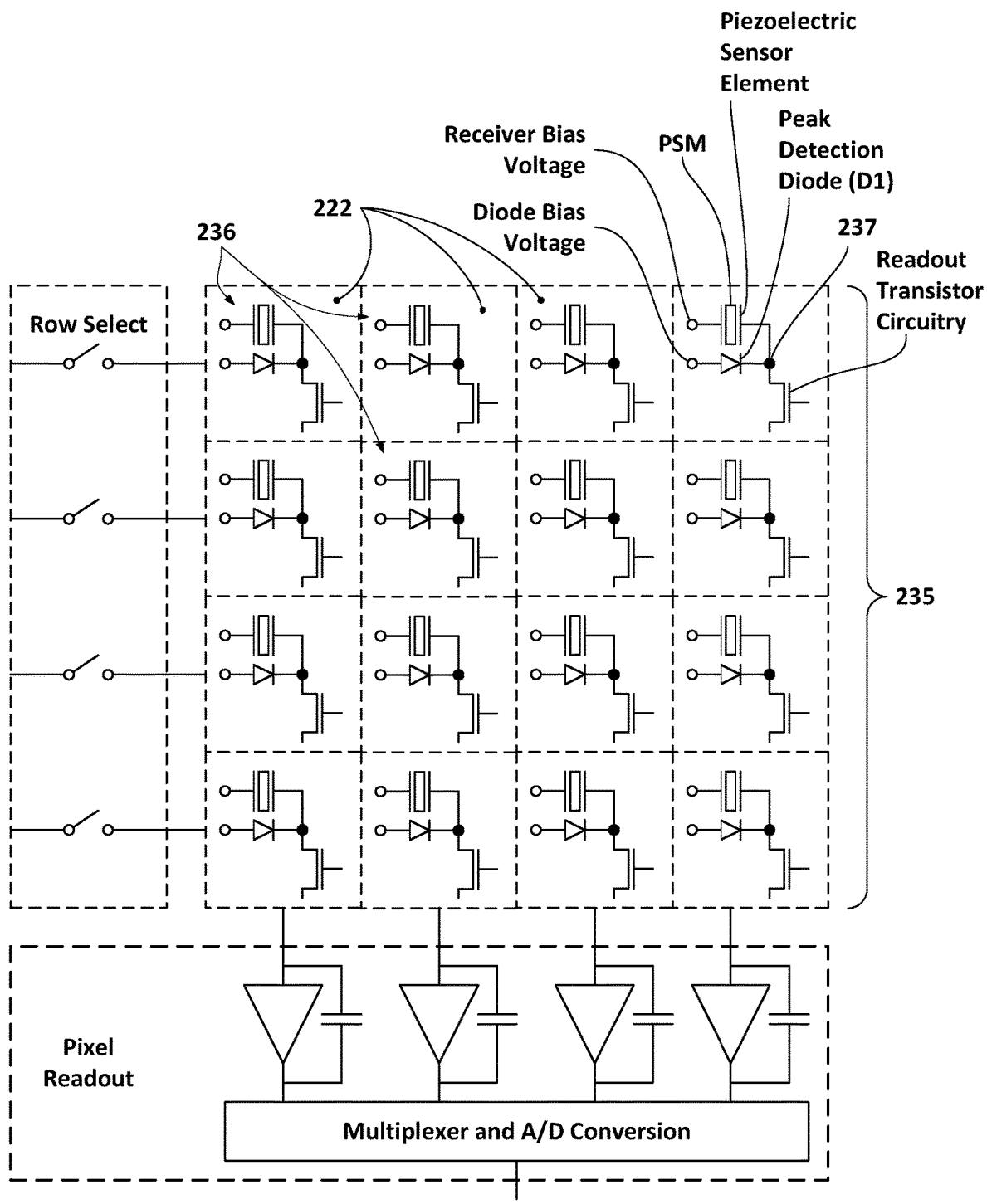
FIG. 2 representationally depicts aspects of a 4×4 pixel array of sensor pixels for an ultrasonic fingerprint sensing system.

Before discussing the above implementations, reference is made to FIGS. 1 and 2, which address various elements that may be found in an ultrasonic fingerprint sensing system.

FIG. 1 shows example components of an example ultrasonic fingerprint sensing system according to some disclosed implementations. As with other disclosed implementations, the types, number and arrangement of elements, as well as the dimensions of elements, are merely examples. According to this implementation, the ultrasonic fingerprint sensing system 102 includes a piezoelectric layer 124, an electrode layer 126 on one side of the piezoelectric layer 124 and an array of sensor pixels 122 in a sensor pixel layer 120 adjacent to a second and opposing side of the piezoelectric layer 124. In this implementation, the piezoelectric layer 124 is an ultrasonic transceiver layer that includes one or more piezoelectric polymers, i.e., the piezoelectric layer 124 may be used to alternatively generate or detect ultrasonic waves.

According to this example, the electrode layer 126 resides between a passivation layer 172 and the piezoelectric layer 124. In some examples, passivation layer 172 may include an adhesive, such as an epoxy film, a polymer layer (such as a polyethylene terephthalate (PET) layer), etc.

In this example the sensor pixel layer 120, which may also be referred to as a thin-film transistor (TFT) layer, includes a TFT substrate and circuitry for the array of sensor pixels 122. The sensor pixel layer 120 may include one or more types of metal-oxide-semiconductor field-effect transistors (MOSFET) made by depositing thin films of an active semiconductor layer as well as a dielectric layer and metallic contacts over a TFT substrate. In some examples, the TFT substrate may be a non-conductive material such as glass.

In this example, the apparatus 100 includes a display layer 106, which includes an organic light emitting diode (OLED) display in this instance. Here, the OLED display layer 106 is attached to the sensor pixel layer 120 via an adhesive layer 170.

According to this implementation, the sensor pixel layer 120, the array of sensor pixels 122, and the electrode layer 126 are electrically coupled to at least a portion of a control system 156, e.g., via a flexible printed circuit (FPC) that may be electroconductively bonded to one or more electrically conductive contacts 158 and one or the other sides of the piezoelectric layer 124.

In this example, the control system 156 is an application-specific integrated circuit (ASIC) configured to control the ultrasonic fingerprint sensing system 102 to cause one or more ultrasonic waves 152 to be generated within the piezoelectric layer 124 and propagated towards a cover glass 104. The cover glass #GOO04 may also optionally incorporate a touch-sensing system, e.g., a mutual or self-capacitance touch-sensing system, that may be used to provide input to the underlying display layer 1406 (in other implementations, a touch-sensing system may be provided as part of the display layer 1406).

According to this example, the ultrasonic wave(s) 152 are transmitted through the sensor pixel layer 120, the display layer 106, and the cover glass 104. According to this example, reflections 154 of the ultrasonic wave(s) 152 are caused by acoustic impedance contrast at (or near) the interface 115 between the outer surface of the cover glass 104 and whatever is in contact with that outer surface, which may be air or the surface of a target object, such as the ridges and valleys of a fingerprint, etc. (As used herein, the term "finger" may refer to any digit, including a thumb. Accordingly, a thumbprint will be considered a type of "fingerprint.") As shown in FIG. 1, a fingertip is pressed into contact with the outer surface of the cover glass 104.

According to some examples, the localized intensities of reflections 154 of the ultrasonic wave(s) 152, as detected by the sensor pixels 122, may be used to generate a mapping of reflected acoustic wave intensity across the sensing area of the fingerprint sensing system 102. Such a mapping may then be used to generate a fingerprint scan dataset, e.g., with locations showing higher reflected ultrasonic wave intensity corresponding to locations in which the cover glass 104 is in contact with air and locations showing lower reflected ultrasonic wave intensity corresponding to locations which the cover glass 104 is in contact with a solid object, e.g., a person's dermis/fingerprint ridges. In some such implementations, ultrasonic signals that are used by the control system 156 for fingerprint-based authentication may be based on reflections 154 from a cover glass 104/finger interface 115 that are detected by the array of sensor pixels 122.

FIG. 2 representationally depicts aspects of a 4×4 pixel array of sensor pixels 222 for an ultrasonic fingerprint sensing system. Each sensor pixel 222 may be, for example, associated with a local region of piezoelectric sensor material (PSM) (e.g., as provided by the piezoelectric layer discussed above), a peak detection diode (D1) and a readout transistor; many or all of these elements may be formed on or in a substrate to form the sensor pixel circuits 236. In practice, the local region of piezoelectric sensor material of each sensor pixel 222 may transduce received ultrasonic energy into electrical charges. The peak detection diode D1 may register the maximum amount of charge detected in the local region of piezoelectric sensor material PSM. Each row of the sensor pixel array 235 may then be scanned, e.g., through a row select mechanism, a gate driver, or a shift register, and the readout transistor for each column may be triggered to allow the magnitude of the peak charge for each sensor pixel 222 to be read by additional circuitry, e.g., a multiplexer and an A/D converter. Each sensor pixel circuit 236 may include one or more TFTs to allow gating, addressing, and resetting of the associated sensor pixel 222.

Each sensor pixel circuit 236 may provide information about a small portion of the object detected by the ultrasonic sensor system. While, for convenience of illustration, the example shown in FIG. 2 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection or the intended area in which fingerprint detection is to potentially be performed. For example, the detection area may range from about 5 mm×5 mm for a single finger to about 3 inches×3 inches for four fingers. Smaller and larger areas, including square, rectangular and non-rectangular geometries, may be used as appropriate for the target object.

While the above discussion provides information on general operational concepts relating to ultrasonic fingerprint sensors, the following discussions explore various particular implementations of ultrasonic fingerprint sensors disclosed herein. The apparatuses featured in the discussions below may, for example, be part of or may be mobile communications devices, e.g., smartphones, tablet computers, etc., or other devices.

Shared Controller Implementations

Figure 3:
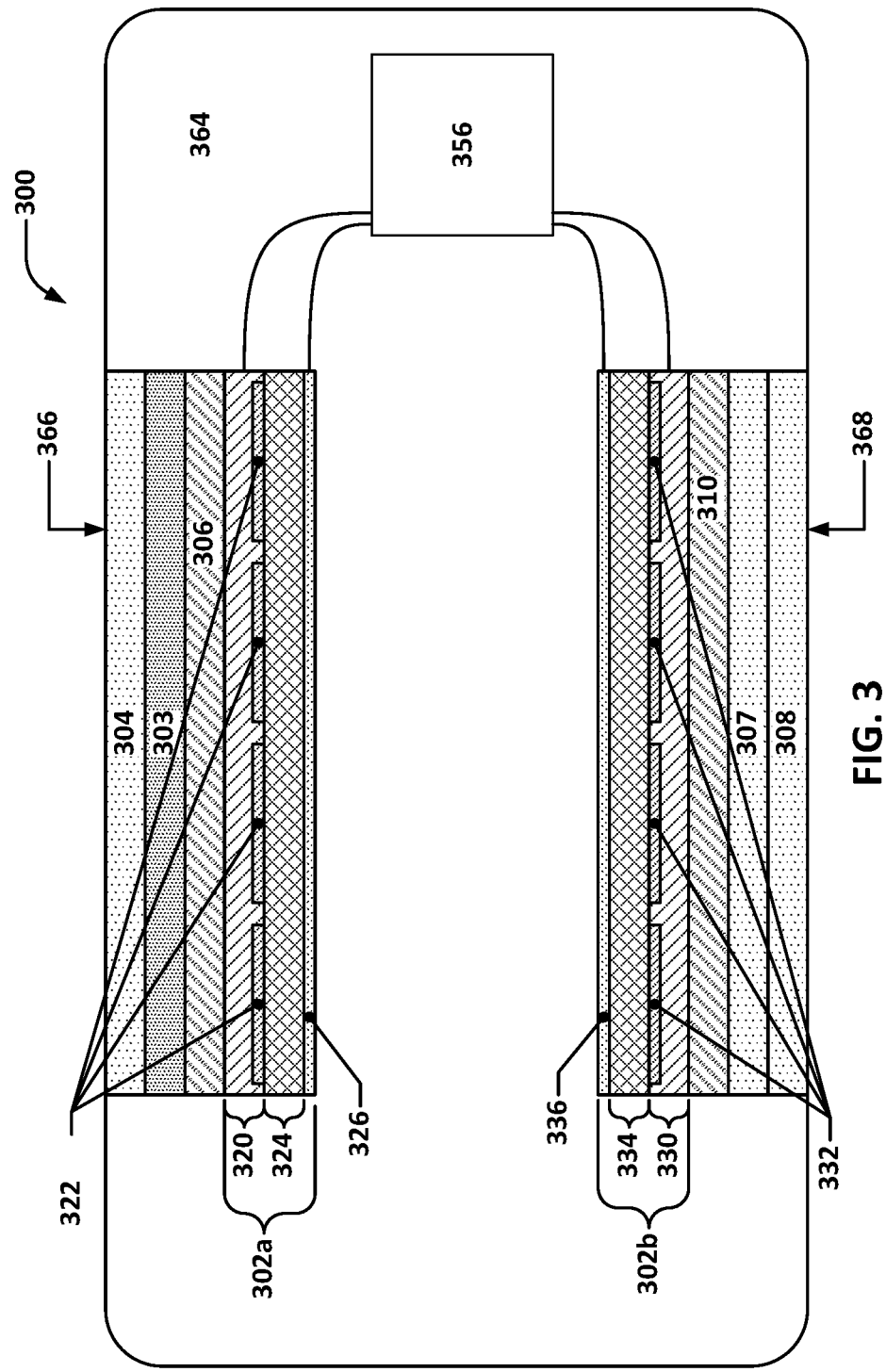
FIG. 3 depicts an example of a portion of an apparatus having dual ultrasonic fingerprint sensor systems that share a common controller.

FIG. 3 depicts an example of a portion of an apparatus having dual ultrasonic fingerprint sensor systems that share a common controller. In FIG. 3, an apparatus 300 is depicted that includes a first cover glass 304, a first display layer 306, a second cover glass 308, and a second display layer 310. It will be understood that the cover glasses 304 and 308 may be made of glass, sapphire, plastic, or other material that may be optically transmissive so as to allow the display layers 306 and 310 to be seen therethrough, and that the cover glasses 304 and 308 are not limited to being made of glass despite the terminology used for these and similar elements throughout this disclosure.

The apparatus 300 may also include a housing 364 that may house the first cover glass 304, the first display layer 306, the second cover glass 308, and the second display layer 310 such that the first display layer 306 and the second display layer 310 face in opposite directions. The first cover glass 304 may form part of a first side 366 of the apparatus 300, and the second cover glass 308 may form part of a second side 368 of the apparatus 300 that is opposite the first side 366. In some implementations, a first touch-sensing system 303 may be provided in between the first display layer 306 and the first cover glass 304, and a second touch-sensing system 307 may be provided in between the second display layer 310 and the second cover glass 308. The first and second touch-sensing systems 303 and 307 may, for example, be capacitive touch sensors or other touch-input sensing systems that are capable of detecting touch events by a user's fingertips.

The apparatus 300 may also further include two fingerprint sensing system portions, a first fingerprint sensing system portion 302a and a second fingerprint sensing system portion 302b. The first fingerprint sensing system portion 302a may, for example, include a first sensor pixel layer 320 that includes a plurality of first sensor pixels 322 that may be configured to measure electrical charge (hereinafter potentially simply referred to as "charge") levels within a first piezoelectric layer 324 in conjunction with a first sensor electrode layer 326. The second fingerprint sensing system portion 302b may, similarly, include a second sensor pixel layer 330 that includes a plurality of second sensor pixels 332 that may be configured to measure charge levels within a second piezoelectric layer 334 in conjunction with a second sensor electrode layer 336. In the depicted implementation, the fingerprint sensing system portions are configured to have piezoelectric layers 324 and 334 that are used as ultrasonic transceivers, i.e., the sensor pixel layer may be caused to switch between two modes—one in which circuits in the sensor pixel layers 320 and 330, in conjunction with the sensor electrode layers 326 and 336, cause electrical potentials to be developed across the piezoelectric layers 324 and 334 so as to cause the piezoelectric layers 324 and 334 to generate ultrasonic pulses, and another in which circuits in the sensor pixel layers 320 and 330 are caused to obtain measurements of localized amounts of charge generated within the piezoelectric layers 324 and 334 responsive to ultrasonic waves passing therethrough. It will be understood that both fingerprint sensing system portions 302a and 302b may, in some implementations, be independently operable, whereas in other implementations, their operability may be linked.

As shown in FIG. 3, the first fingerprint sensing system portion 302a and the second fingerprint sensing system portion 302b are both operably connected with a common controller 356. The controller 356 may, for example, be equipped with inputs and outputs sufficient to allow the controller to simultaneously interface with both the first fingerprint sensing system portion 302a and the second fingerprint sensing system portion 302b. In some implementations, the first fingerprint sensing system portion 302a and the second fingerprint sensing system portion 302b may, in effect, be treated by the controller as a single, large fingerprint scanner, with the outputs therefore being split between the two fingerprint sensing systems. If desired, the controller may be configured so as to allow one or more portions of the "composite" fingerprint sensing system to be scanned at any given time, e.g., only the portion thereof that corresponds to the first fingerprint sensing system portion 302a, only the portion thereof that corresponds to the second fingerprint sensing system portion 302b, or both portions thereof.

Such implementations may allow for two ultrasonic fingerprint sensing systems to be implemented in apparatuses using only one, common controller, e.g., a controller provided by a single die or chip. This may result in cost reductions, as the controllers for ultrasonic fingerprint systems may be the most complex and expensive components of the ultrasonic fingerprint sensing systems to produce. Accordingly, avoiding the need for two ultrasonic fingerprint sensing system controllers may result in a significant cost savings. Such ultrasonic fingerprint sensing system controllers may, for example, be provided as an application-specific integrated circuit (ASIC) that is mounted to a flexible substrate, e.g., in a chip-on-flex implementation, that may include conductive traces to electrically connect the two ultrasonic fingerprint sensing systems with the common, shared controller.

Such implementations may allow an apparatus such as the apparatus 300 to obtain fingerprint scans from surfaces on either side of the apparatus, either singly or simultaneously.

Figure 4:
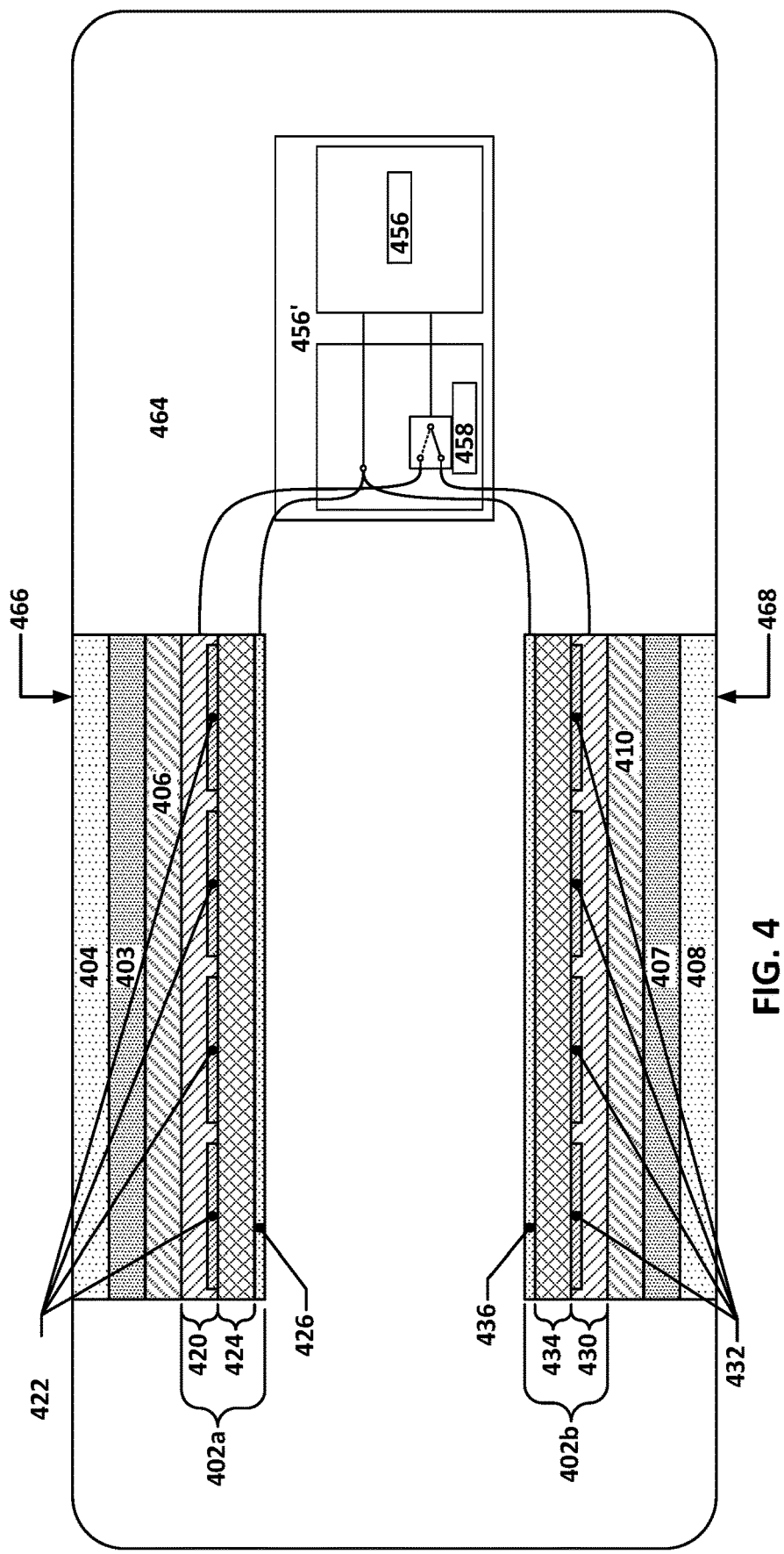
FIG. 4 depicts a portion of another example apparatus having dual ultrasonic fingerprint sensor systems that share a common controller.

FIG. 4 depicts a portion of another example apparatus having dual ultrasonic fingerprint sensor systems that share a common controller. The apparatus 400 of FIG. 4 is somewhat similar to that of the apparatus 300 of FIG. 3 and elements in FIG. 4 that are analogous to elements in FIG. 3 are indicated with callouts sharing the same last two digits. Unless discussed otherwise below, the above discussion regarding the elements of FIG. 3 may be assumed to be similarly applicable to the analogous elements of FIG. 4.

The primary difference between the apparatus 400 and the apparatus 300 is that in the apparatus 400, the first fingerprint sensing system portion 402a and the second fingerprint sensing system portion 402b are at least partially connected with the common controller 456 via a switching element 458 that may, at the least, be controllable so as to cause one or the other of the first fingerprint sensing system portion 402a and the second fingerprint sensing system portion 402b to be operably connected with the common controller 456 at any given time. Thus, for example, the switching element 458 (which is shown as a single switch but is, in most implementations, a bank of multiple switches, each associated with a different electrical trace or signal path used by the fingerprint sensing system portions) may be used to switch between different sets of signal lines that may be used to control the sensor pixel layers 420 and 430, respectively. In such implementations, the common controller 456 may be considered to be part of a larger common controller 456' that includes the switching element 458. For example, the common controller 456 may be provided by one or more processors that, together with the switching element 458, provide the larger common controller 456'.

In such implementations, the common controller 456 may, due to only one of the two fingerprint sensing system portions 402a and 402b being operably connected thereto at any given time, not be capable of simultaneously obtaining fingerprint scans from both sides of the apparatus 400 simultaneously. However, the common controller 456 may, for example, cause the switching element 458 to switch between the first fingerprint sensing system portion 402a and the second fingerprint sensing system portion 402b relatively quickly, e.g., on the order of less than 100 milliseconds, e.g., 30 to 60 ms or 40 to 50 ms, thereby allowing ultrasonic fingerprint scans to be obtained from both ultrasonic fingerprint sensing systems sequentially in rapid fashion (e.g., near-simultaneously). In some such implementations, the controller may be configured to first attempt to obtain a fingerprint scan from one ultrasonic fingerprint sensing system and then only resort to attempting to obtain a fingerprint scan from the other ultrasonic fingerprint sensing system if the first attempt results in failure, e.g., no valid fingerprint scan being obtained or less than a desired number of valid fingerprints being scanned. Such an implementation may, for example, be practiced with any of the implementations discussed herein.

Range Gating Implementations

Figure 5:
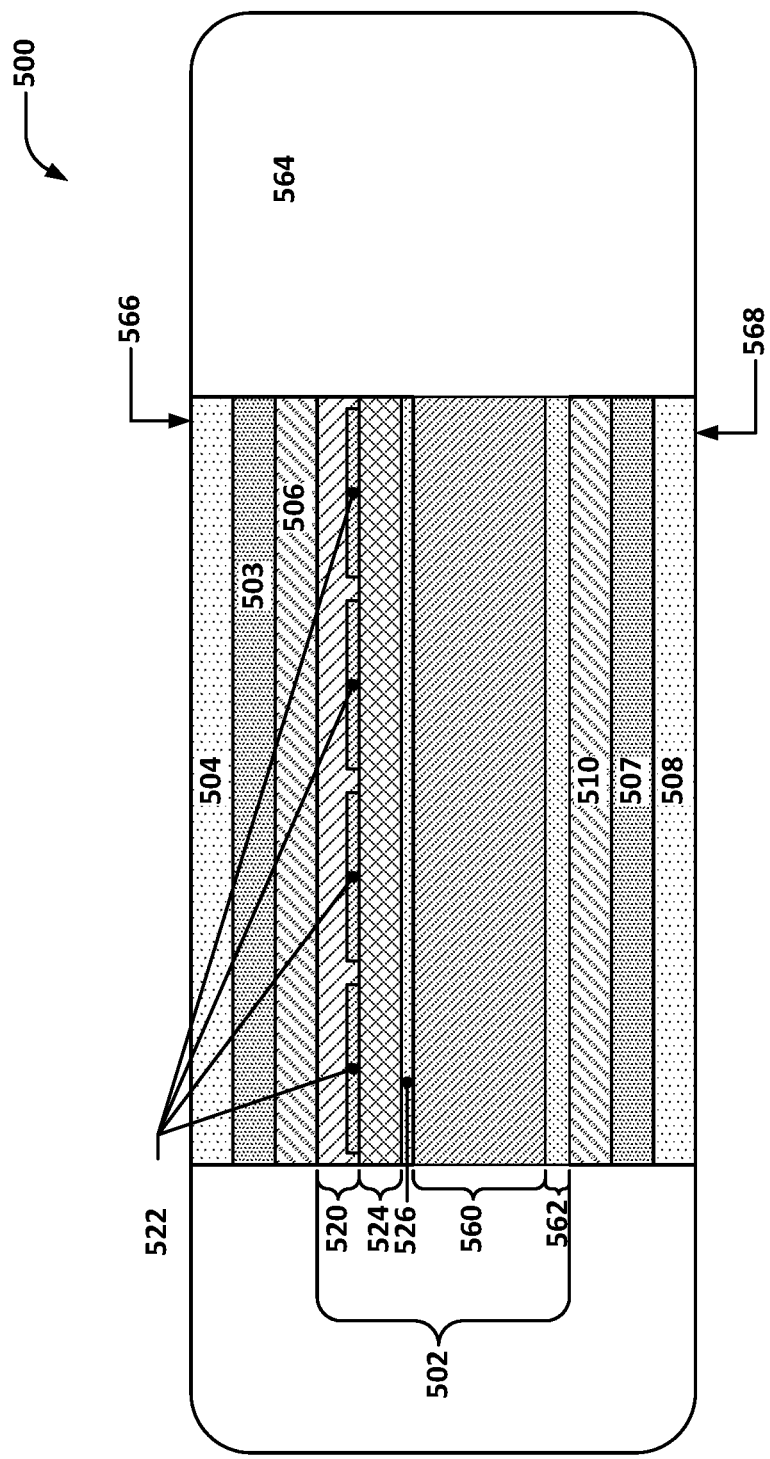
FIG. 5 depicts an example of a portion of an apparatus having a bidirectional ultrasonic fingerprint sensor system that uses a range gate approach to obtaining fingerprint scans.

FIG. 5 depicts an example of a portion of an apparatus having a bidirectional ultrasonic fingerprint sensor system that uses a range gate approach to obtaining fingerprint scans. FIG. 5 depicts an apparatus 500 that includes a first cover glass 504 that covers a first display layer 506 and a second cover glass 508 that covers a second display layer 510. The first cover glass 504 may form part of a first side 566 of the apparatus 500, and the second cover glass 508 may form part of a second side 568 of the apparatus 500 that is opposite the first side 566. In some implementations, a first touch-sensing system 503 may be provided in between the first display layer 506 and the first cover glass 504, and a second touch-sensing system 507 may be provided in between the second display layer 510 and the second cover glass 508. The first and second touch-sensing systems 503 and 507 may, for example, be capacitive touch sensors or other touch-input sensing systems that are capable of detecting touch events by a user's fingertips.

The apparatus 500 may also include a fingerprint sensing system 502 that may include, for example, a sensor pixel layer 520 that includes a plurality of sensor pixels 522, a sensor electrode layer 526, and a piezoelectric layer 524 interposed therebetween. The sensor pixels 522 may include circuitry that is configured to be switchable between two modes, e.g., a mode in which an electrical potential may be applied across the piezoelectric layer 524 by the sensor electrode layer 526 and the sensor pixels 522 in order to cause the piezoelectric layer 524 to generate an ultrasonic pulse, and a mode in which the sensor pixels 522 and the sensor electrode layer 526 are able to obtain measurements of charge levels in the piezoelectric layer 524 that are generated responsive to ultrasonic waves passing therethrough, thereby allowing a scanned image to be obtained of a fingerprint. When the piezoelectric layer 524 is caused to generate an ultrasonic pulse, ultrasonic waves from the piezoelectric layer 524 may propagate outward in opposite directions towards the first cover glass 504 and the second cover glass 508. Ultrasonic waves that reach the first cover glass 504 or the second cover glass 508 may be reflected back towards the piezoelectric layer 524 with varying degrees of intensity depending on the material pressed against the cover glasses 504 and 508, and the localized reflected ultrasonic wave intensities that may then be detected using the sensor pixel layer 520 may be used to generate an image or reconstruction of the object that is pressed against the first cover glass 504 or the second cover glass 508.

The apparatus 500 may also include a spacer 560 and a compliant layer 562. The spacer 560 and the compliant layer 562 may, for example, be interposed between the fingerprint sensing system 502 and the second display layer 510. The compliant layer 562 may be positioned as shown, in between the spacer 560 and the second display layer 510, or, alternatively, positioned between the spacer 560 and the fingerprint sensing system 502. The spacer 560 may provide an acoustically conductive path that facilitates propagation of the ultrasonic wave towards the second cover glass 508, and the compliant layer 562, which may be a gel or otherwise deformable coupling layer, e.g., an elastomer, may provide a compliant interface that extends the acoustically conductive path such that the ultrasonic wave travelling towards the second cover glass 508 may reach the second cover glass 508 without undue attenuation or reflection. The compliant layer 562 may be used to prevent gaps, which may interfere with the acoustic wave propagation, from forming in the acoustically conductive path between the fingerprint sensing system 502 and the second cover glass 508, e.g., due to thermal expansion or other sources, such as gaps that arise due to tolerance stack-ups within the apparatus. The spacer, for example, may be a battery or other component that can provide part of an acoustic transmission path through the apparatus from the fingerprint sensing system 502 and the second display layer 510.

Ultrasonic waves emitted from the piezoelectric layer 524 may, due to the differing distances between the piezoelectric layer 524 and the first and second cover glasses 504 and 508, have different transit times to the first and second cover glasses 504 and 508. For example, the transit time of an ultrasonic wave from the piezoelectric layer 524 to the first cover glass 504 (and the return transit time for portions thereof that are reflected back) may be shorter than the transit time of an ultrasonic wave from the piezoelectric layer 524 to the second cover glass 508 (and the return transit time for portions thereof that are reflected back) due to the increased distance between the piezoelectric layer 524 and the second cover glass 508 due to the spacer 560 as compared with the distance between the piezoelectric layer 524 and the first cover glass 504.

Since the ultrasonic waves that are generated by the piezoelectric layer 524 may be reflected back towards the piezoelectric layer 524 with different timing by the first cover glass 504 and the second cover glass 508, the controller that may be used to control the fingerprint sensing system may, for example, use a technique such as range gate delay to selectively obtain measurements of charges that are generated within the piezoelectric layer 524 due to reflected ultrasonic waves from either the first cover glass 504 or the second cover glass 508 (or objects pressed into contact therewith, e.g., fingertips).

For example, the controller may be configured to cause the piezoelectric layer 524 to generate an ultrasonic wave during a first time period that starts at a first time and then cause the sensor pixels 522 to measure, during a second time period that starts at a second time, a peak amount of charge that is generated within the piezoelectric layer 524 due to reflected ultrasonic waves passing therethrough in order to scan a fingerprint from the side of the apparatus 500 having the first cover glass 504. The second time may be selected to be after the first time period by an amount that is based on a first delay period that is selected such that ultrasonic waves reflected off of the first cover glass 504 may reach the piezoelectric layer 524 after the start of the second time period. The second time period may, in turn, be selected to be long enough that ultrasonic waves reflected from the first cover glass 504 have passed through the piezoelectric layer 524 by the time the end of the second time period is reached. The second time period may also be selected to be short enough that ultrasonic waves emitted by the piezoelectric layer 524 and reflected off of the second cover glass 508 have not yet reached the piezoelectric layer 524 by the time the second time period terminates. Thus, the peak charges read by the sensor pixels 522 during the second time period may be representative of the highest acoustic impedances encountered by the ultrasonic wave as it reached the outer surface of the first cover glass 504 (and thus representative of a fingerprint—or rather, the inverse thereof).

The controller may alternatively cause the sensor pixels 522 to measure, during a third time period that starts at a third time after the first time period, a peak amount of charge that is generated within the piezoelectric layer 524 due to reflected ultrasonic waves passing therethrough in order to scan a fingerprint from the side of the apparatus 500 having the second cover glass 508. The third time may be selected to be after the first time period by an amount that is based on a second delay period that is selected such that ultrasonic waves reflected off of the second cover glass 508 may reach the piezoelectric layer 524 after the start of the second time period. The third time period may, in turn, be selected to be long enough that ultrasonic waves reflected from the second cover glass 508 have passed through the piezoelectric layer 524 by the time the end of the third time period is reached. Thus, the peak charges read by the sensor pixels 522 during the third time period may be representative of the highest acoustic impedances encountered by the ultrasonic wave as it reached the outer surface of the second cover glass 508 (and thus representative of a fingerprint—or rather, the inverse thereof).

The controller may also optionally cause the sensor pixels to undergo a reset operation prior to obtaining such measurements, e.g., to cause whatever peak charge measurements may be resident within the sensor circuit to be cleared out prior to obtaining the desired measurements. Once the controller has obtained peak charge measurements from the sensor pixels of the ultrasonic fingerprint sensing system, the controller may, as discussed previously, generate a fingerprint scan based on the measured amounts of charge. In some implementations, the controller may cause the sensor pixels 522 to measure peak amounts of charge generated within the piezoelectric layer due to reflected ultrasonic waves passing therethrough during both the second and third time periods, with a reset operation being performed in between—such a technique may allow for ultrasonic fingerprint scans to be obtained from both sides of the apparatus in rapid sequential fashion—appearing, to the user, to be obtained simultaneously. In such implementations, the controller may cause the fingerprint scans to be obtained in association with only one ultrasonic wave generation event, e.g., the same ultrasonic wave or pulse is used to generate the reflected ultrasonic waves that are then detected by the same sensor circuit during two different, non-overlapping time intervals, with the reflected ultrasonic waves detected during each time interval representing fingerprint scans obtained from opposing sides of the apparatus.

Figure 6:
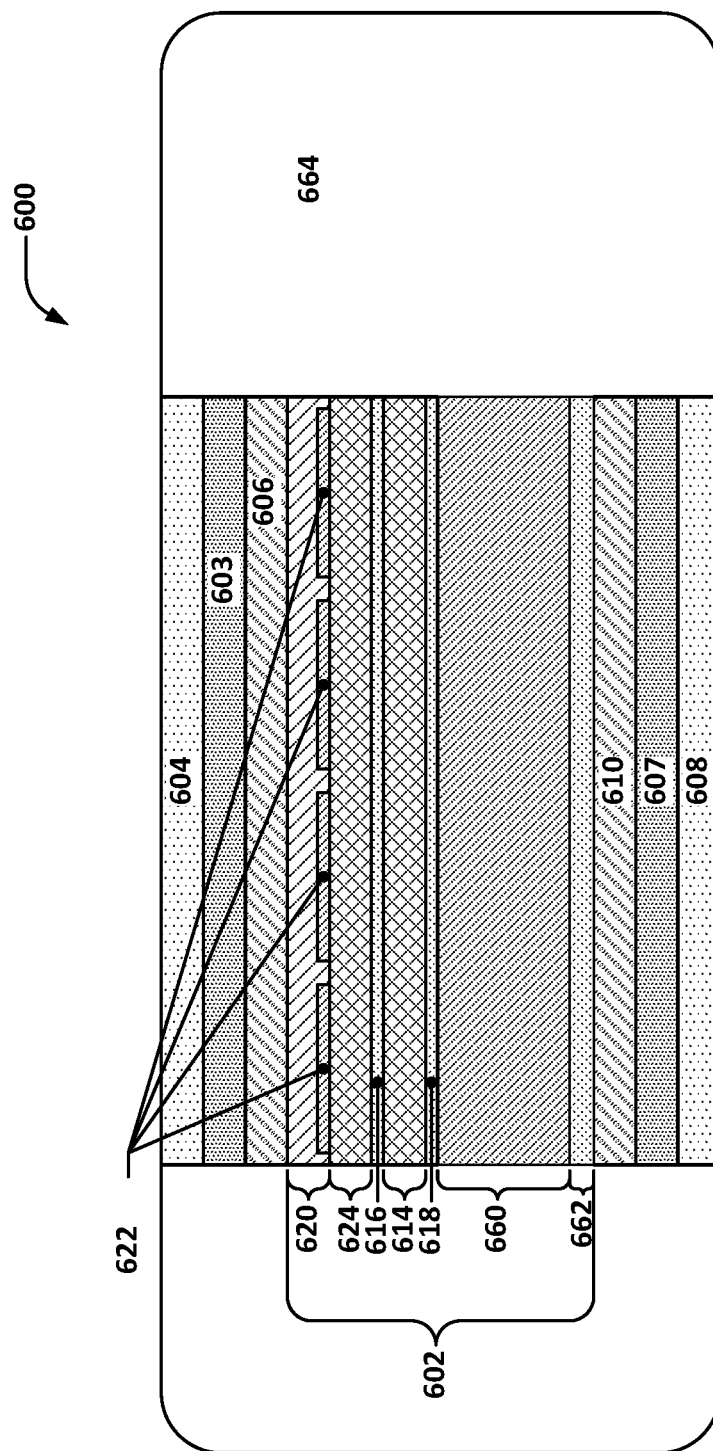
FIG. 6 depicts a portion of another example apparatus having dual ultrasonic fingerprint sensor systems that use a range gate approach to obtaining fingerprint scans

FIG. 6 depicts a portion of another example apparatus having dual ultrasonic fingerprint sensor systems that use a range gate approach to obtaining fingerprint scans. The apparatus 600 of FIG. 6 is somewhat similar to that of the apparatus 500 of FIG. 5 and elements in FIG. 6 that are analogous to elements in FIG. 5 are indicated with callouts sharing the same last two digits. Unless discussed otherwise below, the above discussion regarding the elements of FIG. 5 may be assumed to be similarly applicable to the analogous elements of FIG. 6.

FIG. 6's apparatus 600 is identical to the apparatus 500, except that instead of a single piezoelectric layer 524 that is used to both generate ultrasonic waves and receive reflected ultrasonic waves, the apparatus 600 has a piezoelectric ultrasonic generator layer 614 that is used to generate ultrasonic waves and a separate first piezoelectric layer 624 that is used to receive reflected ultrasonic wavers. The apparatus 600 also has a first ultrasonic generator electrode 616 and a second ultrasonic generator electrode 618 that may be used to apply an electrical potential across the piezoelectric ultrasonic generator layer 614 to cause an ultrasonic wave to be generated. The first ultrasonic generator electrode 616 may also be used in conjunction with the sensor pixels 622 to obtain measurements of charge generated within the first piezoelectric layer 624 in order to obtain a fingerprint scan.

Acoustic Masking Layer Implementations

Figure 7:
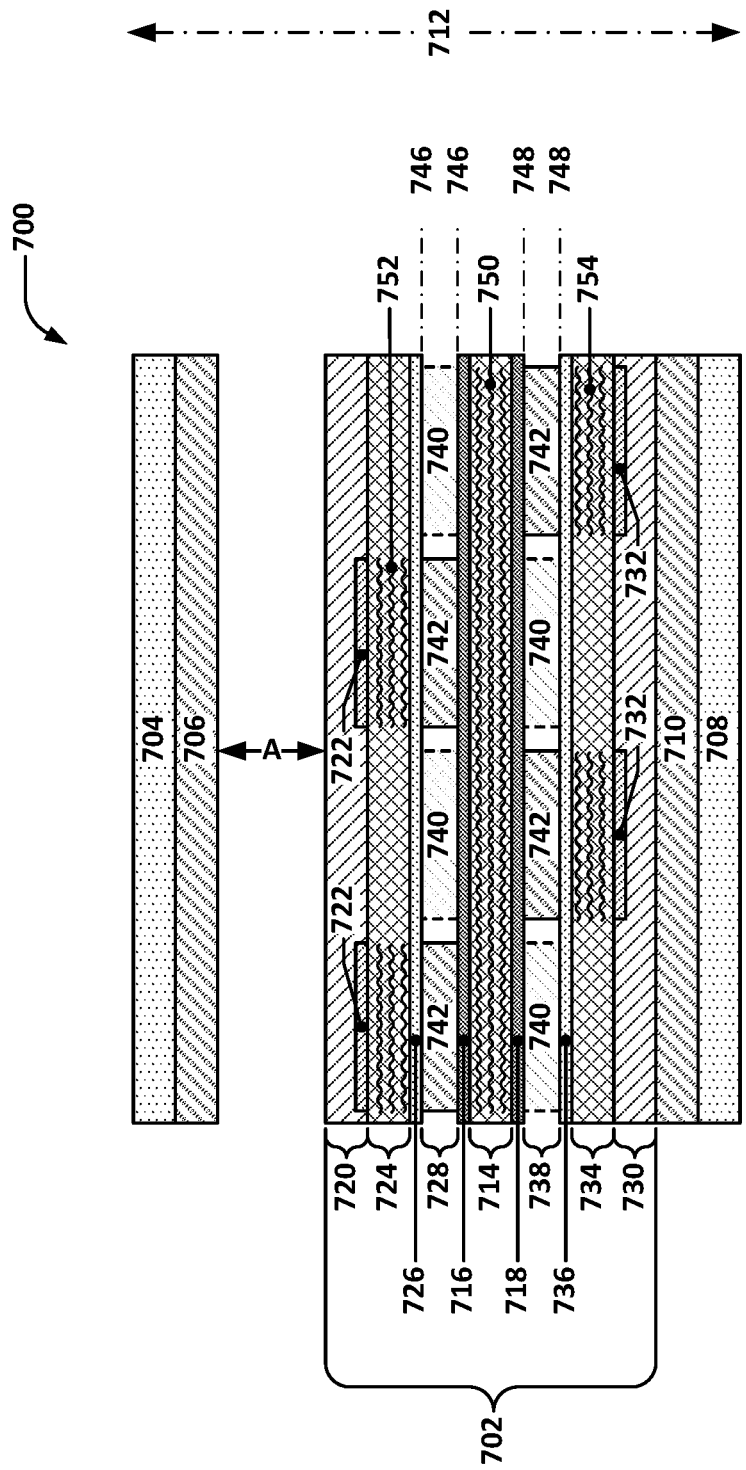
FIG. 7 depicts a cross-sectional schematic of a portion of an example apparatus including an ultrasonic fingerprint sensor.

FIG. 7 depicts a cross-sectional schematic of a portion of an example apparatus including an ultrasonic fingerprint sensor. The apparatus 700, a portion of which is shown, includes dual-display functionality. For example, the apparatus 700 includes a first display layer 706 and a first cover glass 704 on one side, and a second display layer 710 and a second cover glass 708 on the second, opposing side. The first display layer 706 and the second display layer 710 may, for example, be OLED, LCD, POLED, or other types of pixelated display systems that may be controlled by a graphical processing unit or other controller and used to display pixel-based graphics. The first display layer 706 and the second display layer 710 may, for example, also include components or layers such as backlighting layers, passivation layers, thin-film transistor layers, etc. that may be used to provide the operational functionality of such display layers.

Interposed between the first display layer 706 and the second display layer 710 is an ultrasonic fingerprint sensing system 702. The ultrasonic fingerprint sensing system 702, in this example, includes a piezoelectric ultrasonic generator layer 714 that is interposed between a first ultrasonic generator electrode 716 and a second ultrasonic generator electrode 718. The first ultrasonic generator electrode 716 and the second ultrasonic generator electrode 718 may be configured to be caused by a controller of the apparatus 700 to have an electrical potential applied thereacross, thereby causing the piezoelectric ultrasonic generator layer 714 to vibrate and generate an ultrasonic wave that propagates in directions normal to the piezoelectric ultrasonic generator layer 714.

The first acoustic masking layer 728 and the second acoustic masking layer 738 may each have repeating patterns of HAI regions 740 and LAI regions 742 (the HAI regions 740 and LAI regions 742 for the first acoustic masking layer 728 may, for example, also be referred to herein as first HAI regions and first LAI regions, and the HAI regions 740 and LAI regions 742 for the second acoustic masking layer 738 may, for example, also be referred to herein as second HAI regions and second LAI regions).

The HAI regions 740 have an acoustic impedance that is higher than that of the LAI regions 742. For example, ultrasonic waves that pass through the first ultrasonic generator electrode 716 or the second ultrasonic generator electrode 718 and into one of the HAI regions 740 experience a relatively large amount of reflection (and thus less transmission through the HAI regions 740) as compared with ultrasonic waves that pass from the first ultrasonic generator electrode 716 or the second ultrasonic generator electrode 718 and into one of the LAI regions 742. The first acoustic masking layer 728 and the second acoustic masking layer 738 may thus generally act as spatial filters that allow ultrasonic waves passing through the first acoustic masking layer 728 or the second acoustic masking layer 738 to pass through the first acoustic masking layer 728 or the second acoustic masking layer 738 with little loss of ultrasonic signal strength in portions thereof corresponding to the LAI regions 742 as compared with portions thereof corresponding with the HAI regions 740.

The repeating patterns of HAI regions 740 and LAI regions 742 for the first acoustic masking layer 728 and the second acoustic masking layer 738 may, for example, be arranged such that the HAI regions 740 and LAI regions 742 of the first acoustic masking layer overlay the LAI regions 742 and HAI regions 740 of the second acoustic masking layer 738, respectively, when viewed along an axis 712 normal to the first acoustic masking layer 728 and/or the second acoustic masking layer 738 and vice-versa. In some implementations, the repeating patterns of HAI regions 740 and LAI regions 742 for the first acoustic masking layer 728 and the second acoustic masking layer 738 may, for example, be arranged such that the LAI regions 742 of the first acoustic masking layer 728 and the second acoustic masking layer 738 are entirely overlapped by the HAI regions 740 of the second acoustic masking layer 738 and the first acoustic masking layer 728, respectively. In some further such implementations, the LAI regions 742 of the first acoustic masking layer 728 and the second acoustic masking layer 738 may be sized so as to each be smaller in footprint when viewed along the axis that is normal to the first acoustic masking layer 728 and the second acoustic masking layer 738 than the HAI regions 740 that respectively entirely overlap them.

It will be understood, in the context of this disclosure, that the phrase "A and B overlap . . . when viewed along [a particular direction]," unless otherwise indicated, refers to the state in which item A overlays item B (e.g., item A at least partially obscures item B, assuming that item A is opaque) when viewed along the indicated direction as well as the state in which item B overlays item A (e.g., item B at least partially obscures item A, assuming that item B is opaque) when viewed along the indicated direction.

Arrangements of LAI regions 742 and HAI regions 740 such as those discussed above and as depicted in FIG. 7 allow for the intensity of the ultrasonic waves passing through the first acoustic masking layer 728 and the second acoustic masking layer 738 to be modulated based on XY position. In effect, such modulation may act to subdivide a larger ultrasonic wave into a plurality of smaller ultrasonic waves that are each tied to a particular XY location (with the XY plane being perpendicular to the axis 712). Such locations may be selected so that ultrasonic waves passing out of either side are modulated such that for each XY location, a higher-intensity ultrasonic wave is emitted from the first acoustic masking layer 728 or the second acoustic masking layer 738 in one direction through the layer stack than in the other direction.

In FIG. 7, this is visually depicted by wavy lines representing an ultrasonic wave 750 generated by the piezoelectric ultrasonic generator layer 714, which is generally the same intensity across the piezoelectric ultrasonic generator layer 714. However, after that ultrasonic wave 750 passes through the first acoustic masking layer 728 or the second acoustic masking layer 738, the resulting ultrasonic wave will have outbound ultrasonic pulse portions 752 and 754, represented by wavy lines in FIG. 7, that pass through the LAI regions 742 and that have higher signal strengths as compared with the portions of the ultrasonic wave that pass through the HAI regions 740 (which are not shown, although such portions of the ultrasonic wave may still be present after passing through the first acoustic masking layer 728 or the second acoustic masking layer 738 except at a much reduced intensity).

The HAI regions 740 and the LAI regions 742 of the first acoustic masking layer 728 and the second acoustic masking layer 738 may be provided using, for example, materials having different specific acoustic impedances. For example, the LAI regions 742 in the first acoustic masking layer 728 may be provided by structures that offer a continuous sonic conduction path in between two first reference planes 746 that may, for example, be defined to be coincident with surfaces of those LAI regions 742. The HAI regions 740 for the first acoustic masking layer 728, however, may provide a discontinuous sonic conduction path, e.g., a gap may exist for at least part of the distance between the first reference planes 746 within the HAI regions 740. Such a gap may be provided by the absence of any solid or liquid material within the gap and may, for example, be an air gap (or a gap filled with some other gas). The difference in acoustic impedance that exists in the transition from a medium such as that of the first ultrasonic generator electrode 716 to a medium such as gas in the HAI regions 740 causes the HAI regions 740 to reflect (or otherwise not allow to pass through) a larger portion of the ultrasonic wave as compared with the LAI regions 742, which may see a much lower (or effectively nonexistent) difference in acoustic impedance between the first ultrasonic generator electrode 716 and the LAI regions 742.

The LAI regions 742 in the first acoustic masking layer 728 may offer a continuous sonic conduction path and may thus not have such gaps. In some implementations, the LAI regions 742 may be provided by solid, homogenous materials such as copper, aluminum, etc. that may be selected so as to be similar to that used in the first ultrasonic generator electrode 716, thereby reducing the amount of ultrasonic energy that may be reflected in the interface between the first ultrasonic generator electrode 716 and the LAI regions 742. In some instances, the first ultrasonic generator electrode 716 and the LAI regions 742 may be provided as a single, contiguous structure having both elements within it.

It will, of course, be understood that the above discussion of the composition of the HAI regions 740 and the LAI regions 742 for the first acoustic masking layer 728 is equally applicable to the HAI regions 740 and the LAI regions 742 for the second acoustic masking layer 738. For example, the LAI regions 742 in the second acoustic masking layer 738 may be provided by structures that offer a continuous sonic conduction path in between two second reference planes 748 that may, for example, be defined to be coincident with surfaces of those LAI regions 742. The HAI regions 740 for the second acoustic masking layer 738, however, may provide a discontinuous sonic conduction path, e.g., a gap may exist for at least part of the distance between the second reference planes 748 within the HAI regions 740, e.g., similar to the gap discussed above.

The first acoustic masking layer 728 in FIG. 7 is shown as being adjacent to a first sensor electrode layer 726, which may, in turn be adjacent to a first piezoelectric layer 724 that is interposed between the first sensor electrode layer 726 and a first sensor pixel layer 720 that contains a plurality of first sensor pixels 722. It will be understood that in FIG. 7, as well as in other Figures herein, layers that are shown as being adjacent to one another may, in some implementations, include one or more other layers interposed between each other, e.g., one or more electrically insulating layers, adhesive layers, or other thin layers that may provide structural and/or electrical features. The first sensor pixels 722 may each include, for example, a circuit, e.g., including one or more thin-film transistors, that may be caused to measure an amount of charge that is generated within the first piezoelectric layer 724 responsive to localized vibrations of the first piezoelectric layer 724 that arise due to the passage of ultrasonic waves therethrough during a given time interval, e.g., by measuring a localized electrical potential within the first piezoelectric layer 724 in between the first sensor pixels 722 and the first sensor electrode layer 726. For example, the first sensor pixels 722 may be caused to measure the amount of charge that is generated in the first piezoelectric layer 724 during a time interval that is selected so as to be after the outbound ultrasonic pulse 752 passes therethrough but close enough in time that any electrical charges that are generated by portions of the outbound ultrasonic pulse 752 that are subsequently reflected back towards the piezoelectric ultrasonic generator layer 714 are measured, thereby giving a pixel-by-pixel map of reflected ultrasonic wave intensity that can be used to determine a fingerprint scan. Alternatively, the time interval may be selected so as to be large enough to measure the localized charges generated within the first piezoelectric layer 724 arising from both the outbound ultrasonic pulse 752 and any reflected ultrasonic waves that may arise therefrom. In such an implementation, the outbound ultrasonic pulse 752 may generally result in a uniform amount of charge to be generated across the first piezoelectric layer 724, which may then be subtracted out from the final charge measurements for each pixel, for example, to obtain the amount of charge generated due to the reflected ultrasonic waves.

The second acoustic masking layer 738 may similarly be adjacent to a second sensor electrode layer 736 that is, in turn, adjacent to a second piezoelectric layer 734 that is interposed between the second sensor electrode layer 736 and a second sensor pixel layer 730 that contains a plurality of second sensor pixels 732. The second sensor pixels 732 may, in conjunction with the second sensor electrode layer 736, be controlled so as to cause measurements of the amount of charge generated within the second piezoelectric layer 734 responsive to the passage of ultrasonic waves or reflected ultrasonic waves therethrough. The second sensor electrode layer 736, second piezoelectric layer 734, and second sensor pixel layer 730 may, for example operate in a manner similar to that of the first sensor electrode layer 726, the first piezoelectric layer 724, and the second sensor pixel layer 730.

The first acoustic masking layer 728 and the second acoustic masking layer 738 may generally act to cause the ultrasonic fingerprint sensing system 702 to preferentially scan for fingerprints in one direction in the LAI regions 742 on one side of the piezoelectric ultrasonic generator layer 714 and preferentially scan for fingerprints in the other direction in the LAI regions 742 on the other side of the piezoelectric ultrasonic generator layer 714. While this may generate a lattice or checkerboard pattern of "holes" in the fingerprint scanning areas on each side of the piezoelectric ultrasonic generator layer 714, any potential scan quality issues that may arise from such holes may, for example, be remedied by adopting a finer resolution in the first and second sensor pixel layers 720 and 730, respectively.

Such an implementation may, in some instances and due to the HAI regions that are present, produce artifacts that may be evident in the scanned fingerprint images that are generated using such an arrangement. However, since such artifacts result from fixed patterns, e.g., the first or second acoustic masking layers 728 and 738, such images may, for example, be post-processed by a controller or other processor using existing background estimation (BGE) and/or grid detection algorithms that may allow for such artifacts to be removed.

It will be understood that the piezoelectric ultrasonic generator layers discussed herein may also simply be referred to as a piezoelectric layer in the accompaniment of an ordinal indicator, e.g., similar to how the first and second piezoelectric layers discussed above are referred to. In such instances, if the piezoelectric layer that provides ultrasonic wave generator functionality is instead referenced, for example, as being the first piezoelectric layer, then the other piezoelectric layers (if present) that may be referred to as the first and second piezoelectric layers above may instead be instead, for example, be referred to as the second and third piezoelectric layers, respectively.

The gap "A" may, in various implementations, generally be occupied by one or more components of the apparatus, e.g., such as a battery, that may provide an acoustic transmission path that allows the ultrasonic waves generated by the piezoelectric ultrasonic generator layer 714 (and those later reflected by the first cover glass 704 and the second cover glass 708). For example, the gap "A" may be filled by a component such as a battery, similar to the spacer 560 in FIG. 5 (and optionally also a compliant layer, such as compliant layer 562 of FIG. 5). This guidance applies to the gap "A" visible in other Figures discussed below as well.

Figure 8:
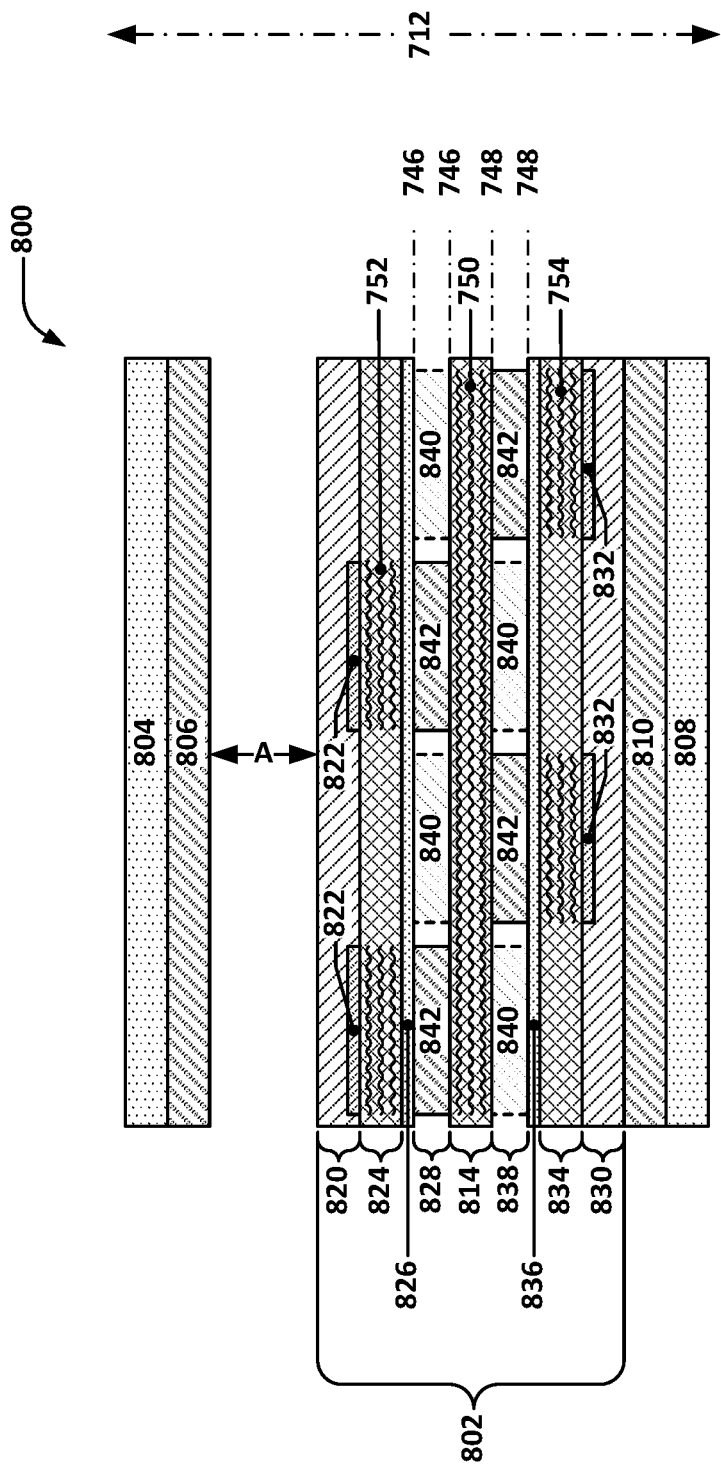
FIG. 8 depicts a cross-sectional schematic of a portion of another example apparatus including an ultrasonic fingerprint sensor.

FIG. 8 depicts a cross-sectional schematic of a portion of another example apparatus including an ultrasonic fingerprint sensor. The apparatus 800 of FIG. 8 is somewhat similar to that of the apparatus 7 of FIG. 7 and elements in FIG. 8 that are analogous to elements in FIG. 7 are indicated with callouts sharing the same last two digits. Unless discussed otherwise below, the above discussion regarding the elements of FIG. 7 may be assumed to be similarly applicable to the analogous elements of FIG. 8.

The apparatus 800 of FIG. 8 differs from the apparatus 700 of FIG. 7 in that the first ultrasonic generator electrode 816 and the second ultrasonic generator electrode 818 have been omitted. Instead, the first acoustic masking layer 828 and the second acoustic masking layer 838 may be used in place of the first ultrasonic generator electrode 816 and the second ultrasonic generator electrode 818. For example, the LAI regions 842 that are adjacent to the first sensor electrode layer 826 may be in electrically conductive contact with the first sensor electrode layer 826, and the LAI regions 842 that are adjacent to the second sensor electrode layer 836 may be in electrically conductive contact with the second sensor electrode layer 836, such that an electrical potential that is applied across the first sensor electrode layer 826 and the second sensor electrode layer 836 may develop across the piezoelectric ultrasonic generator layer 814 by way of the conductive paths provided by the LAI regions 842 (which may, for example, be made of a material that is electrically conductive, such as a copper- or aluminum-containing material). The apparatus 800 may, for example, further include one or more electrical circuits or other elements that may allow the first sensor electrode layer 826 and the second sensor electrode layer 836 to each be switched between a mode in which they are used to generate an electrical potential across the piezoelectric ultrasonic generator layer 814 and another mode in which they are used in conjunction with the first sensor pixel layer 820 and the second sensor pixel layer 830, respectively, in order to detect the amount of charge generated within the first piezoelectric layer 824 and the second piezoelectric layer 834, respectively.

Figure 9:
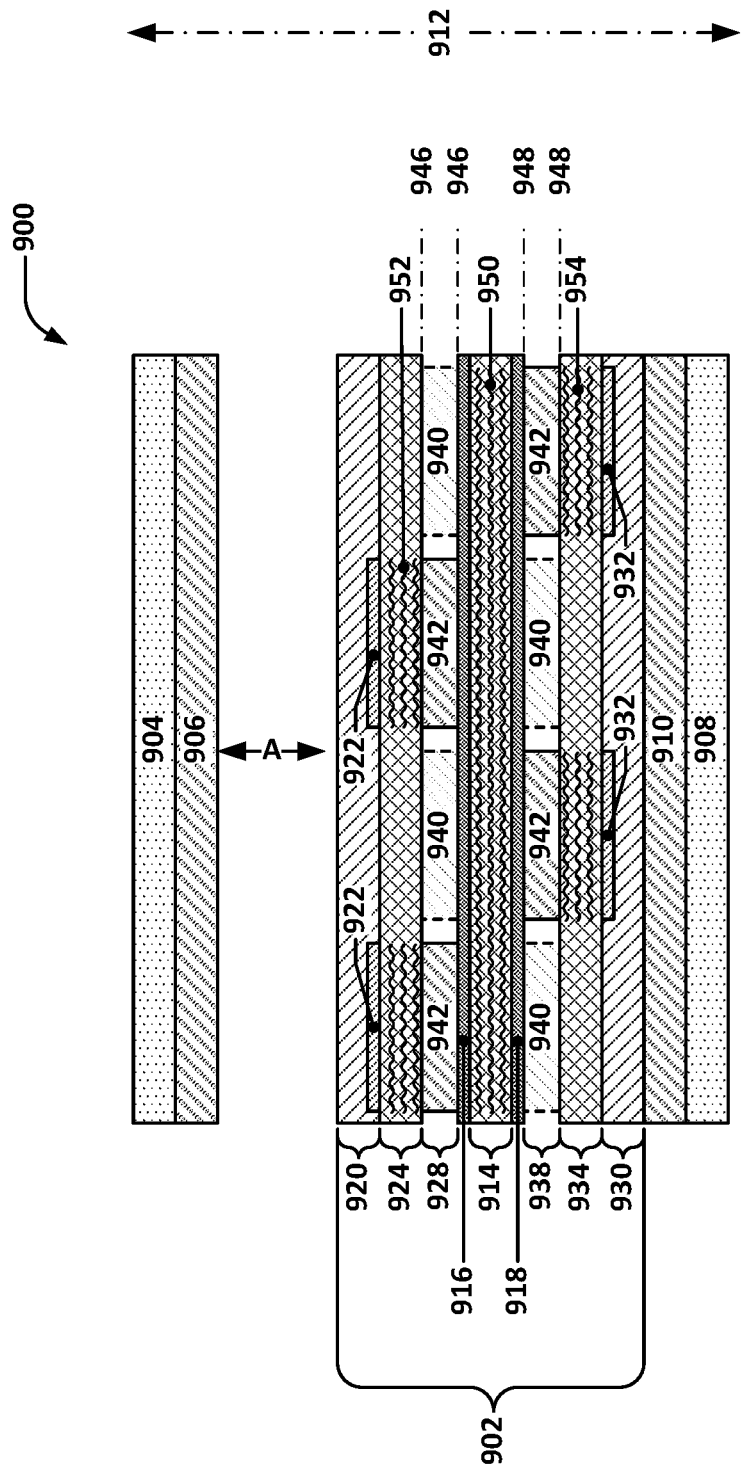
FIG. 9 depicts a cross-sectional schematic of a portion of another example apparatus including an ultrasonic fingerprint sensor.

FIG. 9 depicts a cross-sectional schematic of a portion of another example apparatus including an ultrasonic fingerprint sensor. The apparatus 900 of FIG. 9 is, as with the apparatus 800 of FIG. 8, somewhat similar to that of the apparatus 7 of FIG. 7 and elements in FIG. 9 that are analogous to elements in FIG. 7 are indicated with callouts sharing the same last two digits. Unless discussed otherwise below, the above discussion regarding the elements of FIG. 7 may be assumed to be similarly applicable to the analogous elements of FIG. 9.

The apparatus 900 of FIG. 9 differs from the apparatus 700 of FIG. 7 in that the first sensor electrode layer 926 and the second sensor electrode layer 936 have been omitted. Instead, the first ultrasonic generator electrode 916 and the second ultrasonic generator electrode 918 are used in place of the first sensor electrode layer and the second sensor electrode layer, with the first acoustic masking layer 928 and the second acoustic masking layer 938, respectively, providing electrically conductive paths between the first ultrasonic generator electrode 916 and the first piezoelectric layer 924 and the second ultrasonic generator electrode 918 and the second piezoelectric layer 934, respectively. It will be understood that in such implementations the first ultrasonic generator electrode 916 and the second ultrasonic generator electrode 918 may alternatively or additionally be viewed as the first sensor electrode layer 926 and the second sensor electrode layer 936.

For example, the LAI regions 942 that are adjacent to the first ultrasonic generator electrode 916 may be in electrically conductive contact with the first ultrasonic generator electrode 916, and the LAI regions 942 that are adjacent to the second ultrasonic generator electrode 918 may be in electrically conductive contact with the second ultrasonic generator electrode 918, such that an electrical potential may be applied across the piezoelectric ultrasonic generator layer 914 by the first ultrasonic generator electrode 916 and the second ultrasonic generator electrode 918 in order to cause the piezoelectric ultrasonic generator layer 914 to generate an ultrasonic wave. The first ultrasonic generator electrode 916 and the second ultrasonic generator electrode 918 may also be connected with a circuit or circuits that allow the first ultrasonic generator electrode 916 and the second ultrasonic generator electrode 918 to, via each being conductively connected with the LAI regions 942 adjacent thereto, also act as electrodes that may be used in conjunction with the first sensor pixel layer 920 and the second sensor pixel layer 930, respectively, to measure the amount of charge generated within the first piezoelectric layer 924 and the second piezoelectric layer 934, respectively.

Figure 10:
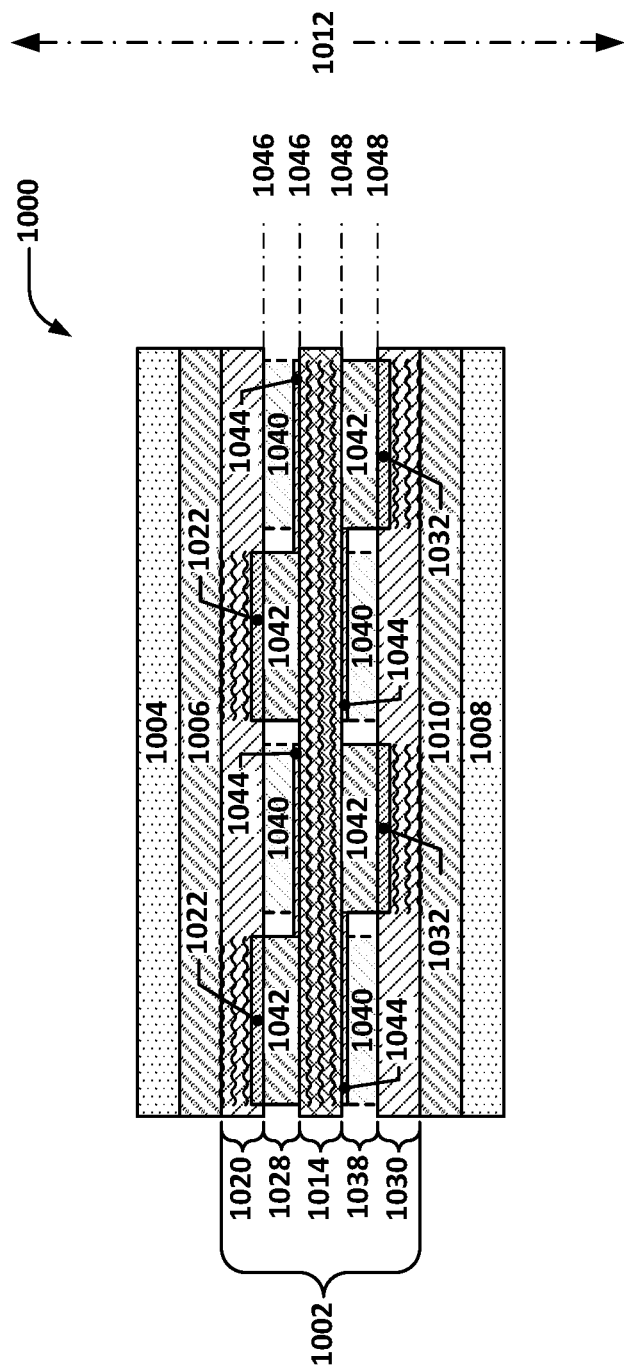
FIG. 10 depicts a portion of an example apparatus in which a piezoelectric ultrasonic generator layer is used for both ultrasonic wave generation and ultrasonic wave detection.

The apparatuses of FIGS. 7 through 9 have featured discrete piezoelectric ultrasonic generator and receiver layers, e.g., the ultrasonic waves used by the fingerprint sensing systems of those Figures are generated in a piezoelectric ultrasonic generator layer, while the subsequent detection of ultrasonic waves (such as reflected ultrasonic waves) is performed using the separate first piezoelectric layer and second piezoelectric layer. FIG. 10, however, depicts a portion of an example apparatus 1000 in which the piezoelectric ultrasonic generator layer 1014 is used for both ultrasonic wave generation and ultrasonic wave detection.

The apparatus 1000 of FIG. 10 is, as with the apparatus 800 of FIG. 8, somewhat similar to that of the apparatus 7 of FIG. 7 and elements in FIG. 10 that are analogous to elements in FIG. 7 are indicated with callouts sharing the same last two digits. Unless discussed otherwise below, the above discussion regarding the elements of FIG. 7 may be assumed to be similarly applicable to the analogous elements of FIG. 10.

As mentioned above, the apparatus 1000 of FIG. 10 differs from the apparatuses of FIGS. 7 through 9 in that the piezoelectric ultrasonic generator layer 1014 is used for both ultrasonic wave generation and ultrasonic wave detection. In view of this, the apparatus 1000 does not include a first piezoelectric layer or a second piezoelectric layer. Instead, the first sensor pixel layer 1020 and the second sensor pixel layer 1030 are configured to measure charges that are generated within the piezoelectric ultrasonic generator layer 1014 due to ultrasonic waves passing therethrough.

In such an implementation, the LAI regions 1042, as in the apparatuses of FIGS. 8 and 9, may serve both as acoustically conductive pathways that allow portions of the ultrasonic waves generated by the piezoelectric ultrasonic generator layer 1014 to pass therethrough with less attenuation than the HAI regions 1040 and as electrically conductive pathways that allow electrical charge to be delivered to and received from the piezoelectric ultrasonic generator layer 1014, e.g., the LAI regions 1042 may serve as electrodes as well.

In the apparatus 1000, the LAI regions 1042 include electrode extension regions 1044 that extend the material of the LAI regions 1042 that is adjacent the piezoelectric ultrasonic generator layer 1014 into locations that overlap with the HAI regions 1040 (when viewed along the axis 1012, for example). The LAI regions 1042 and the electrode extension regions 1044 may, for example, be made from an acoustically transmissive and electrically conductive material, e.g., a copper- or aluminum-containing material. The electrode extension regions 1044 may be provided to more uniformly distribute electrical charge across the surface of the piezoelectric ultrasonic generator layer 1014, e.g., during application of the electrical potential across the piezoelectric ultrasonic generator layer 1014 to cause ultrasonic waves to be generated or during measurement of the generated charge that results from ultrasonic waves passing through the piezoelectric ultrasonic generator layer 1014. It will be noted that the electrode extension regions 1044, while extending into the interstices between the LAI regions 1042 (thus causing the electrode extension regions 1044 to overlap with the HAI regions 1040 when viewed along the axis 1012), are thinner than the thicknesses of the LAI regions 1042. For example, the electrode extension regions 1044 may be thinner than the distance between the first reference planes 1046 and/or the second reference planes 1048. The HAI regions 1040 may, in such implementations, be provided by gaps that exist between the first sensor pixel layer 1020 and the surfaces of the electrode extension regions 1044 of the first acoustic masking layer 1028, or by gaps that exist between the second sensor pixel layer 1030 and the surfaces of the electrode extension regions 1044 of the second acoustic masking layer 1038.

In implementations such as the apparatus 1000, the first sensor pixel layer 1020 and the second sensor pixel layer 1030 may have first and second sensor pixels 1022 and 1032, respectively, that include circuits that allow an electroconductive path from or to the corresponding LAI region 1042 to be switched between different portions of the circuits, e.g., between portions of the circuits that may be used to cause an electrical potential to be applied across the piezoelectric ultrasonic generator layer 1014 and other portions of the circuits that may be used to measure localized amounts of charge generated within the piezoelectric ultrasonic generator layer 1014 due to the passage of ultrasonic waves passing therethrough.

Figure 11:
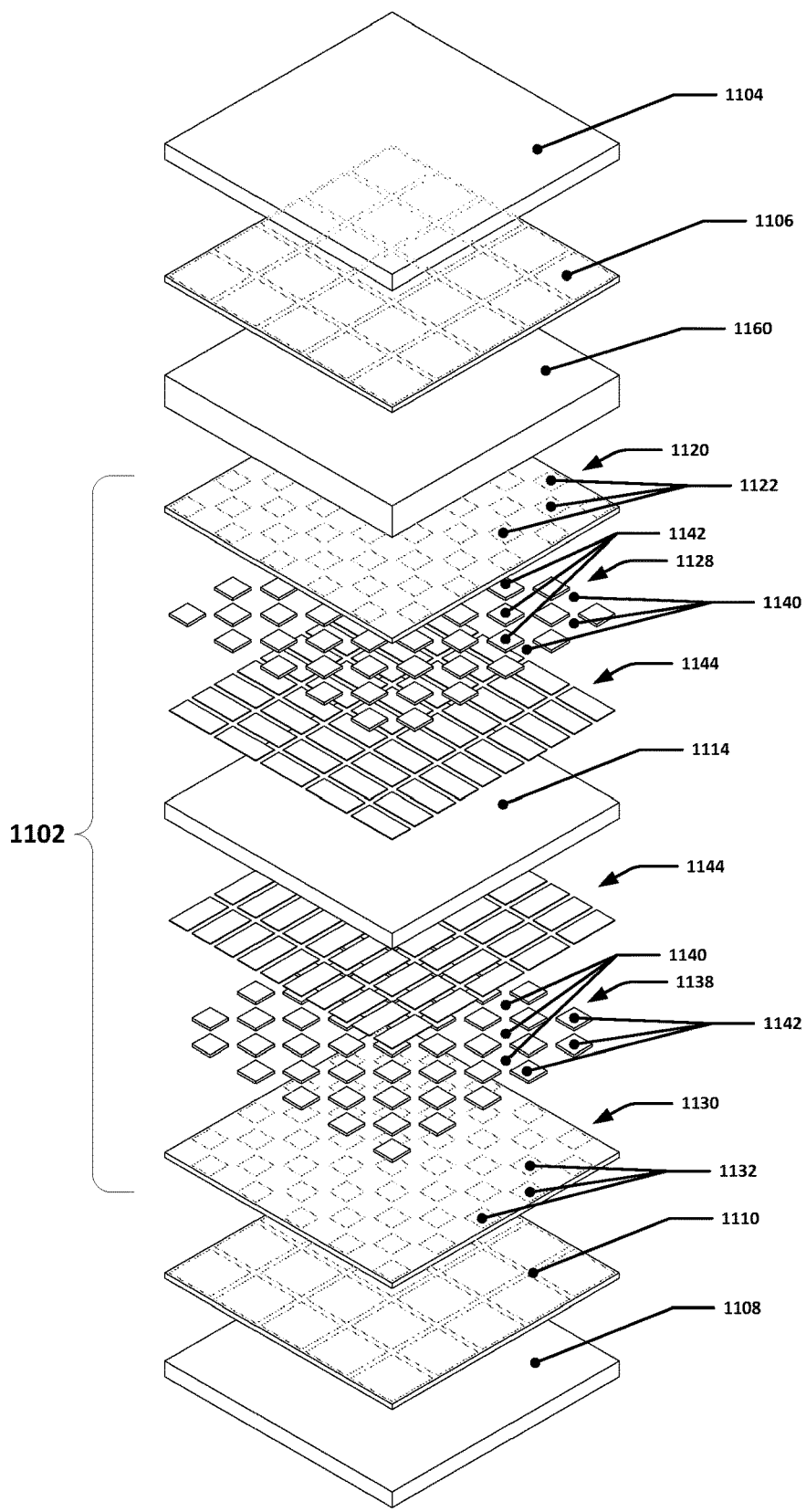
FIG. 11 depicts an exploded isometric view of an example of a portion of an apparatus somewhat similar in construction to the apparatus of FIG. 10.

FIG. 11 depicts an exploded isometric view of an example of a portion of an apparatus somewhat similar in construction to the apparatus 1000. The apparatus 1100, for example, may include a first cover glass 1104 that may protect a first display layer 1106 that may include a plurality of illuminable and/or color-changeable display pixels (in this example, a 5×5 grid of such display pixels is shown). The apparatus 1100 may similarly include a second cover glass 1108 that overlays and protects a second display layer 1110 that may also include a plurality of illuminable and/or color-changeable display pixels (as with the first display layer 1106, a 5×5 grid of such display pixels is shown in this example).

Interposed between the first display layer 1106 and the second display layer 1110 is a fingerprint sensing system 1102 and a spacer 1160. The spacer 1160 may be one or more components of the apparatus, e.g., a battery, and may optionally also include a compliant layer. The fingerprint sensing system 1102 may include, for example, a piezoelectric ultrasonic generator layer 1114 that is interposed between two layers of electrode extension regions 1144. One of the electrode extension region 1144 layers is interposed between the piezoelectric ultrasonic generator layer 1114 and a first acoustic masking layer 1128, and the other of the electrode extension region 1144 layers is interposed between the piezoelectric ultrasonic generator layer 1114 and a second acoustic masking layer 1138. The first acoustic masking layer 1128 and the second acoustic masking layer 1138 may, for example, include HAI regions 1140 and LAI regions 1142. It will be understood that while the electrode extension regions 1144 are shown as separate elements from the LAI regions 1142, they may, in some implementations, each be a contiguous part of a corresponding LAI region 1142. As can be seen, each electrode extension region 1144 is separated from each adjoining electrode extension region 1144 by a small gap, thereby allowing each electrode extension region 1144 to be electrically isolated from the other electrode extension regions 1144 within the first acoustic masking layer 1128 or the second acoustic masking layer 1138. This allows the electrode extension regions 1144 and their corresponding LAI regions 1142 in the first acoustic masking layer 1128 and the second acoustic masking layer 1138 to be used as individually addressable sensor pixel electrodes for first sensor pixels 1122 and second sensor pixels 1132 in a first sensor pixel layer 1120 and a second sensor pixel layer 1130, respectively. At the same time, if the circuits within the first sensor pixel layer 1120 and the second sensor pixel layer 1130 are caused to, for example, switch to a mode in which the electrode extension regions 1144 (and the associated LAI regions 1142 for the first acoustic masking layer 1128 and the second acoustic masking layer 1138) on either side of the piezoelectric ultrasonic generator layer 1114 are able to be addressed simultaneously (as in, the electrode extension regions 1144 on one side of the piezoelectric ultrasonic generator layer 1114 being able to be addressed as a first group simultaneously and the electrode extension regions 1144 on the other side of the piezoelectric ultrasonic generator layer 1114 being able to be addressed as a second group simultaneously), this allows the electrode extension regions 1144 to be used to apply an electrical potential across the piezoelectric ultrasonic generator layer 1114 for the purposes of ultrasonic wave generation.

Figure 12:
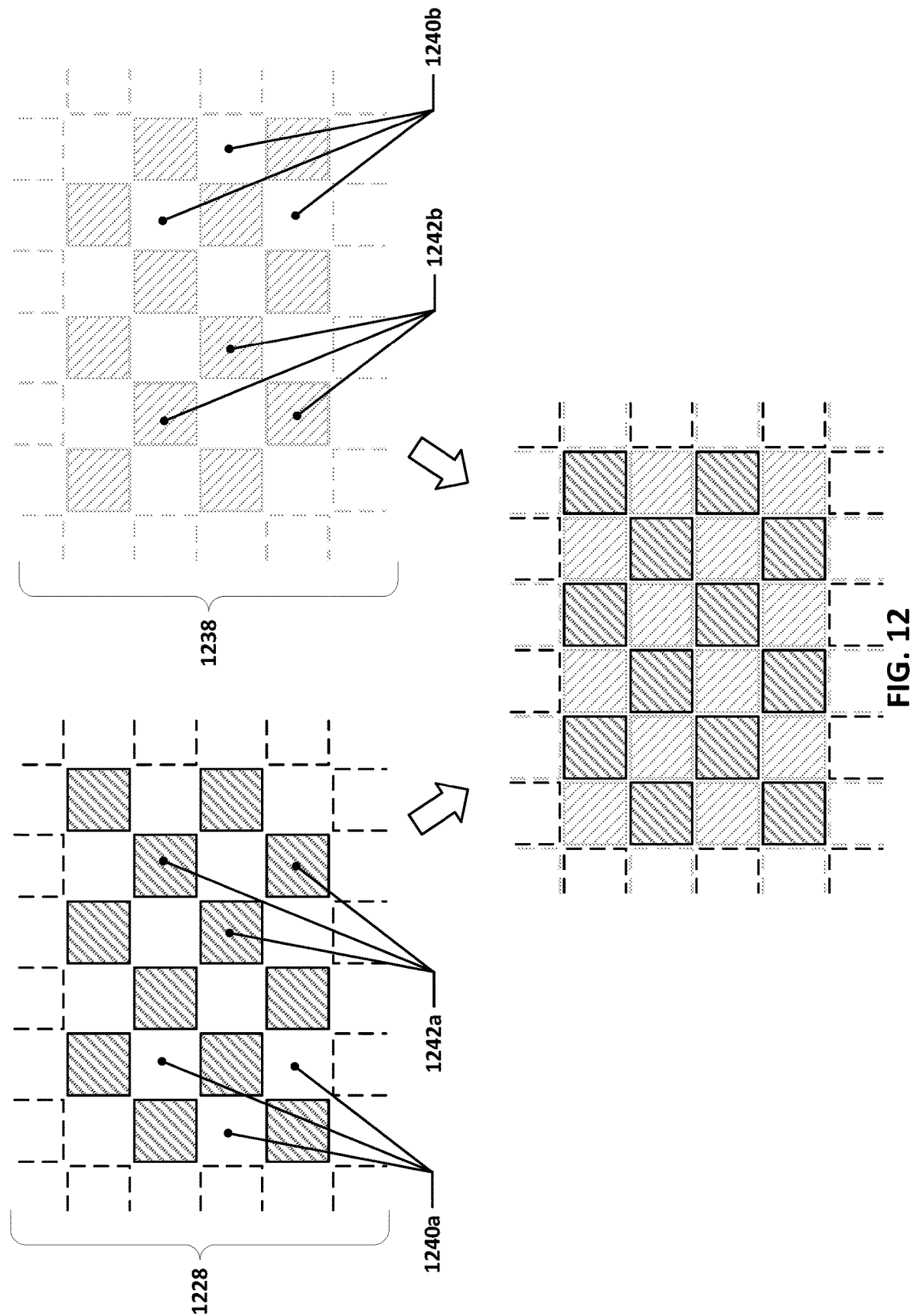
FIG. 12 depicts views of two checker-board acoustic masking patterns.

As can be seen in FIG. 11, the LAI regions 1142 in the first acoustic masking layer 1128 and the second acoustic masking layer are arranged in checkerboard patterns, although it will be recognized that other types of repeating pattern may be used as well to similar effect. For example, the LAI regions 1142 in the first acoustic masking layer 1128 and the second acoustic masking layer 1138 are arranged in checkerboard patterns, as shown in FIG. 12. FIG. 12 depicts views of a first acoustic masking layer 1228 (upper left) with LAI regions 1242a and HAI regions 1240a and a second acoustic masking layer 1238 (upper right) with LAI regions 1242b and HAI regions 1240b. The LAI regions 1242a/b and HAI regions 1240a/b are arranged in offset checkerboard patterns such that when the first acoustic masking layer 1228 and the second acoustic masking layer 1238 are overlaid with one another, the two checkerboard patterns complement each other, as shown in the image at bottom center of FIG. 12.

Figure 13:
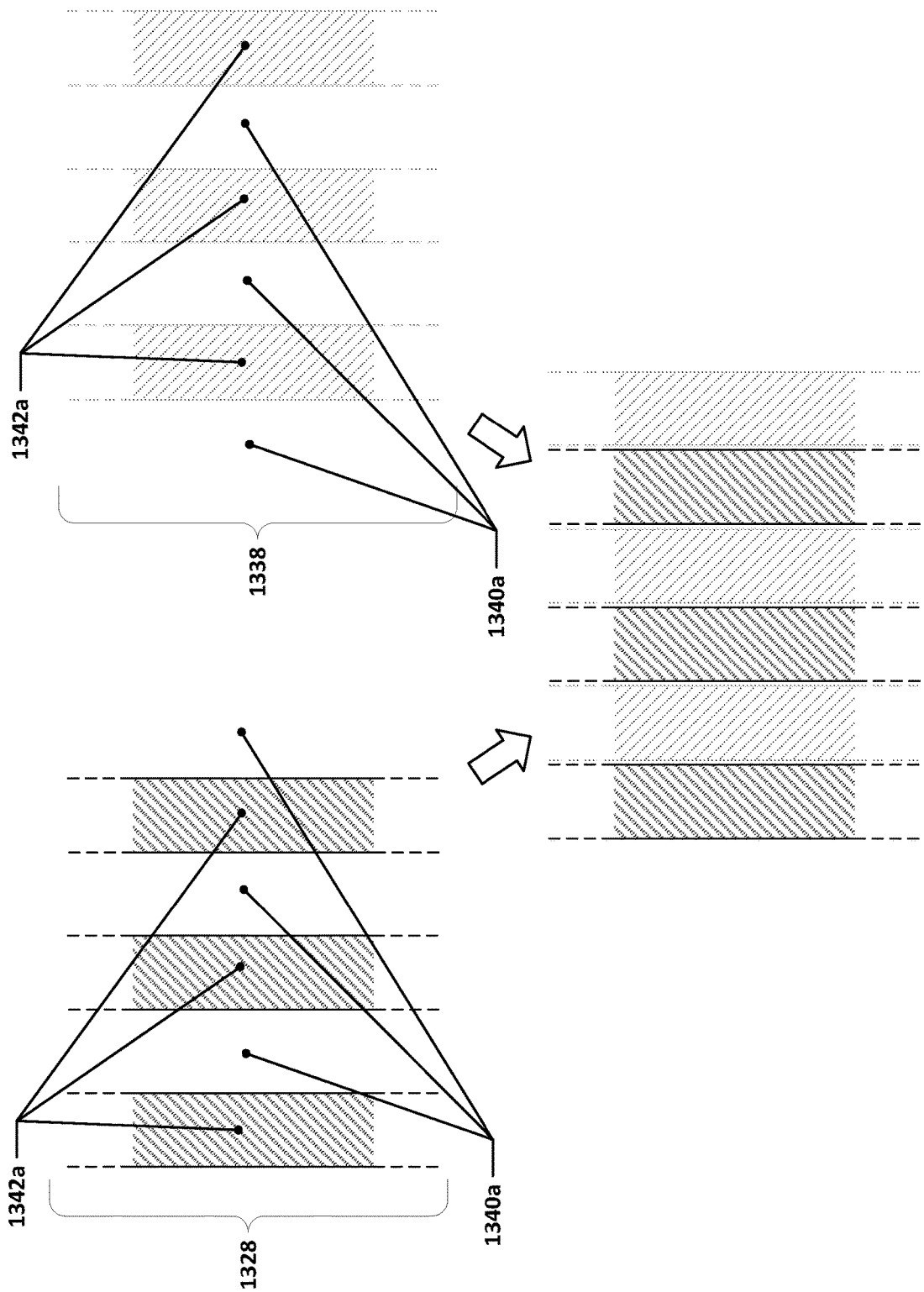
FIG. 13 depicts views of two parallel bar acoustic masking patterns.

FIG. 13, however, depicts an alternate patterning of HAI regions and LAI regions. In FIG. 13, views of a first acoustic masking layer 1328 (upper left) with LAI regions 1342a and HAI regions 1340a and a second acoustic masking layer 1338 (upper right) with LAI regions 1342b and HAI regions 1340b are depicted. The LAI regions 1342a/b and HAI regions 1340a/b are arranged in offset linear array patterns such that when the first acoustic masking layer 1328 and the second acoustic masking layer 1338 are overlaid with one another, the two sets of long, thin LAI regions 1342a/b and thin HAI regions 1340a/b complement each other, as shown in the image at bottom center of FIG. 13.

It will be understood that the shapes of the LAI regions and HAI regions that may be used in the acoustic masking layers discussed herein, while shown in FIGS. 11 and 12 as being square in nature, may, as shown in FIG. 13, take non-square forms as well. For example, the LAI regions and HAI regions may be rectangular, triangular, circular, etc. In some implementations, the LAI regions and HAI regions may be shaped such that the ultrasonic waves that pass through the two acoustic masking layers in opposite directions from a piezoelectric layer interposed therebetween are subdivided in a spatially distributed fashion in opposing directions so that the high-intensity portions traveling outward from one side of the piezoelectric layer (those portions passing through LAI regions) overlap with the low-intensity portions travelling outward in the opposite direction (those portion passing through HAI regions) when viewed along the propagation direction of the wave, and vice-versa.

While the sensor pixels depicted in the Figures discussed above are depicted as being coextensive with the LAI regions, it will be further understood that the sensor pixels that are used to measure charge that develops within the piezoelectric layer or layers of the apparatuses discussed above may, in some implementations, each overlap one or more LAI regions and/or HAI regions. In some implementations, e.g., implementations in which the LAI regions are not used as sensor pixel electrodes, multiple sensor pixels may overlap different portions of the same LAI region or LAI regions. In other implementations, however (e.g., implementations in which the LAI regions serve as sensor pixel electrodes), each LAI region may only be overlapped by one sensor pixel (although each sensor pixel may still overlap one or more LAI regions).

In some implementations, the LAI regions and HAI regions of the first and second acoustic masking layers may be selected and placed so as to provide, when viewed along an axis that is perpendicular to the nominal planes of the acoustic masking layers, two regularly spaced distributions of LAI regions in which one such distribution is associated with the first acoustic masking layer and the other distribution is associated with the second acoustic masking layer. The LAI regions in the first acoustic masking layer may be identically or similarly sized and shaped, and the LAI regions in the second acoustic masking layer may also be identically or similarly sized and shaped. In some such implementations, the LAI regions in the first acoustic masking layer may also be identically shaped and sized as compared with the LAI regions of the second acoustic masking layer, and in some such implementations, the HAI regions in the first acoustic masking layer may also be identically shaped and sized as compared with the HAI regions in the second acoustic masking layer. The LAI regions in each distribution may be positioned such that the LAI regions of one distribution are located in interstices between LAI regions in the other distribution, and vice-versa when viewed along the axis that is perpendicular to the nominal planes of the acoustic masking layers. The interstices in each distribution, it will be understood, may correspond to the locations of HAI regions of the corresponding first and second acoustic masking layers. In such arrangements, the portions of the ultrasonic waves emitted by the piezoelectric ultrasonic generator layer which pass through the LAI regions of the acoustic masking layers between which the piezoelectric ultrasonic generator layer is interposed may produce an evenly distributed pattern of higher-intensity ultrasonic waves, with the portions of ultrasonic waves passing through the HAI regions producing a similar evenly distributed pattern of lower-intensity ultrasonic waves across the sensing area of the fingerprint sensing system. In some implementations, the acoustic impedance of the HAI regions may be high enough that the lower-intensity ultrasonic waves resulting therefrom may have negligible or zero intensity. Generally speaking, the distribution of higher-intensity ultrasonic waves emitted in each direction by the fingerprint sensing system may have corresponding lower-intensity (e.g., zero intensity) ultrasonic waves emitted in the other direction at the same location. Such distributions of higher- and lower-intensity ultrasonic waves may, in effect, interlace the scanning capability of the fingerprint sensing system, with each XY location (with respect to the scanning planes of the fingerprint sensing system) being directionally biased towards either one side or the other of the fingerprint sensing system, thereby avoiding scenarios where it may be unclear from which side of the apparatus a detected higher-intensity ultrasonic wave originated from.

In some implementations, the sizes of the LAI regions used in the first and second acoustic masking layers may be selected to be different so as to cause more acoustic energy to be transmitted in one direction than in the other direction. For example, if it is only desired to ultrasonically detect the presence of a finger (as opposed to being able to also detect a fingerprint of that finger) on one of the two opposing sides of an apparatus, then the acoustic masking layer associated with that side of the apparatus may use smaller sized LAI regions as compared with the acoustic masking layer associated with the opposite side of the apparatus. In another alternative implementations, it may be desirable to obtain fingerprints from either or both opposing sides of the apparatus, but it may be desirable to send more ultrasonic energy towards one side of the apparatus, e.g., a side that is further away from the ultrasonic wave generator than the other opposing side and that may experience more transmission loss, than to the other opposing side. Accordingly, smaller LAI regions may be used in the acoustic masking layer associated with the side of the apparatus that is closer to the ultrasonic wave generator as compared with the LAI regions in the acoustic layer associated with the side of the apparatus farther therefrom.

Figure 14:
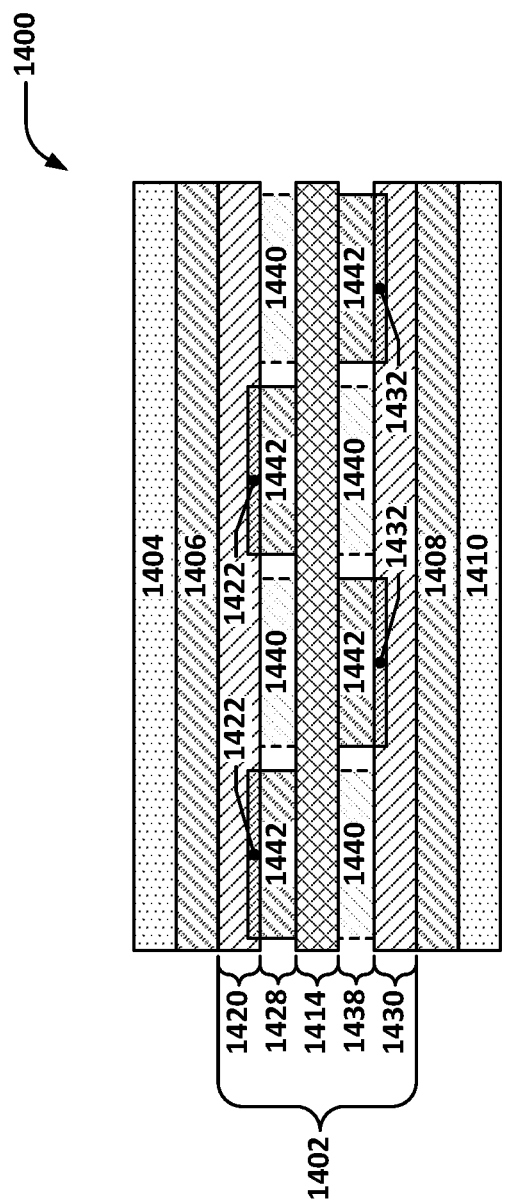
FIG. 14 depicts a cross-sectional schematic of a portion of another example apparatus including an ultrasonic fingerprint sensor.

In another implementation somewhat similar to that of FIGS. 10 and 11, an apparatus similar to the apparatuses 1000 and 1100—but omitting the electrode extension regions 1044 and 1144—may be provided. FIG. 14, for example, depicts a portion of an example apparatus 1400 in which the piezoelectric ultrasonic generator layer 1414 is used for both ultrasonic wave generation and ultrasonic wave detection, but the LAI regions 1442 are also used as electrodes without any electrode extension regions, such as the electrode extension regions 1044. The apparatus 1400 of FIG. 14 is, as with the apparatuses 800 through 1100 of FIGS. 8 through 11, somewhat similar to that of the apparatus 7 of FIG. 7 and elements in FIG. 14 that are analogous to elements in FIG. 7 are indicated with callouts sharing the same last two digits. Unless discussed otherwise below, the above discussion regarding the elements of FIG. 7 may be assumed to be similarly applicable to the analogous elements of FIG. 14.

The apparatus 1400 may operate in generally the same manner as that of the apparatuses 1000 and 1100, although the ultrasonic wave that may be generated using the piezoelectric ultrasonic generator layer 1414 may be somewhat less uniform due to the gaps in charge application that may occur in the interstices between the LAI regions 1442 on each side of the piezoelectric ultrasonic generator layer 1414.

Figure 15:
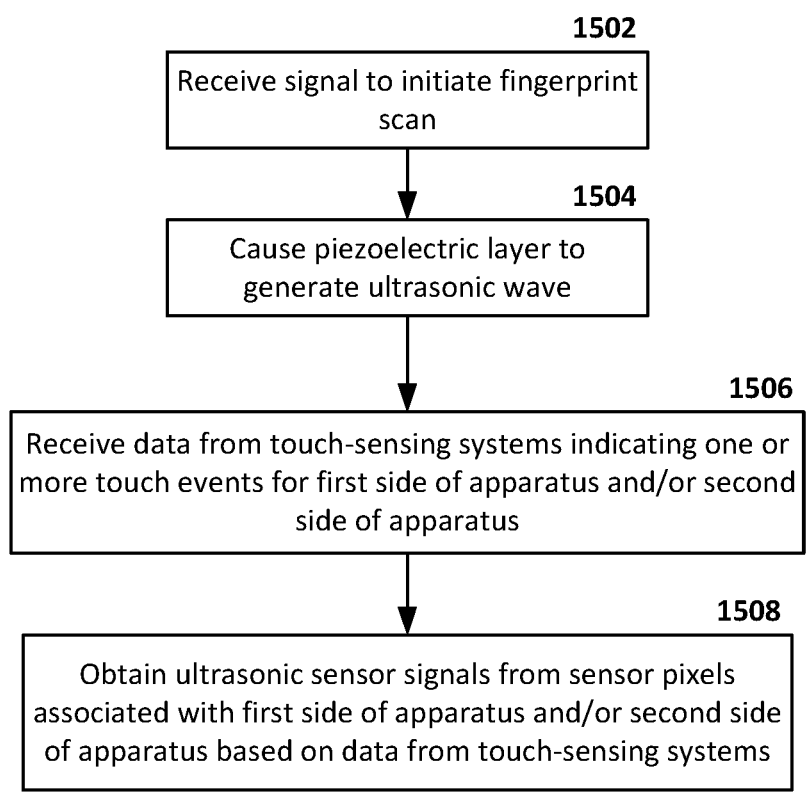
FIG. 15 depicts a flow diagram for a technique for using a bi-directional ultrasonic fingerprint sensor.

The various bi-directional ultrasonic fingerprint sensing systems discussed herein may, for example, be implemented in an apparatus that is configured to selectively read fingerprints from one side of the apparatus or another. FIG. 15 depicts an example of a technique that may be used by a controller of such an apparatus in order to do so.

The technique of FIG. 15 begins in block 1502, in which a controller of an apparatus such as the apparatuses discussed above may receive a signal to initiate a fingerprint scan. The controller, responsive to receipt thereof, may cause, in block 1504, an ultrasonic layer or layers of the ultrasonic fingerprint system of the apparatus to generate one or more ultrasonic waves.

In block 1506, the controller may receive data from touch-sensing systems of the apparatus, e.g., capacitive touch screens or the like, that may indicate one or more touch events that may be occurring on a first side or an opposing second side of the apparatus. The first side and the second side of the apparatus may both be sides of the apparatus from which the ultrasonic fingerprint sensing system thereof may be configured to obtain fingerprint scans.

In block 1508, the controller may cause the ultrasonic fingerprint sensing system to obtain fingerprint scans from either or, in some instances, both of the first side and the second side based on the data from the touch-sensing system. For example, if the data from the touch sensing system indicates touch events on the first side of the apparatus but not the second side of the apparatus, then the controller may cause the ultrasonic fingerprint sensing system to obtain fingerprint scans from only the first side of the apparatus. Conversely, if the data from the touch sensing system indicates touch events on the second side of the apparatus but not the first side of the apparatus, then the controller may cause the ultrasonic fingerprint sensing system to obtain fingerprint scans from only the second side of the apparatus. In some implementations, if the data from the touch sensing system indicates touch events on both the first side of the apparatus and the second side of the apparatus, then the controller may cause the ultrasonic fingerprint sensing system to obtain fingerprint scans from both the first and second sides of the apparatus.

In implementations of the above in which the ultrasonic fingerprint sensing system uses a range gate delay, the selection of from which side of the apparatus to obtain the fingerprint scan may involve, for example, selection of a delay period from two different delay periods (as discussed earlier). The selected delay period may be the delay period associated with the side of the apparatus from which the fingerprint scan is to be obtained.

Figure 16:
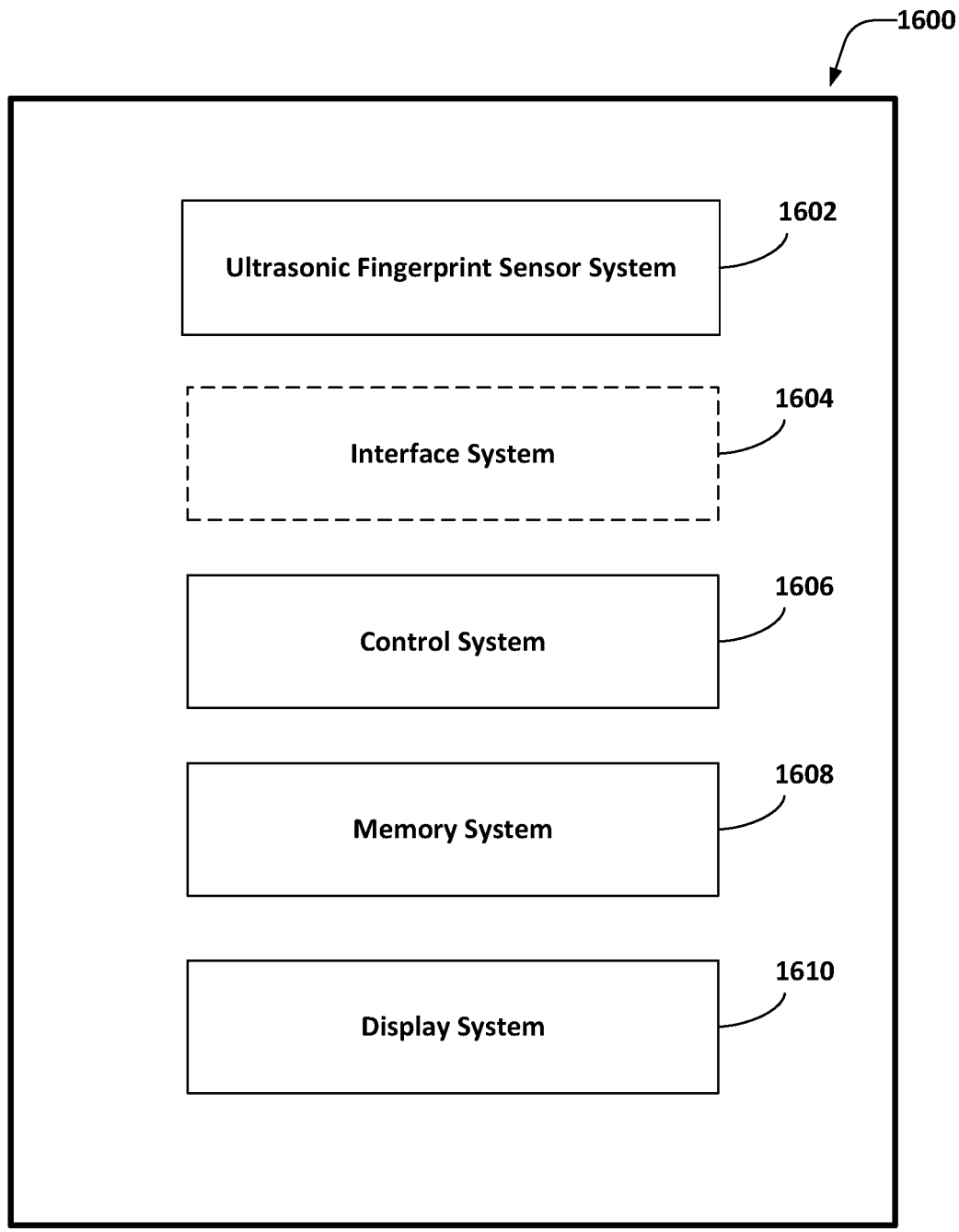
FIG. 16 is a block diagram that shows example components of an apparatus according to some disclosed implementations The Figures are provided to facilitate understanding of the concepts discussed in this disclosure, and are intended to be illustrative of some implementations that fall within the scope of this disclosure, but are not intended to be limiting—implementations consistent with this disclosure and which are not depicted in the Figures are still considered to be within the scope of this disclosure.

FIG. 16 is a block diagram that shows example components of an apparatus according to some disclosed implementations. In this example, the apparatus 1600 includes an ultrasonic fingerprint sensing system 1602, a control system 1606, a memory system 1608, and a display system 1610. In some implementations, the apparatus 1600 may include an interface system 1604.

The ultrasonic fingerprint sensing system 1602 may, for example, be one of the ultrasonic fingerprint sensing systems described herein and may include one or more piezoelectric layers, such as a layer of polyvinylidene fluoride PVDF polymer or a layer of polyvinylidene fluoride-trifluoroethylene (PVDF-TrFE) copolymer.

Data received from the ultrasonic fingerprint sensing system 1602 may sometimes be referred to herein as "fingerprint sensor data," "fingerprint image data," "ultrasonic fingerprint data," "ultrasonic signals," etc., although the data will generally be received from the fingerprint sensing system in the form of electrical signals that are then processed by one or processors. Accordingly, without additional processing such image data would not necessarily be perceivable by a human being as an image.

The control system 1606 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In this example, the control system 1606 is configured for communication with, and for controlling, the ultrasonic fingerprint sensing system 1602 and the display system 1610. According to some examples, the control system 1606 may include a dedicated component for controlling the ultrasonic fingerprint sensing system 1602. In this example, the control system 1606 is also configured for communication with the memory system 1608. According to some examples, the control system 1606 also may include one or more memory devices, such as one or more random access memory (RAM) devices, read-only memory (ROM) devices, etc. In some implementations, functionality of the control system 1606 may be partitioned between one or more controllers or processors, such as between a dedicated sensor controller and an applications processor of a mobile device.

In this example, the memory system 1608 includes one or more memory devices, such as one or more RAM devices, ROM devices, etc. In some examples, the memory system 1608 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 1608 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 1600 may include an interface system 1604. In some examples, the interface system 1604 may include a wireless interface system. In some implementations, the interface system 1604 may include a user interface system, one or more network interfaces, one or more interfaces between the control system 1606 and the ultrasonic fingerprint sensing system 1602, one or more interfaces between the control system 1606 and the memory system 1608, one or more interfaces between the control system 1606 and the display system 1610, and/or one or more interfaces between the control system 1606 and one or more external device interfaces (e.g., ports or application processors).

The interface system 1604 may be configured to provide communication (which may include wired or wireless communication, electrical communication, radio communication, etc.) between components of the apparatus 1600. In some such examples, the interface system 1604 may be configured to provide communication between the control system 1606 and the ultrasonic fingerprint sensing system 1602. According to some such examples, the interface system 1604 may couple at least a portion of the control system 1606 to the ultrasonic fingerprint sensing system 1602, e.g., via electrically conducting material (e.g., via conductive metal wires or traces). According to some examples, the interface system 1604 may be configured to provide communication between the apparatus 1600 and other devices and/or human beings. In some such examples, the interface system 1604 may include one or more user interfaces. The interface system 1604 may, in some examples, include one or more network interfaces and/or one or more external device interfaces (such as one or more universal serial bus (USB) interfaces or a serial peripheral interface (SPI)).

In this implementation, the apparatus 1600 includes a display system 1610. In some such examples, the display system 1610 may include layers, which may be referred to collectively as a "display stack." In some examples, the display system 1610 may be, or may include, a light-emitting diode (LED) display, such as an organic light-emitting diode (OLED) display.

The apparatus 1600 may be used in a variety of different contexts, some examples of which are disclosed herein. For example, in some implementations a mobile device may include at least a portion of the apparatus 1600. In some implementations, a wearable device may include at least a portion of the apparatus 1600. The wearable device may, for example, be a bracelet, an armband, a wristband, a ring, a headband or a patch. In some implementations, the control system 1606 may reside in more than one device. For example, a portion of the control system 1606 may reside in a wearable device and another portion of the control system 1606 may reside in another device, such as a mobile device (e.g., a smartphone). The interface system 1604 also may, in some such examples, reside in more than one device.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

Terms such as "about," "approximately," "substantially," "nominal," or the like, when used in reference to quantities or similar quantifiable properties, are to be understood to be inclusive of values within ±10% of the values or relationship specified (as well as inclusive of the actual values or relationship specified), unless otherwise indicated.

The use of "between," unless otherwise indicated, is to be understood to be inclusive of the values indicated. Thus, for example, "between A and B" is to be understood to be inclusive of not only the values less than B and greater than A (or vice versa, depending on the order of A and B) but also the values A and B.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While many implementations of the concepts discussed herein are evident from the above discussion and the Figures, it will be understood that this disclosure is directed at the least to the various implementations listed in the numbered clauses below.

Clause 1: An apparatus comprising:
a first sensor pixel layer including a plurality of first sensor pixels;
a first acoustic masking layer;
a first piezoelectric layer;
a second acoustic masking layer; and
a second sensor pixel layer including a plurality of second sensor pixels, wherein:
the first sensor pixel layer, the first acoustic masking layer, the first piezoelectric layer, the second acoustic masking layer, and the second sensor pixel layer are arranged in a stacked configuration along a first axis,
the first acoustic masking layer includes a repeating first pattern of first high-acoustic-impedance (HAI) regions and first low-acoustic-impedance (LAI) regions,
the second acoustic masking layer includes a repeating second pattern of second HAI regions and second LAI regions,
the first HAI regions have a higher acoustic impedance than the first LAI regions,
the second HAI regions have a higher acoustic impedance than the second LAI regions, and
when viewed along the first axis:
the first HAI regions overlap the second LAI regions,
the second HAI regions overlap the first LAI regions,
the first LAI regions overlap the second HAI regions, and
the second LAI regions overlap the first HAI regions.

Clause 2: The apparatus of clause 1, wherein:
the first LAI regions are entirely overlapped by the second HAI regions when viewed along the first axis, and
the second LAI regions are entirely overlapped by the first HAI regions when viewed along the first axis.

Clause 3: The apparatus of clause 2, wherein:
each first LAI region is smaller in footprint when viewed along the first axis than the second HAI region that entirely overlaps it, and
each second LAI region is smaller in footprint when viewed along the first axis than the first HAI region that entirely overlaps it.

Clause 4: The apparatus of any one of clauses 1 through 3, wherein:
two first reference planes that are perpendicular to, and spaced apart by a first distance along, the first axis are defined by opposing surfaces of the first LAI regions,
the first HAI regions are provided by first gaps located between the first reference planes, and
the first gaps do not have any solid or liquid material in them.

Clause 5: The apparatus of clause 4, wherein the first LAI regions do not have the first gaps.

Clause 6: The apparatus of any one of clauses 1 through 5, wherein:
two second reference planes that are perpendicular to, and spaced apart by a second distance along, the first axis are defined by opposing surfaces of the second LAI regions, and
the second HAI regions are provided by second gaps located between the second reference planes.

Clause 7: The apparatus of clause 6, wherein the second LAI regions do not have the second gaps.

Clause 8: The apparatus of either clause 4 or clause 5, wherein:
two second reference planes that are perpendicular to, and spaced apart by a second distance along, the first axis are defined by opposing surfaces of the second LAI regions,
the second HAI regions are provided by second gaps located between the second reference planes, and
the second LAI regions do not have the second gaps.

Clause 9: The apparatus of any one of clauses 1 through 8, wherein the first pattern and the second pattern are both checkerboard patterns.

Clause 10: The apparatus of any one of clauses 4 through 9, wherein each first LAI region includes a contiguous material in between the first reference planes.

Clause 11: The apparatus of clause 10, wherein the contiguous material includes copper or aluminum.

Clause 12: The apparatus of clause 8, wherein:
each first LAI region includes a contiguous material in between the first reference planes, and
each second LAI region includes a contiguous material in between the second reference planes.

Clause 13: The apparatus of clause 12, wherein the contiguous material includes copper or aluminum.

Clause 14: The apparatus of clause 13, wherein:
the first LAI regions of the first acoustic masking layer provide first electrically conductive paths between the first sensor pixel layer and the first piezoelectric layer,
the second LAI regions of the second acoustic masking layer provide second electrically conductive paths between the second sensor pixel layer and the first piezoelectric layer,
the first sensor pixels each include a circuit that is configured to electrically switch the first electrically conductive path associated therewith between serving as a sensor pixel electrode and serving as a first ultrasonic generator electrode, and
the second sensor pixels each include a circuit that is configured to electrically switch the second electrically conductive path associated therewith between serving as a sensor pixel electrode and serving as a second ultrasonic generator electrode.

Clause 15: The apparatus of clause 14, wherein:
each of the first LAI regions and the second LAI regions is electrically coupled with an electrode extension region that extends into an adjoining one of the first HAI regions and the second HAI regions, respectively, and
each of the electrode extension regions provides an electrically conductive path between the first piezoelectric layer and the first or second LAI region electrically coupled thereto.

Clause 16: The apparatus of any one of clauses 1 through 13, further comprising:
a second piezoelectric layer;
a third piezoelectric layer;
a first sensor electrode layer; and
a second sensor electrode layer, wherein:
the first piezoelectric layer is interposed between the first sensor electrode layer and the second sensor electrode layer,
the second piezoelectric layer is interposed between the first sensor pixel layer and the first sensor electrode layer,
the third piezoelectric layer is interposed between the second sensor pixel layer and the second sensor electrode layer,
the first sensor pixel layer and the first sensor electrode layer are configured such that the first sensor pixels measure electrical charges that are generated within the second piezoelectric layer responsive to passage of an ultrasonic wave through the second piezoelectric layer, and
the second sensor pixel layer and the second sensor electrode layer are configured such that the second sensor pixels measure electrical charges that are generated within the third piezoelectric layer responsive to passage of an ultrasonic wave through the third piezoelectric layer.

Clause 17: The apparatus of clause 16, further comprising:
a first ultrasonic generator electrode; and
a second ultrasonic generator electrode, wherein:
the first piezoelectric layer is interposed between the first ultrasonic generator electrode and the second ultrasonic generator electrode, and
the first ultrasonic generator electrode, the second ultrasonic generator electrode, and the first piezoelectric layer are configured to cause an ultrasonic wave to be generated by the first piezoelectric layer responsive to application of an electrical potential across the first ultrasonic generator electrode and the second ultrasonic generator electrode.

Clause 18: The apparatus of clause 16, wherein:
the first acoustic masking layer is interposed between the first sensor electrode layer and the first piezoelectric layer,
the second acoustic masking layer is interposed between the second sensor electrode layer and the first piezoelectric layer,
the first acoustic masking layer forms an electrically conductive path between the first sensor electrode layer and the first piezoelectric layer, and
the second acoustic masking layer forms an electrically conductive path between the second sensor electrode layer and the first piezoelectric layer.

Clause 19: The apparatus of clause 16, wherein:
the first acoustic masking layer is interposed between the first sensor electrode layer and the second piezoelectric layer,
the second acoustic masking layer is interposed between the second sensor electrode layer and the third piezoelectric layer,
the first acoustic masking layer forms an electrically conductive path between the first sensor electrode layer and the second piezoelectric layer, and
the second acoustic masking layer forms an electrically conductive path between the second sensor electrode layer and the third piezoelectric layer.

Clause 20: The apparatus of any one of clauses 1 through 19, further comprising:
a first display layer;
a second display layer;
a first cover glass; and
a second cover glass, wherein:
the first display layer is interposed between the first cover glass and the first sensor pixel layer,
the second display layer is interposed between the second cover glass and the second sensor pixel layer, and
the first display layer and the second display layer are both interposed between the first cover glass and the second cover glass.

Clause 21: The apparatus of any one of clauses 1 through 20, wherein the apparatus is a mobile communications device.

Clause 22: A method comprising:
causing ultrasonic waves to be generated by a first piezoelectric layer of an apparatus;
causing a first ultrasonic wave of the ultrasonic waves to pass through a first acoustic masking layer of the apparatus and to propagate towards a first side of the apparatus;
causing a second ultrasonic wave of the ultrasonic waves to pass through a second acoustic masking layer of the apparatus and to propagate towards a second side of the apparatus opposite the first side of the apparatus;

causing first sensor pixels in a first sensor pixel layer of the apparatus to obtain first fingerprint scan data based on reflections of the first ultrasonic wave from the first side of the apparatus; and causing second sensor pixels in a second sensor pixel layer of the apparatus to obtain second fingerprint scan data based on reflections of the second ultrasonic wave from the second side of the apparatus, wherein:

the first sensor pixel layer, the first acoustic masking layer, the first piezoelectric layer, the second acoustic masking layer, and the second sensor pixel layer are arranged in a stacked configuration along a first axis, the first acoustic masking layer includes a repeating first pattern of first high-acoustic-impedance (HAI) regions and first low-acoustic-impedance (LAI) regions, the second acoustic masking layer includes a repeating second pattern of second HAI regions and second LAI regions, the first HAI regions have a higher acoustic impedance than the first LAI regions, the second HAI regions have a higher acoustic impedance than the second LAI regions, and when viewed along the first axis:
the first HAI regions overlap the second LAI regions,
the second HAI regions overlap the first LAI regions,
the first LAI regions overlap the second HAI regions, and
the second LAI regions overlap the first HAI regions.

Clause 23: The method of clause 22, wherein:
the first LAI regions are entirely overlapped by the second HAI regions when viewed along the first axis, and
the second LAI regions are entirely overlapped by the first HAI regions when viewed along the first axis.

Clause 24: The method of clause 23, wherein:
each first LAI region is smaller in footprint when viewed along the first axis than the second HAI region that entirely overlaps it, and
each second LAI region is smaller in footprint when viewed along the first axis than the first HAI region that entirely overlaps it.

Clause 25: The method of any one of clauses 22 through 24, wherein:
two first reference planes that are perpendicular to, and spaced apart by a first distance along, the first axis are defined by opposing surfaces of the first LAI regions,
the first HAI regions are provided by first gaps located between the first reference planes, and
the first gaps do not have any solid or liquid material in them.

Clause 26: The method of clause 25, wherein the first LAI regions do not have the first gaps.

Clause 27: The method of any one of clauses 22 through 26, wherein:
two second reference planes that are perpendicular to, and spaced apart by a second distance along, the first axis are defined by opposing surfaces of the second LAI regions, and
the second HAI regions are provided by second gaps located between the second reference planes.

Clause 28: The method of clause 27, wherein the second LAI regions do not have the second gaps.

Clause 29: The method of either clause 25 or clause 26, wherein:
two second reference planes that are perpendicular to, and spaced apart by a second distance along, the first axis are defined by opposing surfaces of the second LAI regions,
the second HAI regions are provided by second gaps located between the second reference planes, and
the second LAI regions do not have the second gaps.

Clause 30: The method of any one of clauses 22 through 29, wherein the first pattern and the second pattern are both checkerboard patterns.

Clause 31: The method of any one of clauses 25 through 30, wherein each first LAI region includes a contiguous material in between the first reference planes.

Clause 32: The method of clause 31, wherein the contiguous material includes copper or aluminum.

Clause 33: The method of clause 29, wherein:
each first LAI region includes a contiguous material in between the first reference planes, and
each second LAI region includes a contiguous material in between the second reference planes.

Clause 34: The method of clause 33, wherein the contiguous material includes copper or aluminum.

Clause 35: The method of clause 34, wherein:
the first LAI regions of the first acoustic masking layer provide first electrically conductive paths between the first sensor pixel layer and the first piezoelectric layer,
the second LAI regions of the second acoustic masking layer provide second electrically conductive paths between the second sensor pixel layer and the first piezoelectric layer,
the first sensor pixels each include a circuit that is configured to electrically switch the first electrically conductive path associated therewith between serving as a sensor pixel electrode and serving as a first ultrasonic generator electrode, and
the second sensor pixels each include a circuit that is configured to electrically switch the second electrically conductive path associated therewith between serving as a sensor pixel electrode and serving as a second ultrasonic generator electrode.

Clause 36: The method of clause 35, wherein:
each of the first LAI regions and the second LAI regions is electrically coupled with an electrode extension region that extends into an adjoining one of the first HAI regions and the second HAI regions, respectively,
each of the electrode extension regions provides an electrically conductive path between the first piezoelectric layer and the first or second LAI region electrically coupled thereto.

Clause 37: The method of any one of clauses 22 through 34, further comprising:
receiving the reflections of the first ultrasonic wave in a second piezoelectric layer;
receiving the reflections of the second ultrasonic wave in a third piezoelectric layer;
causing the first sensor pixels in the first sensor pixel layer of the apparatus to obtain the first fingerprint scan data by measuring, using a first sensor electrode layer, charges generated within the second piezoelectric layer; and
causing the second sensor pixels in the second sensor pixel layer of the apparatus to obtain the second fingerprint scan data by measuring, using a second sensor electrode layer, charges generated within the third piezoelectric layer, wherein:
the first piezoelectric layer is interposed between the first sensor electrode layer and the second sensor electrode layer,
the second piezoelectric layer is interposed between the first sensor pixel layer and the first sensor electrode layer,
the third piezoelectric layer is interposed between the second sensor pixel layer and the second sensor electrode layer, the first sensor pixel layer and the first sensor electrode layer are configured such that the first sensor pixels measure electrical charges that are generated within the second piezoelectric layer responsive to passage of an ultrasonic wave through the second piezoelectric layer, and the second sensor pixel layer and the second sensor electrode layer are configured such that the second sensor pixels measure electrical charges that are generated within the third piezoelectric layer responsive to passage of an ultrasonic wave through the third piezoelectric layer.

Clause 38: The method of clause 37, wherein the causing the ultrasonic waves to be generated by the first piezoelectric layer of the apparatus includes causing an electrical potential to be applied across the first piezoelectric layer by a first ultrasonic generator electrode and a second ultrasonic generator electrode, wherein:

the first piezoelectric layer is interposed between the first ultrasonic generator electrode and the second ultrasonic generator electrode.

Clause 39: The method of clause 37, wherein:

the first acoustic masking layer is interposed between the first sensor electrode layer and the first piezoelectric layer, the second acoustic masking layer is interposed between the second sensor electrode layer and the first piezoelectric layer, the first acoustic masking layer forms an electrically conductive path between the first sensor electrode layer and the first piezoelectric layer, and the second acoustic masking layer forms an electrically conductive path between the second sensor electrode layer and the first piezoelectric layer.

Clause 40: The method of clause 37, wherein:

the first acoustic masking layer is interposed between the first sensor electrode layer and the second piezoelectric layer, the second acoustic masking layer is interposed between the second sensor electrode layer and the third piezoelectric layer, the first acoustic masking layer forms an electrically conductive path between the first sensor electrode layer and the second piezoelectric layer, and the second acoustic masking layer forms an electrically conductive path between the second sensor electrode layer and the third piezoelectric layer.

Clause 41: The method of any one of clauses 22 through 40, further comprising:

causing first graphical content to be displayed on a first display layer and through a first cover glass; and causing second graphical content to be displayed on a second display layer and through a second cover glass, wherein:

the first display layer is interposed between the first cover glass and the first sensor pixel layer, the second display layer is interposed between the second cover glass and the second sensor pixel layer, and the first display layer and the second display layer are both interposed between the first cover glass and the second cover glass.

Clause 42: The method of any one of clauses 22 through 41, wherein the apparatus is a mobile communications device.

Clause 43: An apparatus comprising:

a means for generating one or more ultrasonic waves;

a first means for detecting reflected ultrasonic waves;

a first acoustic masking means;

a second means for detecting reflected ultrasonic waves; and a second acoustic masking means, wherein:

the means for generating one or more ultrasonic waves, the first means for detecting reflected ultrasonic waves, the second means for detecting reflected ultrasonic waves, first acoustic masking means, and the second acoustic masking means are arranged in a stacked configuration along a first axis, the first acoustic masking means includes a repeating first pattern of first high-acoustic-impedance (HAI) regions and first low-acoustic-impedance (LAI) regions, the second acoustic masking means includes a repeating second pattern of second HAI regions and second LAI regions, the first HAI regions have a higher acoustic impedance than the first LAI regions, the second HAI regions have a higher acoustic impedance than the second LAI regions, and when viewed along the first axis:

the first HAI regions overlap the second LAI regions, the second HAI regions overlap the first LAI regions, the first LAI regions overlap the second HAI regions, and the second LAI regions overlap the first HAI regions.

Clause 44: The apparatus of clause 43, wherein:

the first LAI regions are entirely overlapped by the second HAI regions when viewed along the first axis, and the second LAI regions are entirely overlapped by the first HAI regions when viewed along the first axis.

Clause 45: The apparatus of clause 44, wherein:

each first LAI region is smaller in footprint when viewed along the first axis than the second HAI region that entirely overlaps it, and each second LAI region is smaller in footprint when viewed along the first axis than the first HAI region that entirely overlaps it.

Clause 46: The apparatus of any one of clauses 43 through 45, wherein:

two first reference planes that are perpendicular to, and spaced apart by a first distance along, the first axis are defined by opposing surfaces of the first LAI regions, the first HAI regions are provided by first gaps located between the first reference planes, and the first gaps do not have any solid or liquid material in them.

Clause 47: The apparatus of clause 46, wherein the first LAI regions do not have the first gaps.

Clause 48: The apparatus of any one of clauses 43 through 47, wherein:

two second reference planes that are perpendicular to, and spaced apart by a second distance along, the first axis are defined by opposing surfaces of the second LAI regions, and the second HAI regions are provided by second gaps located between the second reference planes.

Clause 49: The apparatus of clause 48, wherein the second LAI regions do not have the second gaps.

Clause 50: The apparatus of either clause 46 or clause 47, wherein:

two second reference planes that are perpendicular to, and spaced apart by a second distance along, the first axis are defined by opposing surfaces of the second LAI regions, the second HAI regions are provided by second gaps located between the second reference planes, and the second LAI regions do not have the second gaps.

Clause 51: The apparatus of any one of clauses 43 through 50, wherein the first pattern and the second pattern are both checkerboard patterns.

Clause 52: The apparatus of any one of clauses 46 through 51, wherein each first LAI region includes a contiguous material in between the first reference planes.

Clause 53: The apparatus of clause 52, wherein the contiguous material includes copper or aluminum.

Clause 54: The apparatus of clause 50, wherein:
each first LAI region includes a contiguous material in between the first reference planes, and
each second LAI region includes a contiguous material in between the second reference planes.

Clause 55: The apparatus of clause 54, wherein the contiguous material includes copper or aluminum.

Clause 56: The apparatus of clause 55, wherein:
the first LAI regions of the first acoustic masking means provide first electrically conductive paths between the means for generating one or more ultrasonic waves and the first means for detecting reflected ultrasonic waves,
the second LAI regions of the second acoustic masking means provide second electrically conductive paths between the means for generating one or more ultrasonic waves and the second means for detecting reflected ultrasonic waves,
the first means for detecting reflected ultrasonic waves includes first sensor pixels that each include a circuit that is configured to electrically switch the first electrically conductive path associated therewith between serving as a sensor pixel electrode for the first means for detecting reflected ultrasonic waves and serving as a first ultrasonic generator electrode for the means for generating one or more ultrasonic waves, and
the second means for detecting reflected ultrasonic waves includes second sensor pixels that each include a circuit that is configured to electrically switch the second electrically conductive path associated therewith between serving as a sensor pixel electrode for the second means for detecting reflected ultrasonic waves and serving as a second ultrasonic generator electrode for the means for generating one or more ultrasonic waves.

Clause 57: The apparatus of clause 56, wherein:
each of the first LAI regions and the second LAI regions is electrically coupled with an electrode extension region that extends into an adjoining one of the first HAI regions and the second HAI regions, respectively,
each of the electrode extension regions provides an electrically conductive path between the means for generating one or more ultrasonic waves and the first or second LAI region electrically coupled thereto.

Clause 58: The apparatus of any one of clauses 43 through 55, wherein:
the first means for detecting reflected ultrasonic waves includes a first piezoelectric layer, a first sensor electrode layer, and a first sensor pixel layer, and
the second means for detecting reflected ultrasonic waves includes a second piezoelectric layer, a second sensor electrode layer, and a second sensor pixel layer, wherein:
the means for generating one or more ultrasonic waves includes a third piezoelectric layer and is interposed between the first sensor electrode layer and the second sensor electrode layer,
the first piezoelectric layer is interposed between the first sensor pixel layer and the first sensor electrode layer,
the second piezoelectric layer is interposed between the second sensor pixel layer and the second sensor electrode layer,
the first sensor pixel layer and the first sensor electrode layer are configured such that first sensor pixels in the first sensor pixel layer measure electrical charges that are generated within the first piezoelectric layer responsive to passage of an ultrasonic wave through the first piezoelectric layer, and
the second sensor pixel layer and the second sensor electrode layer are configured such that second sensor pixels in the second sensor pixel layer measure electrical charges that are generated within the second piezoelectric layer responsive to passage of an ultrasonic wave through the second piezoelectric layer.

Clause 59: The apparatus of clause 58, wherein the means for generating one or more ultrasonic waves includes a first ultrasonic generator electrode, a second ultrasonic generator electrode, and a third piezoelectric layer, wherein:
the third piezoelectric layer is interposed between the first ultrasonic generator electrode and the second ultrasonic generator electrode, and
the first ultrasonic generator electrode, the second ultrasonic generator electrode, and the third piezoelectric layer are configured to cause an ultrasonic wave to be generated by the first piezoelectric layer responsive to application of an electrical potential across the first ultrasonic generator electrode and the second ultrasonic generator electrode.

Clause 60: The apparatus of clause 58, wherein:
the means for generating one or more ultrasonic waves includes a third piezoelectric layer,
the first acoustic masking means is interposed between the first sensor electrode layer and the third piezoelectric layer,
the second acoustic masking means is interposed between the second sensor electrode layer and the third piezoelectric layer,
the first acoustic masking means forms an electrically conductive path between the first sensor electrode layer and the third piezoelectric layer, and
the second acoustic masking means forms an electrically conductive path between the second sensor electrode layer and the third piezoelectric layer.

Clause 61: The apparatus of clause 58, wherein:
the first acoustic masking means is interposed between the first sensor electrode layer and the second piezoelectric layer,
the second acoustic masking means is interposed between the second sensor electrode layer and the third piezoelectric layer,
the first acoustic masking means forms an electrically conductive path between the first sensor electrode layer and the first piezoelectric layer, and
the second acoustic masking means forms an electrically conductive path between the second sensor electrode layer and the second piezoelectric layer.

Clause 62: The apparatus of any one of clauses 43 through 61, further comprising:
a first display means;
a second display means;
a first cover means; and
a second cover means, wherein:
the first display means is interposed between the first cover means and the first means for detecting reflected ultrasonic waves,
the second display means is interposed between the second cover means and the second means for detecting reflected ultrasonic waves, and
the first display means and the second display means are both interposed between the first cover means and the second cover means.

Clause 63: The apparatus of any one of clauses 43 through 62, wherein the apparatus is a mobile communications device.

Clause 64: An apparatus comprising:
a portion of a first ultrasonic fingerprint sensing system including:
a first sensor pixel layer,
a first piezoelectric layer, and
a first electrode layer,
a portion of a second ultrasonic fingerprint sensing system including:
a second sensor pixel layer,
a second piezoelectric layer, and
a second electrode layer; and
a single common controller, wherein:
the first sensor pixel layer includes a plurality of first sensor pixels, each first sensor pixel configured to, in conjunction with the first electrode layer, measure an amount of charge generated within the first piezoelectric layer responsive to transit of an ultrasonic wave therethrough,
the second sensor pixel layer includes a plurality of second sensor pixels, each second sensor pixel configured to, in conjunction with the second electrode layer, measure an amount of charge generated within the second piezoelectric layer responsive to transit of an ultrasonic wave therethrough,
at least the first sensor pixel layer and the second sensor pixel layer are both operatively connected with the single common controller,
the portion of the first fingerprint sensing system is located proximate to a first side of the apparatus,
the portion of the second fingerprint sensing system is located proximate to a second side of the apparatus opposite the first side of the apparatus, and
the single common controller is configured to:
cause the first sensor pixel layer to obtain a fingerprint scan from the first side of the apparatus by scanning the first sensor pixels for measured charge amounts, and
cause the second sensor pixel layer to obtain a fingerprint scan from the second side of the apparatus by scanning the second sensor pixels for measured charge amounts.

Clause 65: The apparatus of clause 64, wherein the single common controller includes one or more processors and a switching element that is configured to be switchable between at least a first configuration and a second configuration, wherein:
in the first configuration, one or more first electrically conductive paths from the first sensor pixel layer are electrically connected with the one or more processors and one or more second electrically conductive paths from the second sensor pixel layer are not electrically connected with the one or more processors,
in the second configuration, the one or more second electrically conductive paths from the second sensor pixel layer are electrically connected with the one or more processors and the one or more first electrically conductive paths from the first sensor pixel layer are not electrically connected with the one or more processors, and
the switching element is configured to transition between the first configuration and the second configuration responsive to receipt of one or more control signals.

Clause 66: The apparatus of clause 65, wherein the one or more processors is a single processor.

Clause 67: The apparatus of either clause 65 or clause 66, wherein the one or more processors are provided on a single die.

Clause 68: The apparatus of any one of clauses 64 through 67, further comprising:
a first display layer;
a second display layer;
a first cover glass; and
a second cover glass, wherein:
the first display layer is interposed between the first cover glass and the first sensor pixel layer,
the second display layer is interposed between the second cover glass and the second sensor pixel layer, and
the first display layer and the second display layer are both interposed between the first cover glass and the second cover glass.

Clause 69: The apparatus of any one of clauses 64 through 68, wherein the apparatus is a mobile communications device.

Clause 70: A method comprising:
causing a portion of a first ultrasonic fingerprint sensing system including a first sensor pixel layer, a first piezoelectric layer, and a first electrode layer to generate a first ultrasonic wave, wherein the first ultrasonic fingerprint sensing system is part of an apparatus;
causing a portion of a second ultrasonic fingerprint sensing system including a second sensor pixel layer, a second piezoelectric layer, and a second electrode layer to generate a second ultrasonic wave, wherein the second ultrasonic fingerprint sensing system is also part of the apparatus; and
causing a single common controller to:
cause first sensor pixels in the first sensor pixel layer to measure amounts of charge generated within the first piezoelectric layer responsive to transit of reflected portions of the first ultrasonic wave therethrough,
cause second sensor pixels in the second sensor pixel layer to measure amounts of charge generated within the second piezoelectric layer responsive to transit of reflected portions of the second ultrasonic wave therethrough,
obtain a fingerprint scan from a first side of the apparatus by scanning the first sensor pixels for measured charge amounts, and
obtain a fingerprint scan from a second side of the apparatus opposite the first side of the apparatus by scanning the second sensor pixels for measured charge amounts, wherein:
the first and second ultrasonic fingerprint sensing systems are in an apparatus,
at least the first sensor pixel layer and the second sensor pixel layer are both operatively connected with the single common controller,
the portion of the first fingerprint sensing system is located proximate to the first side of the apparatus, and
the portion of the second fingerprint sensing system is located proximate to the second side of the apparatus opposite the first side of the apparatus.

Clause 71: The method of clause 70, wherein the single common controller includes one or more processors and a switching element that is configured to be switchable between at least a first configuration and a second configuration, wherein:
in the first configuration, one or more first electrically conductive paths from the first sensor pixel layer are electrically connected with the one or more processors and one or more second electrically conductive paths from the second sensor pixel layer are not electrically connected with the one or more processors, in the second configuration, the one or more second electrically conductive paths from the second sensor pixel layer are electrically connected with the one or more processors and the one or more first electrically conductive paths from the first sensor pixel layer are not electrically connected with the one or more processors, and the switching element is configured to transition between the first configuration and the second configuration responsive to receipt of one or more control signals.

Clause 72: The method of clause 71, wherein the one or more processors is a single processor.

Clause 73: The method of either clause 71 or clause 72, wherein the one or more processors are provided on a single die.

Clause 74: The method of any one of clauses 70 through 73, wherein the apparatus is a mobile communications device.

Clause 75: An apparatus comprising:
a means for generating one or more ultrasonic waves;
a first means for detecting reflected ultrasonic waves;
a second means for detecting reflected ultrasonic waves; and
a single common controller, wherein:
the first means for detecting reflected ultrasonic waves and second means for detecting reflected ultrasonic waves are both operatively connected with the single common controller,
the first means for detecting reflected ultrasonic waves is located proximate to a first side of an apparatus,
the second means for detecting reflected ultrasonic waves is located proximate to a second side of the apparatus opposite the first side of the apparatus, and
the single common controller is configured to:
cause the first means for detecting reflected ultrasonic waves to obtain a fingerprint scan from the first side of the apparatus, and
cause the second means for detecting reflected ultrasonic waves to obtain a fingerprint scan from the second side of the apparatus.

Clause 76: The apparatus of clause 75, wherein the single common controller includes one or more processors and a switching element that is configured to be switchable between at least a first configuration and a second configuration, wherein:
in the first configuration, one or more first electrically conductive paths from the first means for detecting reflected ultrasonic waves are electrically connected with the one or more processors and one or more second electrically conductive paths from the second means for detecting reflected ultrasonic waves are not electrically connected with the one or more processors, in the second configuration, one or more second electrically conductive paths from the second means for detecting reflected ultrasonic waves are electrically connected with the one or more processors and the one or more first electrically conductive paths from the first means for detecting reflected ultrasonic waves are not electrically connected with the one or more processors, and the switching element is configured to transition between the first configuration and the second configuration responsive to receipt of one or more control signals.

Clause 77: The apparatus of clause 76, wherein the one or more processors is a single processor.

Clause 78: The apparatus of either clause 76 or clause 77, wherein the one or more processors are provided on a single die.

Clause 79: The apparatus of any one of clauses 75 through 78, further comprising:
a first display means;
a second display means;
a first cover means; and
a second cover means, wherein:
the first display means is interposed between the first cover means and the first means for detecting reflected ultrasonic waves,
the second display means is interposed between the second cover means and the second means for detecting reflected ultrasonic waves, and
the first display means and the second display means are both interposed between the first cover means and the second cover means.

Clause 80: The apparatus of any one of clauses 75 through 79, wherein the apparatus is a mobile communications device.

Clause 81: An apparatus comprising:
an ultrasonic fingerprint sensing system including:
a sensor pixel layer,
a first piezoelectric layer, and
an electrode layer; and
a controller, wherein:
the sensor pixel layer includes a plurality of sensor pixels, each sensor pixel configured to, in conjunction with the electrode layer, measure an amount of charge generated within the first piezoelectric layer responsive to transit of an ultrasonic wave therethrough,
the first piezoelectric layer is positioned within the apparatus such that a first distance between the first piezoelectric layer and a first side of the apparatus is less than a second distance between the first piezoelectric layer and a second side of the apparatus that is opposite the first side of the apparatus, and
the controller is configured to obtain a fingerprint scan by:
causing the ultrasonic fingerprint sensing system to generate an ultrasonic wave during a first time period starting at a first time,
selecting a selected delay period from a first delay period associated with the first side of the apparatus and a second delay period different from the first delay period and associated with the second side of the apparatus,
causing the sensor pixels to measure amounts of charges generated within the first piezoelectric layer during a second time period starting at a second time that is selected at least based on the first time and the selected delay period, and
generating the fingerprint scan based on the amounts of charge measured by the sensor pixels during the second time period.

Clause 82: The apparatus of clause 81, further comprising an acoustically conductive spacer that is interposed between the first piezoelectric layer and the second side of the apparatus.

Clause 83: The apparatus of clause 82, further comprising an acoustically conductive compliant layer that is also interposed between the first piezoelectric layer and the second side of the apparatus.

Clause 84: The apparatus of clause 81, wherein the first delay period is less than the second delay period.

Clause 85: The apparatus of any one of clauses 81 through 84, further comprising:
a first display layer;
a second display layer;
a first cover glass; and
a second cover glass, wherein:
the first display layer is interposed between the first cover glass and the first sensor pixel layer,
the second display layer is interposed between the second cover glass and the first sensor pixel layer,
the first display layer and the second display layer are both interposed between the first cover glass and the second cover glass,
the first cover glass is part of the first side of the apparatus, and
the second cover glass is part of the second side of the apparatus.

Clause 86: The apparatus of clause 85, further comprising:
a first touch-sensing system configured to detect touch inputs to the first cover glass; and
a second touch-sensing system configured to detect touch inputs to the second cover glass, wherein the controller is further configured to:
obtain touch input information from the first touch-sensing system and the second touch-sensing system in conjunction with obtaining the fingerprint scan,
select the first delay period or the second delay period as the selected delay period based, at least in part, on the touch input information indicating a touch event on the first side of the apparatus or the second side of the apparatus, respectively.

Clause 87: A method comprising:
causing an ultrasonic fingerprint sensing system of an apparatus to generate an ultrasonic wave during a first time period starting at a first time;
selecting a selected delay period from a first delay period associated with a first side of the apparatus and a second delay period different from the first delay period and associated with a second side of the apparatus opposite the first side of the apparatus;
causing sensor pixels of the ultrasonic fingerprint sensing system to measure amounts of charge generated within a first piezoelectric layer during a second time period starting at a second time that is selected at least based on the first time and the selected delay period; and
generating a fingerprint scan based on the amounts of charge measured by sensor pixels of the ultrasonic fingerprint sensing system during the second time period.

Clause 88: The method of clause 87, wherein the ultrasonic fingerprint sensing system is separated from the second side of the apparatus by an acoustically conductive spacer that is interposed between the ultrasonic fingerprint sensing system and the second side of the apparatus.

Clause 89: The method of clause 88, wherein the apparatus also includes an acoustically conductive compliant layer that is also interposed between the ultrasonic fingerprint sensing system and the second side of the apparatus.

Clause 90: The method of clause 87, wherein the first delay period is less than the second delay period.

Clause 91: The method of any one of clauses 87 through 90, wherein the apparatus further includes:
a first display layer;
a second display layer;
a first cover glass; and
a second cover glass, wherein:
the first display layer is interposed between the first cover glass and the sensor pixels,
the second display layer is interposed between the second cover glass and the sensor pixels,
the first display layer and the second display layer are both interposed between the first cover glass and the second cover glass,
the first cover glass is part of the first side of the apparatus, and
the second cover glass is part of the second side of the apparatus.

Clause 92: The method of clause 91, wherein the apparatus further includes a first touch-sensing system configured to detect touch inputs to the first cover glass and a second touch-sensing system configured to detect touch inputs to the second cover glass, and wherein the method further includes:
obtaining touch input information from a first touch-sensing system configured to detect touch inputs to the first cover glass and from a second touch-sensing system configured to detect touch inputs to the second cover glass in conjunction with obtaining the fingerprint scan,
selecting the first delay period or the second delay period as the selected delay period based, at least in part, on the touch input information indicating a touch event on the first side of the apparatus or the second side of the apparatus, respectively.

Clause 93: An apparatus comprising:
an ultrasonic fingerprint sensing means; and
a controller, wherein:
the ultrasonic fingerprint sensing means is positioned within the apparatus such that a first distance between the ultrasonic fingerprint sensing means and a first side of the apparatus is less than a second distance between the ultrasonic fingerprint sensing means and a second side of the apparatus that is opposite the first side of the apparatus, and
the controller is configured to obtain a fingerprint scan by:
causing the ultrasonic fingerprint sensing means to generate an ultrasonic wave during a first time period starting at a first time,
selecting a selected delay period from a first delay period associated with the first side of the apparatus and a second delay period different from the first delay period and associated with the second side of the apparatus,
causing the ultrasonic fingerprint sensing means to obtain a fingerprint scan during a second time period starting at a second time that is selected at least based on the first time and the selected delay period.

Clause 94: The apparatus of clause 93, further comprising an acoustically conductive spacer that is interposed between the ultrasonic fingerprint sensing means and the second side of the apparatus.

Clause 95: The apparatus of clause 94, further comprising an acoustically conductive compliant layer that is also interposed between the ultrasonic fingerprint sensing means and the second side of the apparatus.

Clause 96: The apparatus of clause 93, wherein the first delay period is less than the second delay period.

Clause 97: The apparatus of any one of clauses 93 through 96, further comprising:
a first display means;
a second display means;
a first cover means; and a second cover means, wherein:
the first display means is interposed between the first cover means and the ultrasonic fingerprint sensing means,
the second display means is interposed between the second cover means and the ultrasonic fingerprint sensing means,
the first display means and the second display means are both interposed between the first cover means and the second cover means,
the first cover means is part of the first side of the apparatus, and
the second cover means is part of the second side of the apparatus.

Clause 98: The apparatus of clause 97, further comprising:
a first touch-sensing means configured to detect touch inputs to the first cover means; and
a second touch-sensing means configured to detect touch inputs to the second cover means, wherein the controller is further configured to:
obtain touch input information from the first touch-sensing means and the second touch-sensing means in conjunction with obtaining the fingerprint scan,
select the first delay period or the second delay period as the selected delay period based, at least in part, on the touch input information indicating a touch event on the first side of the apparatus or the second side of the apparatus, respectively.

Clause 99: A non-transitory, computer-readable medium storing computer-executable instructions which, when executed by one or more processors, cause the one or more processors to:
cause ultrasonic waves to be generated by a first piezoelectric layer of an apparatus;
cause a first ultrasonic wave of the ultrasonic waves to pass through a first acoustic masking layer of the apparatus and to propagate towards a first side of the apparatus;
cause a second ultrasonic wave of the ultrasonic waves to pass through a second acoustic masking layer of the apparatus and to propagate towards a second side of the apparatus opposite the first side of the apparatus;
cause first sensor pixels in a first sensor pixel layer of the apparatus to obtain first fingerprint scan data based on reflections of the first ultrasonic wave from the first side of the apparatus; and
cause second sensor pixels in a second sensor pixel layer of the apparatus to obtain second fingerprint scan data based on reflections of the second ultrasonic wave from the second side of the apparatus, wherein, in the apparatus:
the first sensor pixel layer, the first acoustic masking layer, the first piezoelectric layer, the second acoustic masking layer, and the second sensor pixel layer are arranged in a stacked configuration along a first axis,
the first acoustic masking layer includes a repeating first pattern of first high-acoustic-impedance (HAI) regions and first low-acoustic-impedance (LAI) regions,
the second acoustic masking layer includes a repeating second pattern of second HAI regions and second LAI regions,
the first HAI regions have a higher acoustic impedance than the first LAI regions,
the second HAI regions have a higher acoustic impedance than the second LAI regions, and
when viewed along the first axis:
the first HAI regions overlap the second LAI regions,
the second HAI regions overlap the first LAI regions,
the first LAI regions overlap the second HAI regions, and
the second LAI regions overlap the first HAI regions.

Clause 100: The non-transitory, computer-readable medium of clause 99, wherein, in the apparatus:
the first LAI regions are entirely overlapped by the second HAI regions when viewed along the first axis, and
the second LAI regions are entirely overlapped by the first HAI regions when viewed along the first axis.

Clause 101: The non-transitory, computer-readable medium of clause 100, wherein, in the apparatus:
each first LAI region is smaller in footprint when viewed along the first axis than the second HAI region that entirely overlaps it, and
each second LAI region is smaller in footprint when viewed along the first axis than the first HAI region that entirely overlaps it.

Clause 102: The non-transitory, computer-readable medium of any one of clauses 99 through 101, wherein, in the apparatus:
two first reference planes that are perpendicular to, and spaced apart by a first distance along, the first axis are defined by opposing surfaces of the first LAI regions,
the first HAI regions are provided by first gaps located between the first reference planes, and
the first gaps do not have any solid or liquid material in them.

Clause 103: The non-transitory, computer-readable medium of clause 102, wherein, in the apparatus, the first LAI regions do not have the first gaps.

Clause 104: The non-transitory, computer-readable medium of any one of clauses 99 through 103, wherein, in the apparatus:
two second reference planes that are perpendicular to, and spaced apart by a second distance along, the first axis are defined by opposing surfaces of the second LAI regions, and
the second HAI regions are provided by second gaps located between the second reference planes.

Clause 105: The non-transitory, computer-readable medium of clause 104, wherein, in the apparatus, the second LAI regions do not have the second gaps.

Clause 106: The non-transitory, computer-readable medium of either clause 103 or clause 104, wherein, in the apparatus:
two second reference planes that are perpendicular to, and spaced apart by a second distance along, the first axis are defined by opposing surfaces of the second LAI regions,
the second HAI regions are provided by second gaps located between the second reference planes, and
the second LAI regions do not have the second gaps.

Clause 107: The non-transitory, computer-readable medium of any one of clauses 99 through 106, wherein, in the apparatus, the first pattern and the second pattern are both checkerboard patterns.

Clause 108: The non-transitory, computer-readable medium of any one of clauses 102 through 107, wherein, in the apparatus, each first LAI region includes a contiguous material in between the first reference planes.

Clause 109: The non-transitory, computer-readable medium of clause 108, wherein, in the apparatus, the contiguous material includes copper or aluminum.

Clause 110: The non-transitory, computer-readable medium of clause 107, wherein, in the apparatus:
each first LAI region includes a contiguous material in between the first reference planes, and
each second LAI region includes a contiguous material in between the second reference planes.

Clause 111: The non-transitory, computer-readable medium of clause 110, wherein, in the apparatus, the contiguous material includes copper or aluminum.

Clause 112: The non-transitory, computer-readable medium of clause 111, wherein, in the apparatus:
the first LAI regions of the first acoustic masking layer provide first electrically conductive paths between the first sensor pixel layer and the first piezoelectric layer,
the second LAI regions of the second acoustic masking layer provide second electrically conductive paths between the second sensor pixel layer and the first piezoelectric layer,
the first sensor pixels each include a circuit that is configured to electrically switch the first electrically conductive path associated therewith between serving as a sensor pixel electrode and serving as a first ultrasonic generator electrode, and
the second sensor pixels each include a circuit that is configured to electrically switch the second electrically conductive path associated therewith between serving as a sensor pixel electrode and serving as a second ultrasonic generator electrode.

Clause 113: The non-transitory, computer-readable medium of clause 112, wherein, in the apparatus:
each of the first LAI regions and the second LAI regions is electrically coupled with an electrode extension region that extends into an adjoining one of the first HAI regions and the second HAI regions, respectively,
each of the electrode extension regions provides an electrically conductive path between the first piezoelectric layer and the first or second LAI region electrically coupled thereto.

Clause 114: The non-transitory, computer-readable medium of any one of clauses 99 through 112, wherein the non-transitory, computer-readable medium further stores additional computer-executable instructions that, when executed by the one or more processors, cause the one or more processors to:
receive the reflections of the first ultrasonic wave in a second piezoelectric layer;
receive the reflections of the second ultrasonic wave in a third piezoelectric layer;
cause the first sensor pixels in the first sensor pixel layer of the apparatus to obtain the first fingerprint scan data by measuring, using a first sensor electrode layer, charges generated within the second piezoelectric layer; and
cause the second sensor pixels in the second sensor pixel layer of the apparatus to obtain the second fingerprint scan data by measuring, using a second sensor electrode layer, charges generated within the third piezoelectric layer, wherein, in the apparatus:
the first piezoelectric layer is interposed between the first sensor electrode layer and the second sensor electrode layer,
the second piezoelectric layer is interposed between the first sensor pixel layer and the first sensor electrode layer,
the third piezoelectric layer is interposed between the second sensor pixel layer and the second sensor electrode layer,
the first sensor pixel layer and the first sensor electrode layer are configured such that the first sensor pixels measure electrical charges that are generated within the second piezoelectric layer responsive to passage of an ultrasonic wave through the second piezoelectric layer, and
the second sensor pixel layer and the second sensor electrode layer are configured such that the second sensor pixels measure electrical charges that are generated within the third piezoelectric layer responsive to passage of an ultrasonic wave through the third piezoelectric layer.

Clause 115: The non-transitory, computer-readable medium of clause 114, wherein the computer-executable instructions to cause the ultrasonic waves to be generated by the first piezoelectric layer of the apparatus include computer-executable instructions to cause the one or more processors to cause an electrical potential to be applied across the first piezoelectric layer by a first ultrasonic generator electrode and a second ultrasonic generator electrode, wherein, in the apparatus, the first piezoelectric layer is interposed between the first ultrasonic generator electrode and the second ultrasonic generator electrode.

Clause 116: The non-transitory, computer-readable medium of clause 114, wherein, in the apparatus:
the first acoustic masking layer is interposed between the first sensor electrode layer and the first piezoelectric layer,
the second acoustic masking layer is interposed between the second sensor electrode layer and the first piezoelectric layer,
the first acoustic masking layer forms an electrically conductive path between the first sensor electrode layer and the first piezoelectric layer, and
the second acoustic masking layer forms an electrically conductive path between the second sensor electrode layer and the first piezoelectric layer.

Clause 117: The non-transitory, computer-readable medium of clause 114, wherein, in the apparatus:
the first acoustic masking layer is interposed between the first sensor electrode layer and the second piezoelectric layer,
the second acoustic masking layer is interposed between the second sensor electrode layer and the third piezoelectric layer,
the first acoustic masking layer forms an electrically conductive path between the first sensor electrode layer and the second piezoelectric layer, and
the second acoustic masking layer forms an electrically conductive path between the second sensor electrode layer and the third piezoelectric layer.

Clause 118: The non-transitory, computer-readable medium of any one of clauses 99 through 117, wherein the non-transitory, computer-readable medium further stores additional computer-executable instructions which, when executed by the one or more processors, further cause the one or more processors to:
cause first graphical content to be displayed on a first display layer and through a first cover glass; and
cause second graphical content to be displayed on a second display layer and through a second cover glass, wherein, in the apparatus:
the first display layer is interposed between the first cover glass and the first sensor pixel layer,
the second display layer is interposed between the second cover glass and the second sensor pixel layer, and
the first display layer and the second display layer are both interposed between the first cover glass and the second cover glass.

Clause 119: The non-transitory, computer-readable medium of any one of clauses 99 through 118, wherein the apparatus is a mobile communications device.

Clause 120: A non-transitory, computer-readable medium storing computer-executable instructions which, when executed by one or more processors, cause the one or more processors to:

cause a portion of a first ultrasonic fingerprint sensing system including a first sensor pixel layer, a first piezoelectric layer, and a first electrode layer to generate a first ultrasonic wave, wherein the first ultrasonic fingerprint sensing system is part of an apparatus;

cause a portion of a second ultrasonic fingerprint sensing system including a second sensor pixel layer, a second piezoelectric layer, and a second electrode layer to generate a second ultrasonic wave, wherein the second ultrasonic fingerprint sensing system is also part of the apparatus; and cause a single common controller to:
  cause first sensor pixels in the first sensor pixel layer to measure amounts of charge generated within the first piezoelectric layer responsive to transit of reflected portions of the first ultrasonic wave therethrough,
  cause second sensor pixels in the second sensor pixel layer to measure amounts of charge generated within the second piezoelectric layer responsive to transit of reflected portions of the second ultrasonic wave therethrough,
  obtain a fingerprint scan from a first side of the apparatus by scanning the first sensor pixels for measured charge amounts, and
  obtain a fingerprint scan from a second side of the apparatus opposite the first side of the apparatus by scanning the second sensor pixels for measured charge amounts, wherein:
    the first and second ultrasonic fingerprint sensing systems are in an apparatus,
    at least the first sensor pixel layer and the second sensor pixel layer are both operatively connected with the single common controller,
    the portion of the first fingerprint sensing system is located proximate to the first side of the apparatus, and
    the portion of the second fingerprint sensing system is located proximate to the second side of the apparatus opposite the first side of the apparatus.

Clause 121: The non-transitory, computer-readable medium of clause 120, wherein the single common controller includes one or more processors and a switching element that is configured to be switchable between at least a first configuration and a second configuration, wherein:

in the first configuration, one or more first electrically conductive paths from the first sensor pixel layer are electrically connected with the one or more processors and one or more second electrically conductive paths from the second sensor pixel layer are not electrically connected with the one or more processors, in the second configuration, the one or more second electrically conductive paths from the second sensor pixel layer are electrically connected with the one or more processors and the one or more first electrically conductive paths from the first sensor pixel layer are not electrically connected with the one or more processors, the switching element is configured to transition between the first configuration and the second configuration responsive to receipt of one or more control signals, and the non-transitory, computer-readable medium further stores additional computer-executable instructions which, when executed by the one or more processors, further cause the one or more processors to cause the one or more control signals to be sent to the switching element.

Clause 122: The non-transitory, computer-readable medium of clause 121, wherein the one or more processors is a single processor.

Clause 123: The non-transitory, computer-readable medium of either clause 121 or clause 122, wherein the one or more processors are provided on a single die.

Clause 124: The non-transitory, computer-readable medium of any one of clauses 120 through 123, wherein the apparatus is a mobile communications device.

Clause 125: A non-transitory, computer-readable medium storing computer-executable instructions which, when executed by one or more processors, cause the one or more processors to:

cause an ultrasonic fingerprint sensing system of an apparatus to generate an ultrasonic wave during a first time period starting at a first time;

select a selected delay period from a first delay period associated with a first side of the apparatus and a second delay period different from the first delay period and associated with a second side of the apparatus opposite the first side of the apparatus;

cause sensor pixels of the ultrasonic fingerprint sensing system to measure amounts of charge generated within a first piezoelectric layer during a second time period starting at a second time that is selected at least based on the first time and the selected delay period; and generate a fingerprint scan based on the amounts of charge measured by sensor pixels of the ultrasonic fingerprint sensing system during the second time period.

Clause 126: The non-transitory, computer-readable medium of clause 125, wherein, in the apparatus, the ultrasonic fingerprint sensing system is separated from the second side of the apparatus by an acoustically conductive spacer that is interposed between the ultrasonic fingerprint sensing system and the second side of the apparatus.

Clause 127: The non-transitory, computer-readable medium of clause 126, wherein the apparatus also includes an acoustically conductive compliant layer that is also interposed between the ultrasonic fingerprint sensing system and the second side of the apparatus.

Clause 128: The non-transitory, computer-readable medium of clause 125, wherein the first delay period is less than the second delay period.

Clause 129: The non-transitory, computer-readable medium of any one of clauses 125 through 128, wherein the apparatus further includes:
  a first display layer;
  a second display layer;
  a first cover glass; and
  a second cover glass, wherein:
    the first display layer is interposed between the first cover glass and the sensor pixels,
    the second display layer is interposed between the second cover glass and the sensor pixels,
    the first display layer and the second display layer are both interposed between the first cover glass and the second cover glass,
    the first cover glass is part of the first side of the apparatus, and
    the second cover glass is part of the second side of the apparatus.

Clause 130: The non-transitory, computer-readable medium of clause 129, wherein the apparatus further includes a first touch-sensing system configured to detect touch inputs to the first cover glass and a second touch-sensing system configured to detect touch inputs to the second cover glass, and wherein the non-transitory, computer-readable medium further stores additional computer-executable instructions which, when executed by the one or more processors, further cause the one or more processors to:

obtain touch input information from a first touch-sensing system configured to detect touch inputs to the first cover glass and from a second touch-sensing system configured to detect touch inputs to the second cover glass in conjunction with obtaining the fingerprint scan, select the first delay period or the second delay period as the selected delay period based, at least in part, on the touch input information indicating a touch event on the first side of the apparatus or the second side of the apparatus, respectively.

What is claimed is:

1. An apparatus comprising:
   a portion of a first ultrasonic fingerprint sensing system including:
      a first sensor pixel layer,
      a first piezoelectric layer, and
      a first electrode layer,
   a portion of a second ultrasonic fingerprint sensing system including:
      a second sensor pixel layer,
      a second piezoelectric layer, and
      a second electrode layer; and
   a single common controller, wherein:
      the first sensor pixel layer includes a plurality of first sensor pixels, each first sensor pixel configured to, in conjunction with the first electrode layer, measure an amount of charge generated within the first piezoelectric layer responsive to transit of an ultrasonic wave therethrough,
      the second sensor pixel layer includes a plurality of second sensor pixels, each second sensor pixel configured to, in conjunction with the second electrode layer, measure an amount of charge generated within the second piezoelectric layer responsive to transit of an ultrasonic wave therethrough,
      at least the first sensor pixel layer and the second sensor pixel layer are both operatively connected with the single common controller,
      the portion of the first ultrasonic fingerprint sensing system is located proximate to a first side of the apparatus,
      the portion of the second ultrasonic fingerprint sensing system is located proximate to a second side of the apparatus opposite the first side of the apparatus, and
      the single common controller is configured to:
         cause the first sensor pixel layer to obtain a fingerprint scan from the first side of the apparatus by scanning the first sensor pixels for measured charge amounts, and
         cause the second sensor pixel layer to obtain a fingerprint scan from the second side of the apparatus by scanning the second sensor pixels for measured charge amounts.

2. The apparatus of claim 1, wherein the single common controller includes one or more processors and a switching element that is configured to be switchable between at least a first configuration and a second configuration, wherein:
   in the first configuration, one or more first electrically conductive paths from the first sensor pixel layer are electrically connected with the one or more processors and one or more second electrically conductive paths from the second sensor pixel layer are not electrically connected with the one or more processors,
   in the second configuration, the one or more second electrically conductive paths from the second sensor pixel layer are electrically connected with the one or more processors and the one or more first electrically conductive paths from the first sensor pixel layer are not electrically connected with the one or more processors, and
   the switching element is configured to transition between the first configuration and the second configuration responsive to receipt of one or more control signals.

3. The apparatus of claim 2, wherein the one or more processors is a single processor.

4. The apparatus of claim 3, wherein the one or more processors are provided on a single die.

5. The apparatus of claim 1, further comprising:
   a first display layer;
   a second display layer;
   a first cover glass; and
   a second cover glass, wherein:
      the first display layer is interposed between the first cover glass and the first sensor pixel layer,
      the second display layer is interposed between the second cover glass and the second sensor pixel layer, and
      the first display layer and the second display layer are both interposed between the first cover glass and the second cover glass.

6. The apparatus of claim 1, wherein the apparatus is a mobile communications device.

7. A method comprising:
   causing a portion of a first ultrasonic fingerprint sensing system including a first sensor pixel layer, a first piezoelectric layer, and a first electrode layer to generate a first ultrasonic wave, wherein the first ultrasonic fingerprint sensing system is part of an apparatus;
   causing a portion of a second ultrasonic fingerprint sensing system including a second sensor pixel layer, a second piezoelectric layer, and a second electrode layer to generate a second ultrasonic wave, wherein the second ultrasonic fingerprint sensing system is also part of the apparatus; and
   causing a single common controller to:
      cause first sensor pixels in the first sensor pixel layer to measure amounts of charge generated within the first piezoelectric layer responsive to transit of reflected portions of the first ultrasonic wave therethrough,
      cause second sensor pixels in the second sensor pixel layer to measure amounts of charge generated within the second piezoelectric layer responsive to transit of reflected portions of the second ultrasonic wave therethrough,
      obtain a fingerprint scan from a first side of the apparatus by scanning the first sensor pixels for measured charge amounts, and
      obtain a fingerprint scan from a second side of the apparatus opposite the first side of the apparatus by scanning the second sensor pixels for measured charge amounts, wherein:
         the first and second ultrasonic fingerprint sensing systems are in an apparatus,
         at least the first sensor pixel layer and the second sensor pixel layer are both operatively connected with the single common controller,
         the portion of the first ultrasonic fingerprint sensing system is located proximate to the first side of the apparatus, and the portion of the second ultrasonic fingerprint sensing system is located proximate to the second side of the apparatus opposite the first side of the apparatus.

8. The method of claim 7, wherein the single common controller includes one or more processors and a switching element that is configured to be switchable between at least a first configuration and a second configuration, wherein:
   in the first configuration, one or more first electrically conductive paths from the first sensor pixel layer are electrically connected with the one or more processors and one or more second electrically conductive paths from the second sensor pixel layer are not electrically connected with the one or more processors,
   in the second configuration, the one or more second electrically conductive paths from the second sensor pixel layer are electrically connected with the one or more processors and the one or more first electrically conductive paths from the first sensor pixel layer are not electrically connected with the one or more processors, and
   the switching element is configured to transition between the first configuration and the second configuration responsive to receipt of one or more control signals.

9. The method of claim 8, wherein the one or more processors is a single processor.

10. The method of claim 8, wherein the one or more processors are provided on a single die.

11. The method of claim 7, wherein the apparatus is a mobile communications device.

12. An apparatus comprising:
   a means for generating one or more ultrasonic waves;
   a first means for detecting reflected ultrasonic waves;
   a second means for detecting reflected ultrasonic waves; and
   a single common controller, wherein:
      the first means for detecting reflected ultrasonic waves and second means for detecting reflected ultrasonic waves are both operatively connected with the single common controller,
      the first means for detecting reflected ultrasonic waves is located proximate to a first side of an apparatus,
      the second means for detecting reflected ultrasonic waves is located proximate to a second side of the apparatus opposite the first side of the apparatus, and
      the single common controller is configured to:
         cause the first means for detecting reflected ultrasonic waves to obtain a fingerprint scan from the first side of the apparatus, and
         cause the second means for detecting reflected ultrasonic waves to obtain a fingerprint scan from the second side of the apparatus.

13. The apparatus of claim 12, wherein the single common controller includes one or more processors and a switching element that is configured to be switchable between at least a first configuration and a second configuration, wherein:
   in the first configuration, one or more first electrically conductive paths from the first means for detecting reflected ultrasonic waves are electrically connected with the one or more processors and one or more second electrically conductive paths from the second means for detecting reflected ultrasonic waves are not electrically connected with the one or more processors,
   in the second configuration, one or more second electrically conductive paths from the second means for detecting reflected ultrasonic waves are electrically connected with the one or more processors and the one or more first electrically conductive paths from the first means for detecting reflected ultrasonic waves are not electrically connected with the one or more processors, and
   the switching element is configured to transition between the first configuration and the second configuration responsive to receipt of one or more control signals.

14. The apparatus of claim 13, wherein the one or more processors is a single processor.

15. The apparatus of claim 13, wherein the one or more processors are provided on a single die.

16. The apparatus of claim 12, further comprising:
   a first display means;
   a second display means;
   a first cover means; and
   a second cover means, wherein:
      the first display means is interposed between the first cover means and the first means for detecting reflected ultrasonic waves,
      the second display means is interposed between the second cover means and the second means for detecting reflected ultrasonic waves, and
      the first display means and the second display means are both interposed between the first cover means and the second cover means.

17. The apparatus of claim 12, wherein the apparatus is a mobile communications device.

18. A non-transitory, computer-readable medium storing computer-executable instructions which, when executed by one or more processors, cause the one or more processors to:
   cause a portion of a first ultrasonic fingerprint sensing system including a first sensor pixel layer, a first piezoelectric layer, and a first electrode layer to generate a first ultrasonic wave, wherein the first ultrasonic fingerprint sensing system is part of an apparatus;
   cause a portion of a second ultrasonic fingerprint sensing system including a second sensor pixel layer, a second piezoelectric layer, and a second electrode layer to generate a second ultrasonic wave, wherein the second ultrasonic fingerprint sensing system is also part of the apparatus; and
   cause a single common controller to:
      cause first sensor pixels in the first sensor pixel layer to measure amounts of charge generated within the first piezoelectric layer responsive to transit of reflected portions of the first ultrasonic wave therethrough,
      cause second sensor pixels in the second sensor pixel layer to measure amounts of charge generated within the second piezoelectric layer responsive to transit of reflected portions of the second ultrasonic wave therethrough,
      obtain a fingerprint scan from a first side of the apparatus by scanning the first sensor pixels for measured charge amounts, and
      obtain a fingerprint scan from a second side of the apparatus opposite the first side of the apparatus by scanning the second sensor pixels for measured charge amounts, wherein:
         the first and second ultrasonic fingerprint sensing systems are in an apparatus,
         at least the first sensor pixel layer and the second sensor pixel layer are both operatively connected with the single common controller,
         the portion of the first ultrasonic fingerprint sensing system is located proximate to the first side of the apparatus, and the portion of the second ultrasonic fingerprint sensing system is located proximate to the second side of the apparatus opposite the first side of the apparatus.

19. The non-transitory, computer-readable medium of claim 18, wherein the single common controller includes one or more processors and a switching element that is configured to be switchable between at least a first configuration and a second configuration, wherein:
- in the first configuration, one or more first electrically conductive paths from the first sensor pixel layer are electrically connected with the one or more processors and one or more second electrically conductive paths from the second sensor pixel layer are not electrically connected with the one or more processors,
- in the second configuration, the one or more second electrically conductive paths from the second sensor pixel layer are electrically connected with the one or more processors and the one or more first electrically conductive paths from the first sensor pixel layer are not electrically connected with the one or more processors,
- the switching element is configured to transition between the first configuration and the second configuration responsive to receipt of one or more control signals, and
- the non-transitory, computer-readable medium further stores additional computer-executable instructions which, when executed by the one or more processors, further cause the one or more processors to cause the one or more control signals to be sent to the switching element.

20. The non-transitory, computer-readable medium of claim 19, wherein the one or more processors is a single processor.

21. The non-transitory, computer-readable medium of claim 19, wherein the one or more processors are provided on a single die.

22. The non-transitory, computer-readable medium of claim 18, wherein the apparatus is a mobile communications device.

* * * * *